(12) United States Patent
Maaskant et al.

(10) Patent No.: US 12,440,024 B2
(45) Date of Patent: Oct. 14, 2025

(54) REFRIGERATOR

(71) Applicant: Thetford BV, Etten-Leur (NL)

(72) Inventors: Yannick Maaskant, Kruisland (NL); Kevin Wolterink, Breda (NL); Wilhelmus Hendrikus Nicolaas Maria Van Mensvoort, Prinsenbeek (NL); Joost Marinius Van Rooijen, Kapelle (NL); Dennis Dekkers, Breda (NL); Yahui Xian, Breda (NL); Victorius Godefridus Maria Haans, Rotterdam (NL); Leendert Jan Antoon Jansen, Rotterdam (NL); Godefridus Wilhelmus Van Dorst, Breda (NL); Emma Recter, Utrecht (NL); Thomas Cornelis Johannes Kieboom, Dordrecht (NL)

(73) Assignee: Thetford BV, Etten-Leur (NL)

( * ) Notice: Subject to any disclaimer, the term of this patent is extended or adjusted under 35 U.S.C. 154(b) by 328 days.

(21) Appl. No.: 18/026,791

(22) PCT Filed: Sep. 17, 2021

(86) PCT No.: PCT/US2021/050868
§ 371 (c)(1),
(2) Date: Mar. 16, 2023

(87) PCT Pub. No.: WO2022/061110
PCT Pub. Date: Mar. 24, 2022

(65) Prior Publication Data
US 2023/0324107 A1    Oct. 12, 2023

Related U.S. Application Data

(60) Provisional application No. 63/236,801, filed on Aug. 25, 2021, provisional application No. 63/080,056, filed on Sep. 18, 2020.

(51) Int. Cl.
A47B 88/403    (2017.01)

(52) U.S. Cl.
CPC ................... A47B 88/403 (2017.01)

(58) Field of Classification Search
CPC ........ E05B 65/46; A47B 88/57; A47B 88/403
See application file for complete search history.

(56) References Cited

U.S. PATENT DOCUMENTS 1,453,121 A * 4/1923 Benner ............... E05B 65/46
                                                            312/286
1,756,880 A * 4/1930 Rand ................. A47B 88/994
                                                            292/37

(Continued)

FOREIGN PATENT DOCUMENTS

EP     0101619 A1 *  2/1984
GB     1573648 A     8/1980

(Continued)

OTHER PUBLICATIONS

International Search Report and Written Opinion regarding International Application No. PCT/US2021/050868, dated Mar. 14, 2022; ISA/EP.

Primary Examiner — Matthew W Ing
(74) Attorney, Agent, or Firm — Harness, Dickey & Pierce, P.L.C.; Stephen T. Olson

(57) ABSTRACT

A modular refrigerator includes a plurality of modules with at least one cooling unit module and at least one refrigeration module. The at least one cooling unit module and the at least one refrigeration module are independently constructed and secured to one another. The at least one refrigeration module may include at least a first refrigeration module and a second refrigeration modules. The at least one cooling unit module (Continued)

may be a common cooling unit module for selectively providing a refrigerant to the first and second refrigeration modules.

21 Claims, 49 Drawing Sheets

(56) References Cited

U.S. PATENT DOCUMENTS

| | | | | |
|---|---|---|---|---|
| 2,404,851 | A * | 7/1946 | Knowles | F25D 25/025 |
| | | | | 62/331 |
| 3,897,123 | A * | 7/1975 | Schmitt | A47B 63/067 |
| | | | | 312/223.5 |
| 8,523,301 | B1 * | 9/2013 | Britson | E05B 65/46 |
| | | | | 312/334.47 |
| 2004/0035142 | A1 | 2/2004 | Yoon et al. | |
| 2014/0042115 | A1 | 2/2014 | Lee | |
| 2015/0342344 | A1 | 12/2015 | Celik et al. | |

FOREIGN PATENT DOCUMENTS

| | | | | |
|---|---|---|---|---|
| JP | S6216359 U | | 1/1987 | |
| JP | S62106011 U | | 7/1987 | |
| JP | 2004188110 A | * | 7/2004 | A47B 88/04 |
| WO | WO-2022092527 A1 | * | 5/2022 | |

* cited by examiner

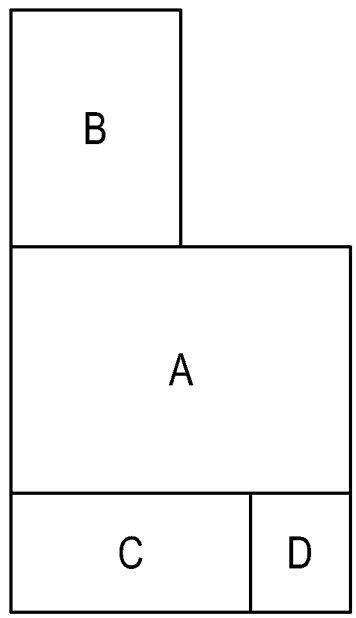
FIG. 1E
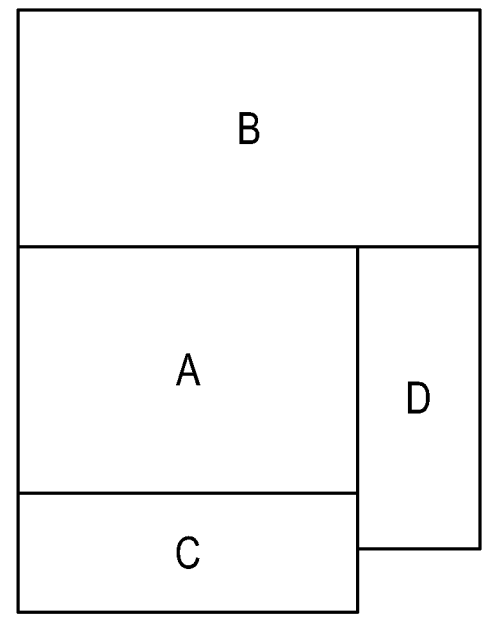
FIG. 1F
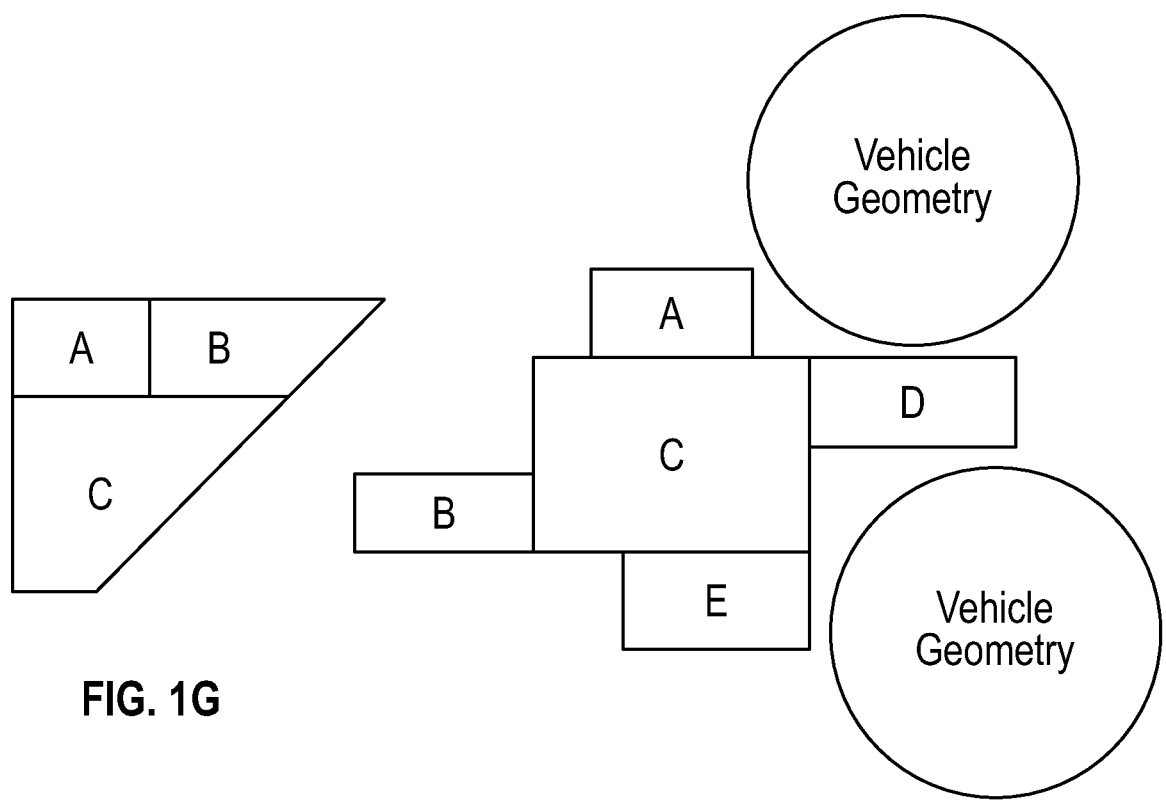
FIG. 1G
FIG. 1H

REFRIGERATOR

CROSS REFERENCE TO RELATED APPLICATIONS

This application is a U.S. National Phase Application under 35 U.S.C. 371 of International Application No. PCT/US2021/050868, filed 17 Sep. 2021, which claims priority to U.S. Provisional Application No. 63/080,056, filed on 18 Sep. 2020 and U.S. Provisional Application No. 63/236,801, filed on 25 Aug. 2021. The entire disclosures of the above applications are herein expressly incorporated by reference.

FIELD

The present disclosure relates generally to refrigerators. More particularly, the present disclosure relates to various aspects of a refrigerator platform applicable for vehicle and non-vehicle applications. Inventions disclosed in this document may also be applicable to related field such as, cabinets, closets, drawers and other storage devices with opening means.

BACKGROUND

This section merely provides background information related to the present disclosure and may not constitute prior art.

Vehicles, including but not limited to, camper vans, recreational vehicles ("RVs", in the United States and "Caravans" or "Mobile Homes" in Europe), trucks, tractor trailers, airplanes, boats, trains and the like, often incorporate refrigerators for the comfort and convenience of the occupants. For example, campers often find it convenient, or even necessary, to refrigerate food, drinks, and medicine during their journey and while at their campsites. While many prepared campsites in parks and commercial campgrounds provide for electrical outlets, many do not. Moreover, many highly desirable camping locations exist outside of these prepared sites. Thus, a popular solution has been to equip the recreational vehicle with a refrigerator.

Known refrigerators for vehicles have proven to be generally acceptable for their intended uses. A continuous need for improvement to vehicle refrigerators and other refrigerators, however, is always desired.

SUMMARY

This section provides a general summary of the disclosure, and is not a comprehensive disclosure of its full scope or all of its features.

It is a general object of the present teachings to provide modular refrigerator system including cooling and refrigeration components that may be assembled in various configurations.

It is another object of the present teachings to provide a modular refrigerator having a plurality of refrigeration modules and a common cooling module for selectively delivering a refrigerant to the plurality of refrigeration modules.

It is another object of the present teachings to provide a refrigerator with an insulated housing and interior components that may be readily manufactured in various widths.

It is another object of the present teachings to provide a refrigerator drawer with a variable sized freezer compartment that may be readily adjusted by an end user.

It is another object of the present teachings to provide a drawer assembly for a refrigerator including a lid that is automatically moveable from a sealed position to an unsealed position in response to movement of a drawer of the drawer assembly from a closed position toward an open position.

It is another object of the present teachings to provide a lighting arrangement for a refrigerator that better scatters light throughout the interior of the refrigerator and in an area in front of the refrigerator.

It is another object of the present teachings to provide a refrigerator having a drawer that can be opened in two opposite directions.

It is a related object of the present teachings to provide a refrigerator for a vehicle having a drawer that can be opened both from within the vehicle and outside the vehicle.

It is another object of the present teachings to provide a refrigerator with a door that can be selectively opened from both left and right sides while remaining secured to the cabinet at the opposite side to that being opened.

It is a related object of the present invention to provide a refrigerator with such a door that has a soft close.

It is another object of the present teachings to provide a refrigerator with a shelf having a mounting arrangement with a plurality of retractable pins biased to engaged positions with a side wall of the refrigerator.

It is another object of the present teachings to provide a refrigerator door construction include a plurality of discrete frame segments assembled around one or more foam cores and secured to one another.

It is yet another object of the present teachings to provide a drawer for a refrigerator having slidable and removable bins to increase the effective use of drawer storage space.

In accordance with one particular aspect, the present teachings provide a modular refrigerator including a plurality of modules with at least one cooling unit module and at least one refrigeration module. The at least one cooling unit module and the at least one refrigeration module are independently constructed and secured to one another. The at least one refrigeration module may include at least a first refrigeration module and a second refrigeration modules. The at least one cooling unit module may be a common cooling unit module for selectively providing a refrigerant to the first and second refrigeration modules In accordance with another particular aspect, the present teachings provide a module refrigerator including a first refrigeration module and a second refrigeration module. A connection mechanism connects the first refrigeration module to the second refrigeration module. The connection mechanism includes a first mounting member secured to the first refrigeration module, an elongated coupling element including a first end interconnected to the first mounting member and a second end interconnected to the second refrigeration module, and a first tightening element connecting the first end of the elongated coupling element to the first mounting member. The first tightening element is operative to apply a tension force to the elongated coupling element to secure the first refrigeration module to the second refrigeration module.

In accordance with another particular aspect, the present teachings provide a modular refrigerator include a first refrigeration module, a second refrigeration module, and a connection element having a first portion slidably received within a first slot of the first refrigeration module and a second portion slidably received within a second slot of the second refrigeration module. The first slot extends across a first face of the first refrigeration module and the second slot extends across a second face of the second refrigeration module. The first portion of the connection element is a first dovetail portion and the second portion of the connection element is a second dovetail portion.

In accordance with another particular aspect, the present teachings provide a refrigerator drawer including a housing portion and a divider. The housing portion includes first and second lateral side walls, a front wall and a bottom wall. The divider is selectively positioned within an interior space defined by the first and second lateral side walls, the front wall and the bottom wall to subdivide the interior space into a fresh food portion maintained a first temperature and a freezer portion maintained at a second, lower temperature.

In accordance with another particular aspect, the present teachings provide a refrigerator having a housing, a drawer and a lid. The drawer is normally stored in a closed position within an interior of the housing and movable from the closed position to an open position at least partially extending from the housing. The lid is coupled to the housing for movement between a sealed position for sealing the drawer and an unsealed position in which the drawer is unsealed and free to move relative to the lid. The lid automatically moves from the sealed position to the unsealed position in response to an initial movement of the drawer from the closed position toward the open position.

In accordance with another particular aspect, the present teachings provide refrigerator having a housing defining an interior, the housing including a front opening normally closed by a door. The refrigerator further includes a lighting arrangement including one or more lighting units that cooperate with a lens-shaped geometry of a side wall of the housing to illuminate the interior of the refrigerator module and an area immediately in front of the refrigerator module.

In accordance with another particular aspect, the present teachings provide a sliding mechanism including a drawer, a tub and a latching arrangement. The drawer is movable to a first open position and a second open position, the first open position being directly opposed to the second open position. The latching arrangement connects the tub to the drawer such that the drawer may be selectively opened to one of the first and second open positions while preventing the drawer from opening to the other of the first and second open positions.

In accordance with another particular aspect, the present teachings provide a refrigerator including a cabinet, a door and a plurality of hinge assemblies. The plurality hinge assemblies includes first and second hinge assemblies mounting a left hand side of the door to the cabinet for right hand side opening of the door, and third and fourth hinge assemblies mounting a right hand side of the door to the cabinet for left hand side opening of the door. At least one of the first and second hinge assemblies includes a locking mechanism to prevent the left hand side of the door from opening when the right hand side of the door is opened. At least one of the third and fourth hinge assemblies including a further locking mechanism to prevent the right hand side of the door from opening when the left hand side of the door is opened.

In accordance with another particular aspect, the present teachings provide a shelf for releasably mounting with an interior of a housing. The shelf includes a central shelf portion and first and second mounting arrangements. The first and second mounting arrangements are carried at first and second lateral sides of the central shelf portion, respectively. Each mounting arrangement includes a pair of pins such that the shelf is mounted in the refrigerator with four pins that engage detents in a sidewall of the housing. The pins of at least one of the first and second mounting arrangements are movable between extended and retracted positions by a button carried by a slider member.

In accordance with another particular aspect, the present teachings provide a refrigerator including a housing, a drawer and at least one bin. The drawer is mounted in the housing for sliding movement between a closed position and an open position. The at least one bin carried by the drawer for movement with the drawer. The at least one bin is mounted to the drawer for movement between a forward position and a rearward position.

In accordance with another particular aspect, the present teachings provide a refrigerator including a housing, a door and a latching arrangement. The door is movable relative to the housing from a closed position to an open position and includes a frame and an outer panel. The latching arrangement normally maintains the door in the closed position. The outer panel is connected to the frame for movement between a first position and a second position such that the latching arrangement is in a latched condition securing the door to the housing when the outer panel is in the first position and movement of the outer panel from the first position to the second position controls the latching arrangement to operate in the unlatched condition allowing the door to move relative to the housing.

Further areas of applicability will become apparent from the description provided herein. The description and specific examples in this summary are intended for purposes of illustration only and are not intended to limit the scope of the present disclosure.

DRAWINGS

The present teachings will become more fully understood from the detailed description, any appended claims and the following drawings. The drawings are for illustrative purposes only and are not intended to limit the scope of the present disclosure.

FIG. 1E is a schematic representation of a fifth exemplary assembly of the modular refrigerator system of the present teachings.

FIG. 1F is schematic representation of a sixth exemplary assembly of the modular refrigerator system of the present teachings.

FIG. 1G is a schematic representation of a seventh exemplary assembly of the modular refrigerator system of the present teachings.

FIG. 1H is schematic representation of a eighth exemplary assembly of the modular refrigerator system of the present teachings.

Figure 24A:
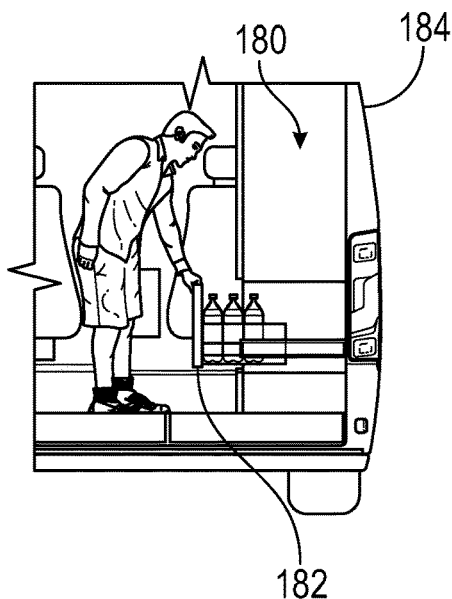
Figure 24B:
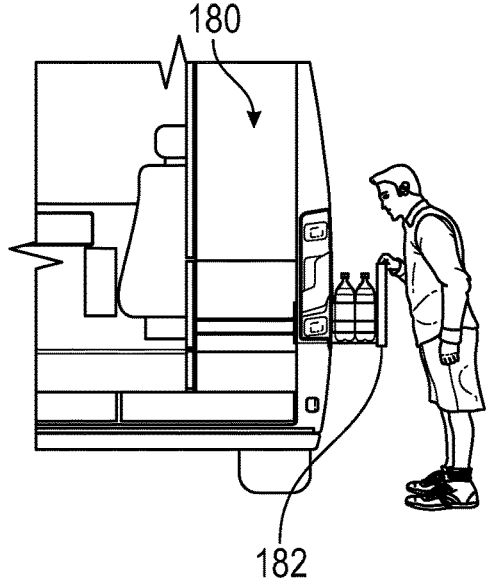

FIGS. 24A and 24B provide two side views of a refrigerator having a two-way accessible drawer in accordance with the present teachings, the refrigerator shown installed within a vehicle, the drawer shown in a first view open to a first open position (e.g., open from an interior of the vehicle) and in a second view open to second open position (e.g., open from an exterior of the vehicle).

Figure 25:
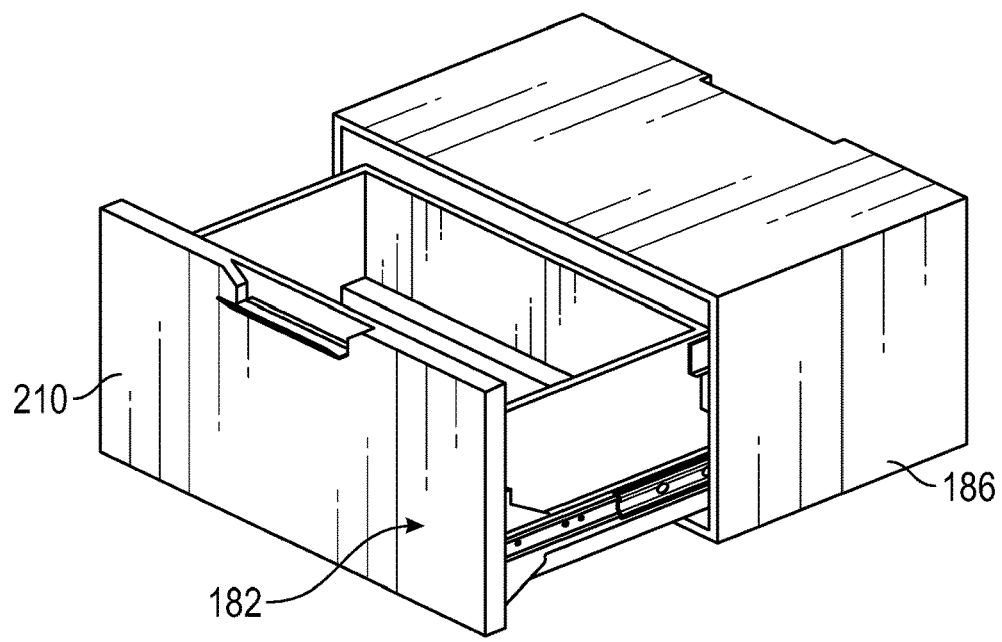

FIG. 25 is a perspective view of the drawer of FIG. 24 shown in the first open position.

Figure 26:
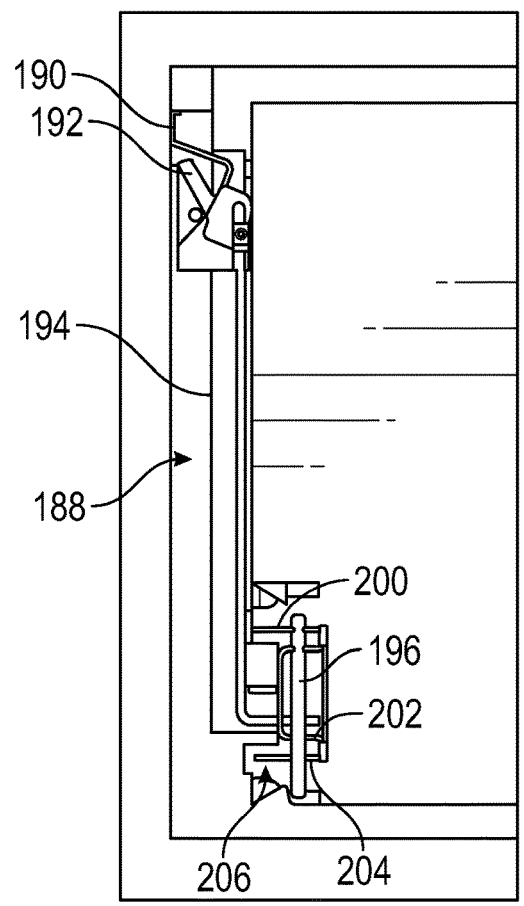

FIG. 26 is an annotated side view of a portion of the refrigerator of FIG. 24 illustrating the elements of drawer assembly.

Figure 27:
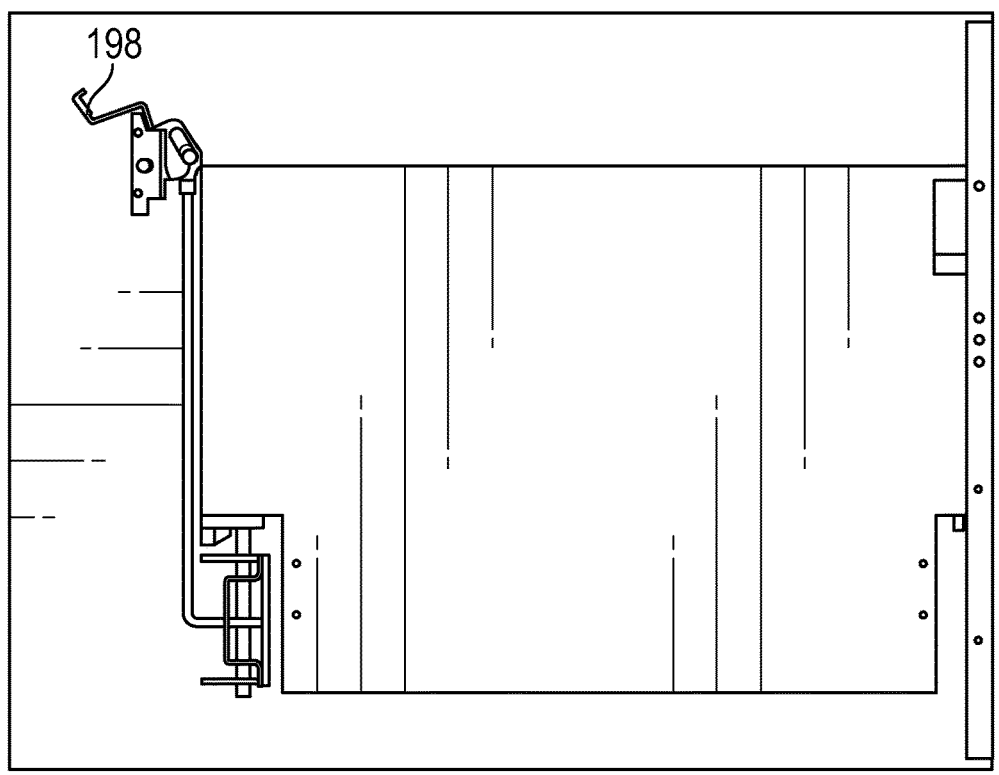

FIG. 27 is another side view of the drawer assembly of the refrigerator of FIG. 24.

FIGS. 28A-28E are a series of views illustrating the various operational states of the drawer assembly of the refrigerator of FIG. 24.

Figure 29:
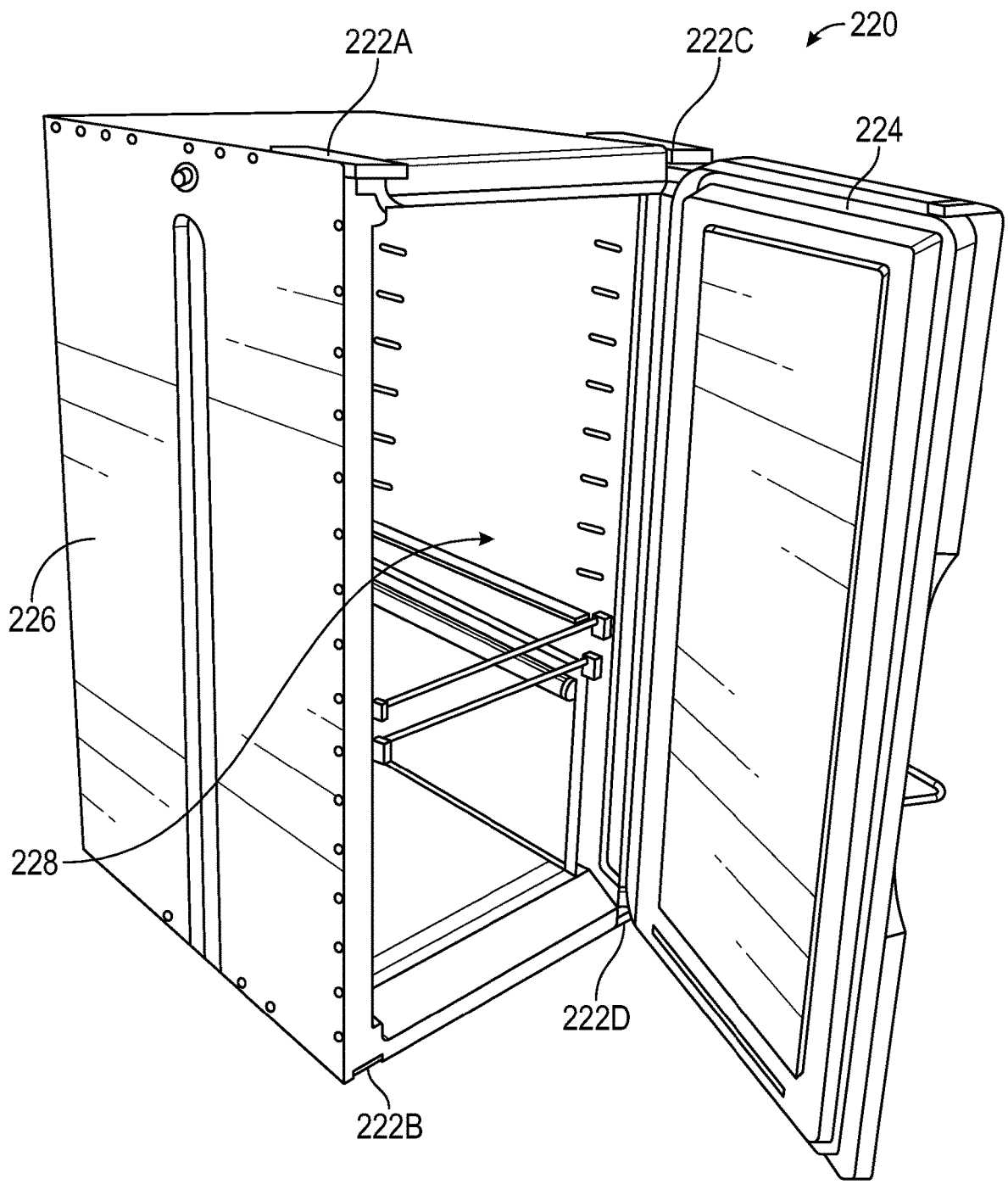

FIG. 29 is a perspective view of a refrigerator including a plurality of hinge assemblies in accordance with the present teachings.

Figure 30:
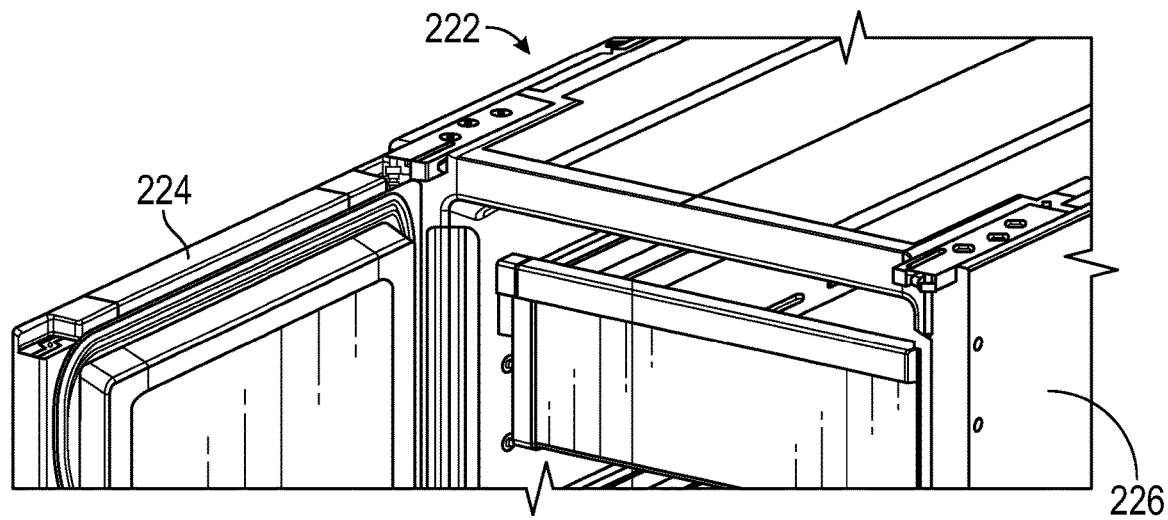

FIG. 30 is a perspective view of a portion of refrigerator of FIG. 29, a door of the refrigerator shown opened from a right side and rotated to an open position.

Figure 31:
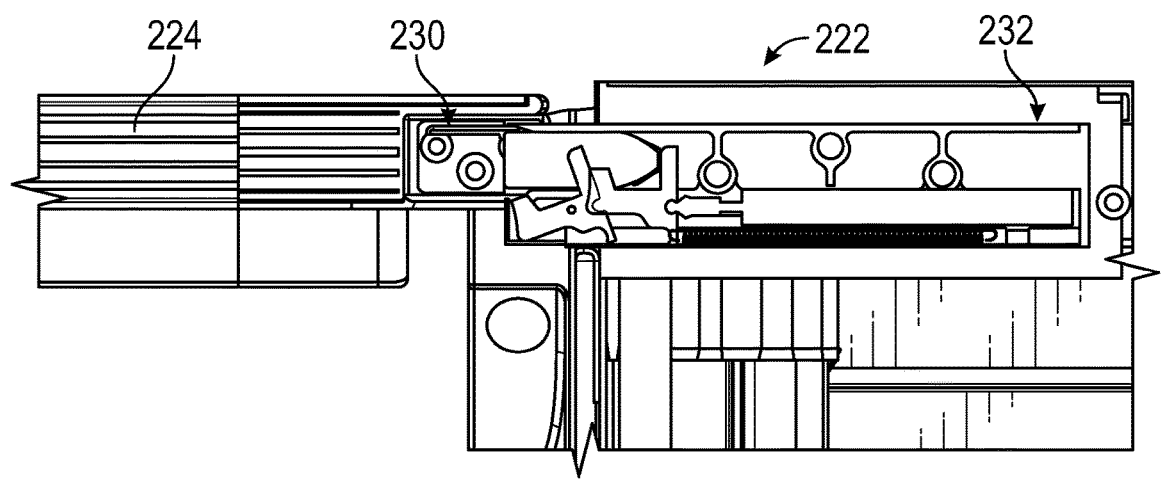

FIG. 31 is a top, annotated view of a portion of the refrigerator of FIG. 29, a taker of the hinge assembly shown in an open position and a closed position.

Figure 32:
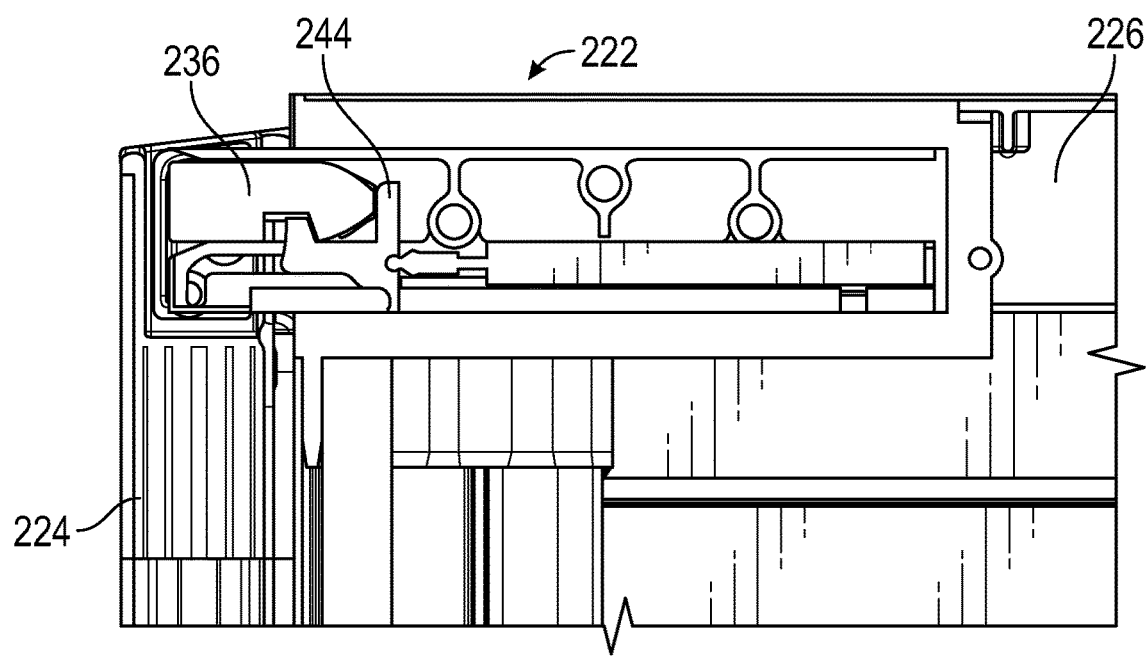

FIG. 32 is portion of the refrigerator of FIG. 29, the door rotated to the open position and the hinge assembly shown in an open condition.

Figure 33:
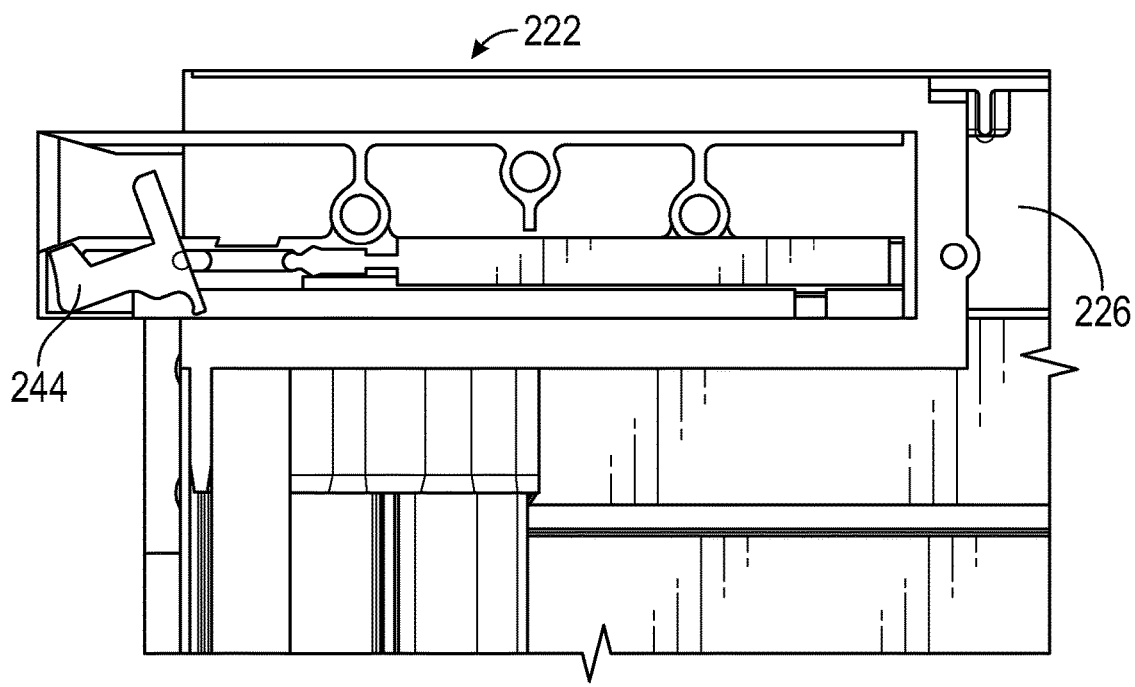

FIG. 33 is portion of the refrigerator similar to FIG. 32, the door rotated to the closed position and the hinge assembly shown in a closed condition.

Figure 34:
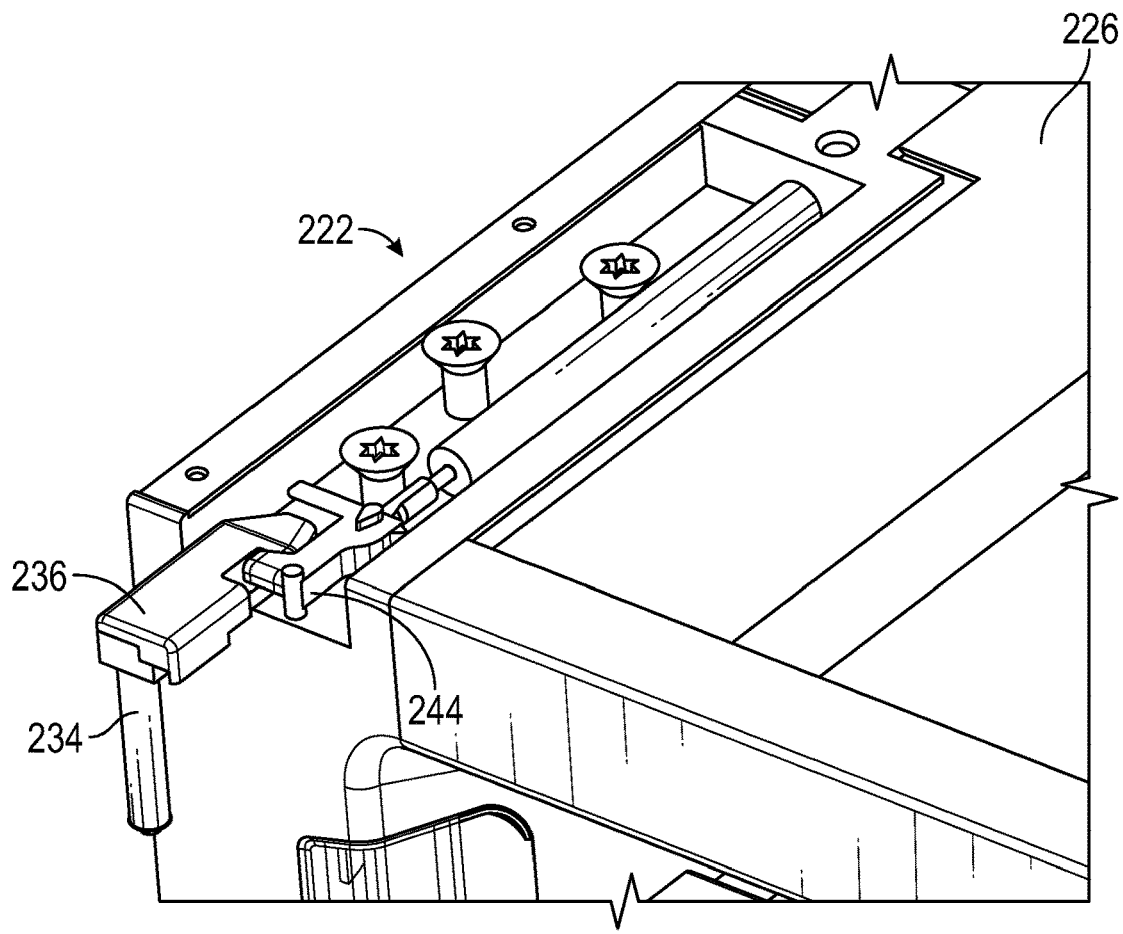

FIG. 34 is a perspective view of a portion of the refrigerator of FIG. 29, shown with the door and housing of the hinge assembly removed to further illustrate the moving parts of the hinge assembly.

Figure 35:
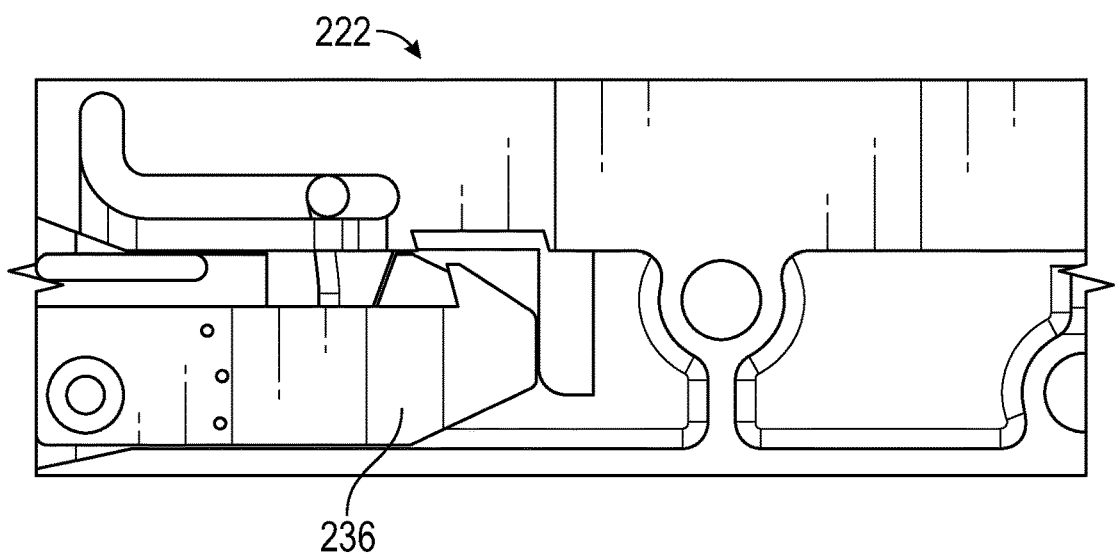

FIG. 35 is a bottom view of one of the hinge assemblies of FIG. 29 in the closed condition.

Figure 36A:
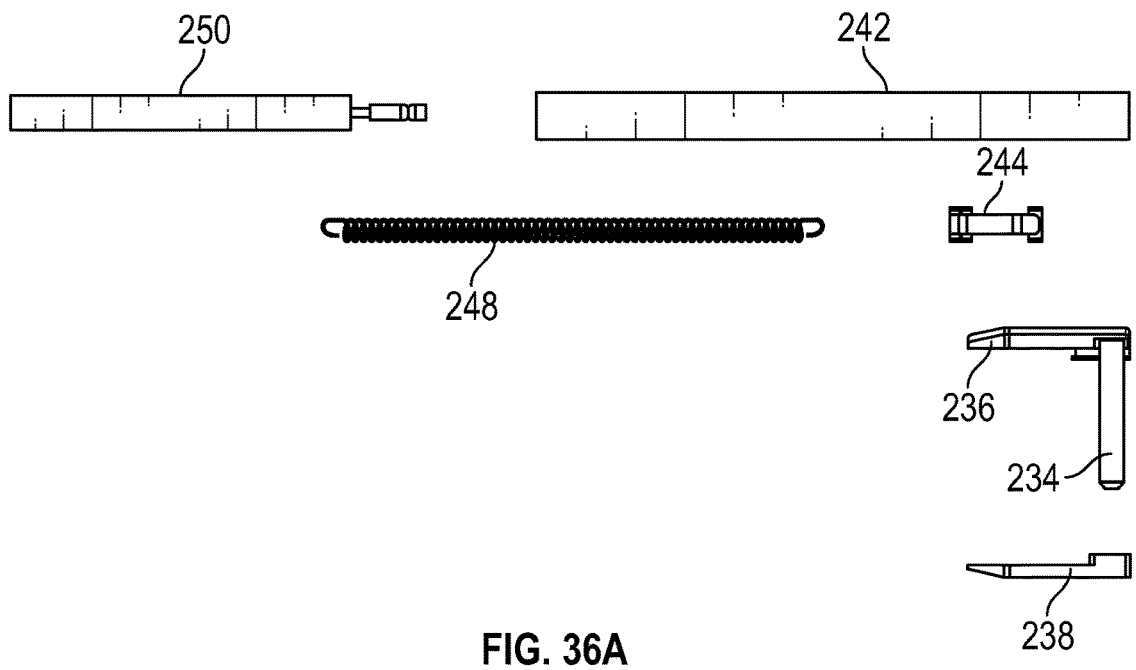

FIG. 36A is an exploded side view of one of the hinge assemblies of FIG. 29.

Figure 36B:
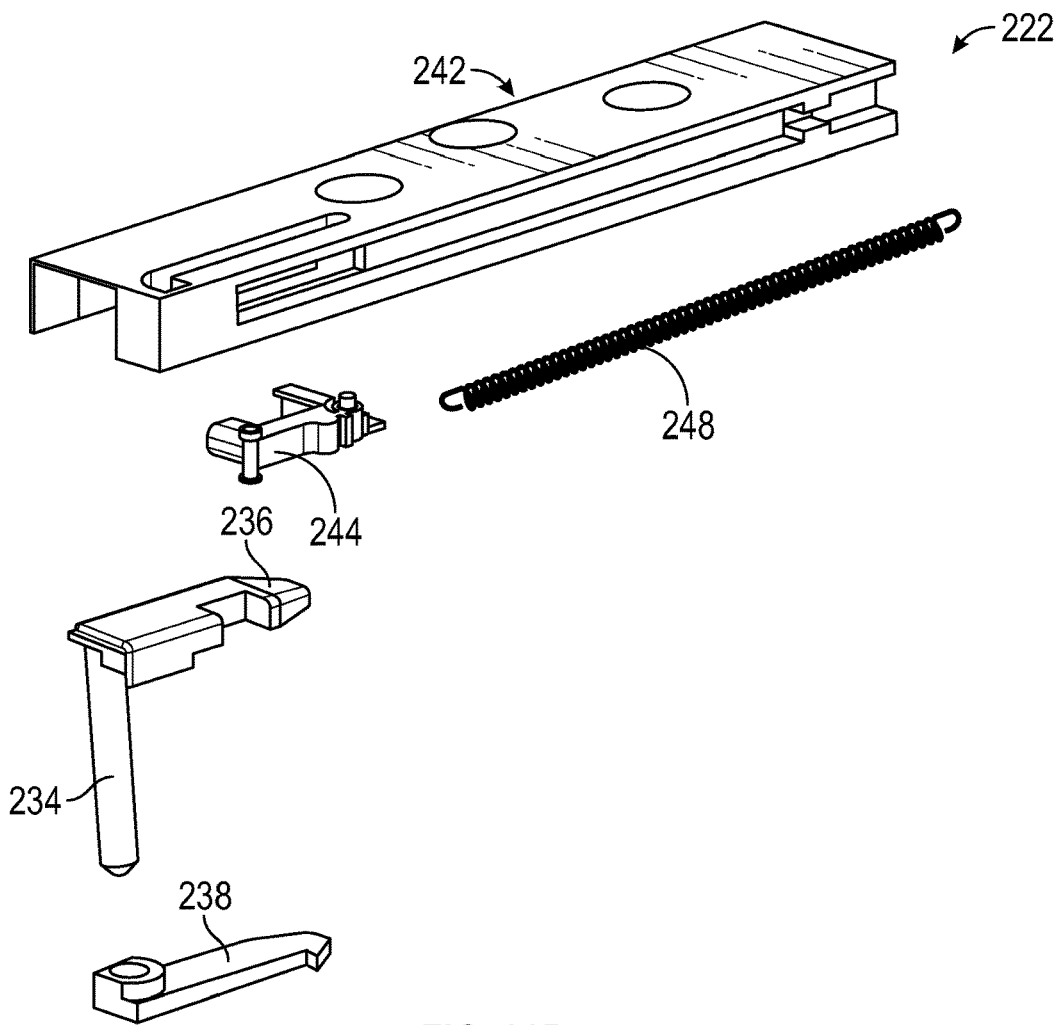

FIG. 36B is an exploded perspective view of one of the hinge assemblies of FIG. 29.

Figure 37:
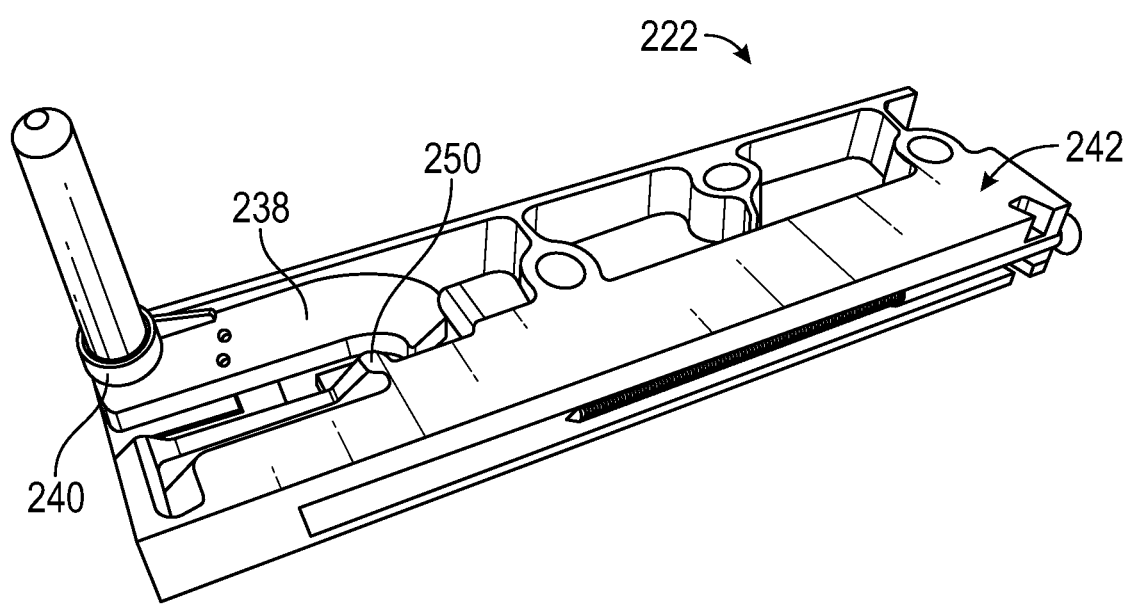

FIG. 37 is a bottom perspective view of one of the hinge assemblies of FIG. 29.

Figure 37A:
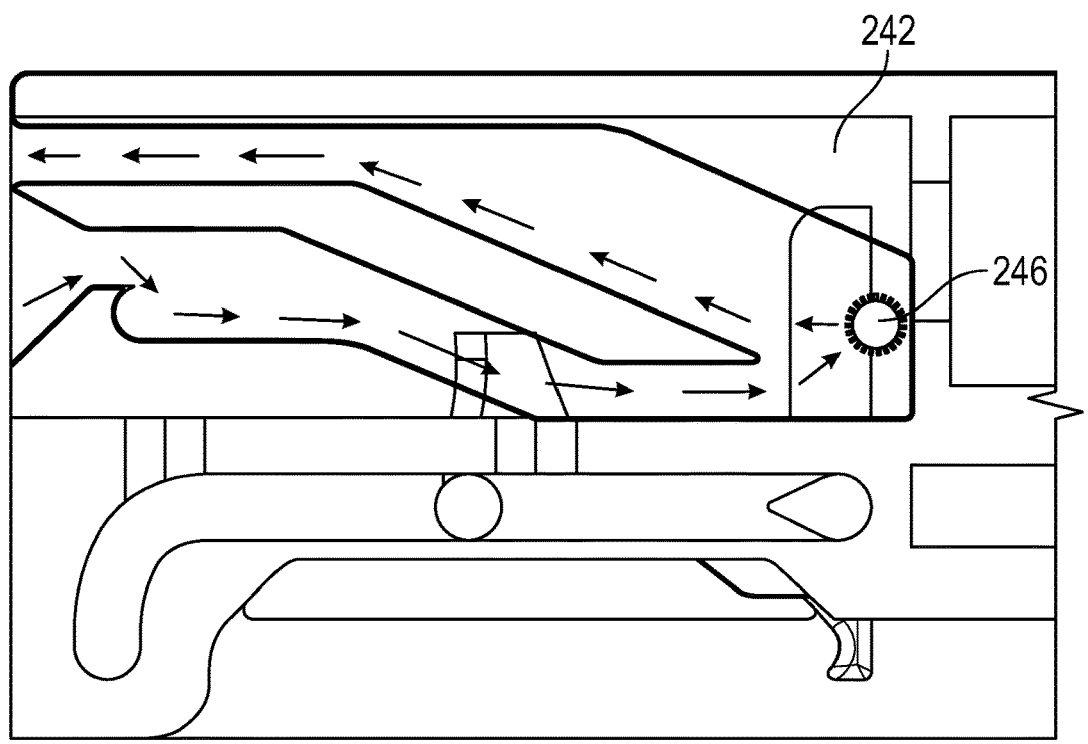
Figure 37B:
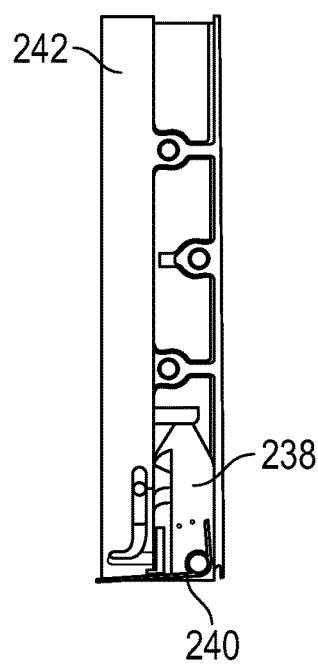
Figure 37C:
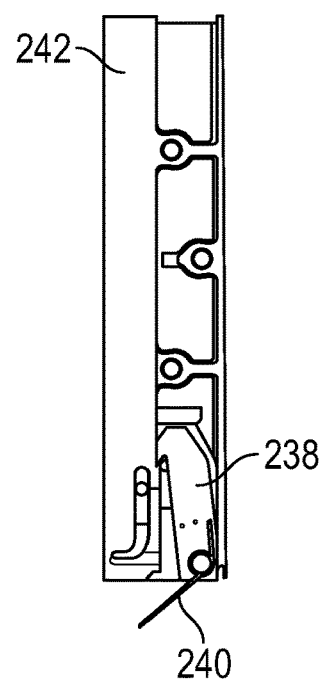

FIGS. 37A-37C further illustrate the locking mechanism of the hinge assembly.

Figure 38:
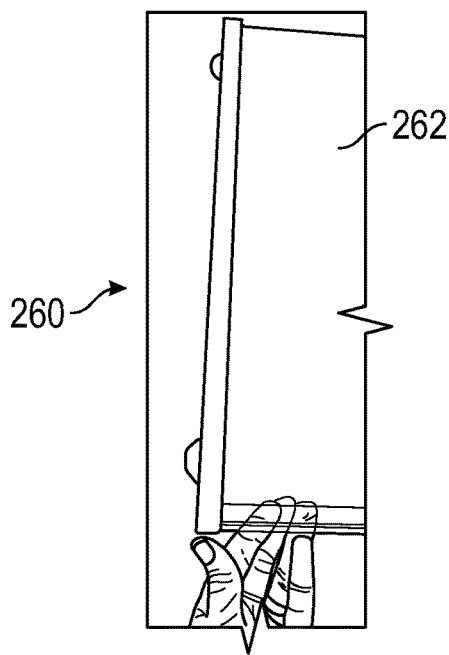

FIG. 38 is a top view of a portion of a refrigerator shelf in accordance with the present teachings, a release member of the shelf shown in an engaged position.

Figure 39:
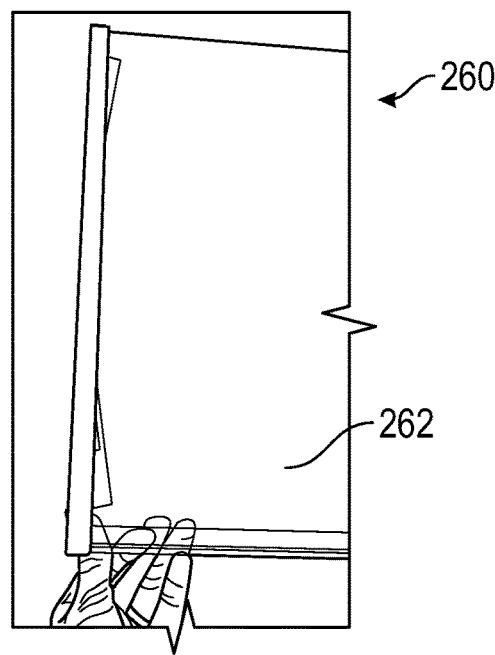

FIG. 39 is a top view similar to FIG. 38 illustrating the release member in a disengaged position.

Figure 40A:
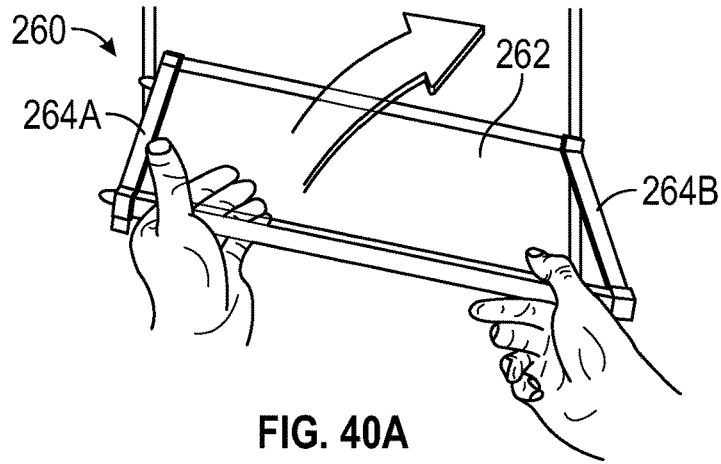
Figure 40B:
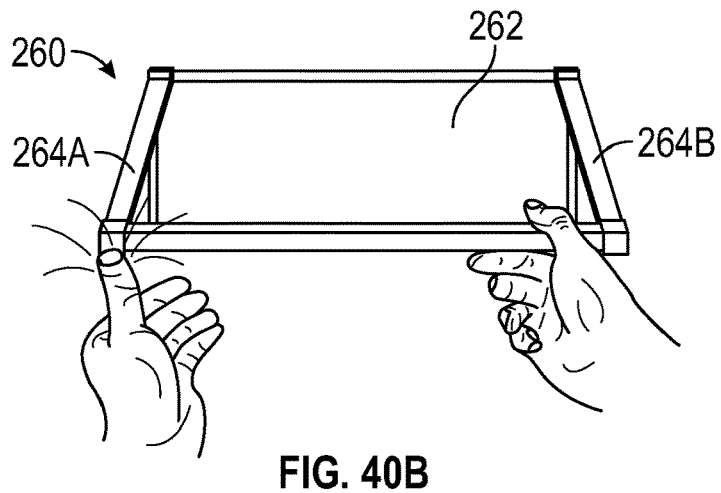

FIGS. 40A and 40B illustrate the steps of inserting a shelf into a refrigerator and removing the shelf from the refrigerator.

Figure 40C:
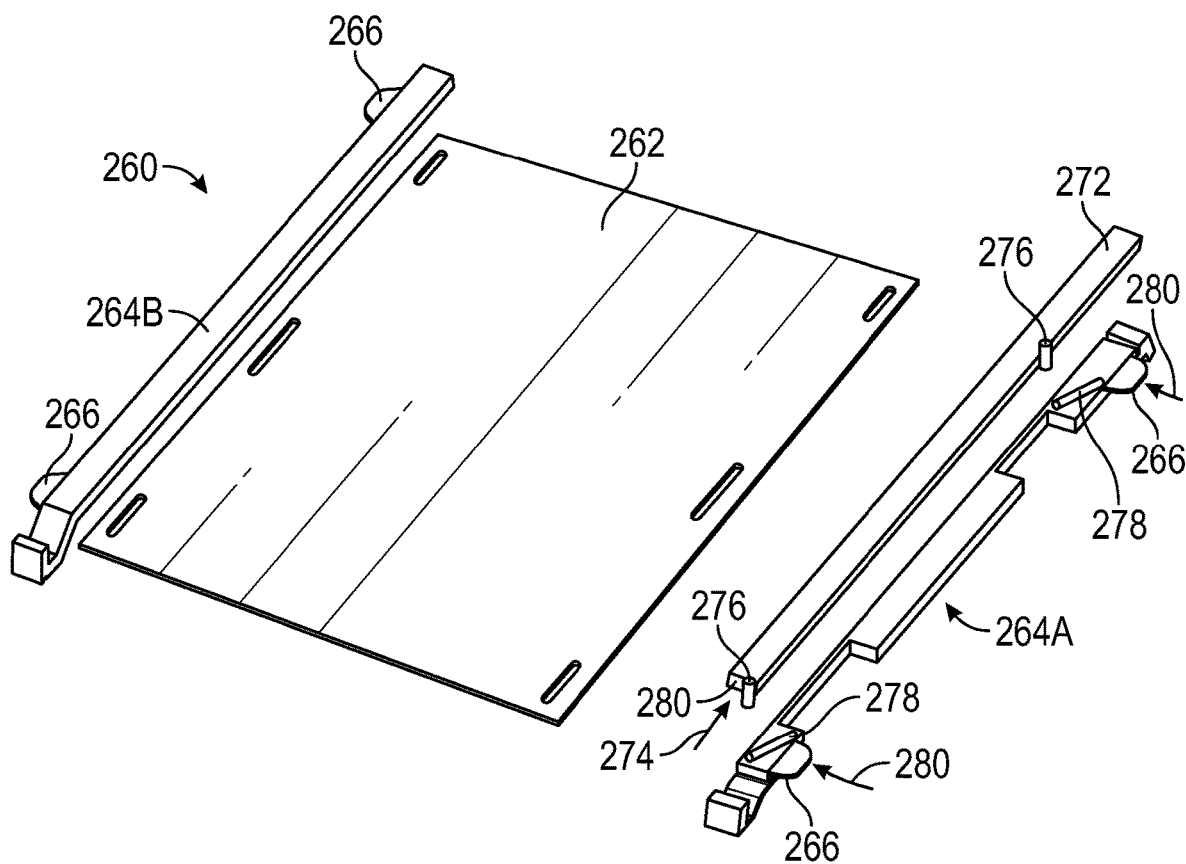

FIG. 40C is an exploded view further illustrating the refrigerator shelf of FIG. 38.

Figure 41:
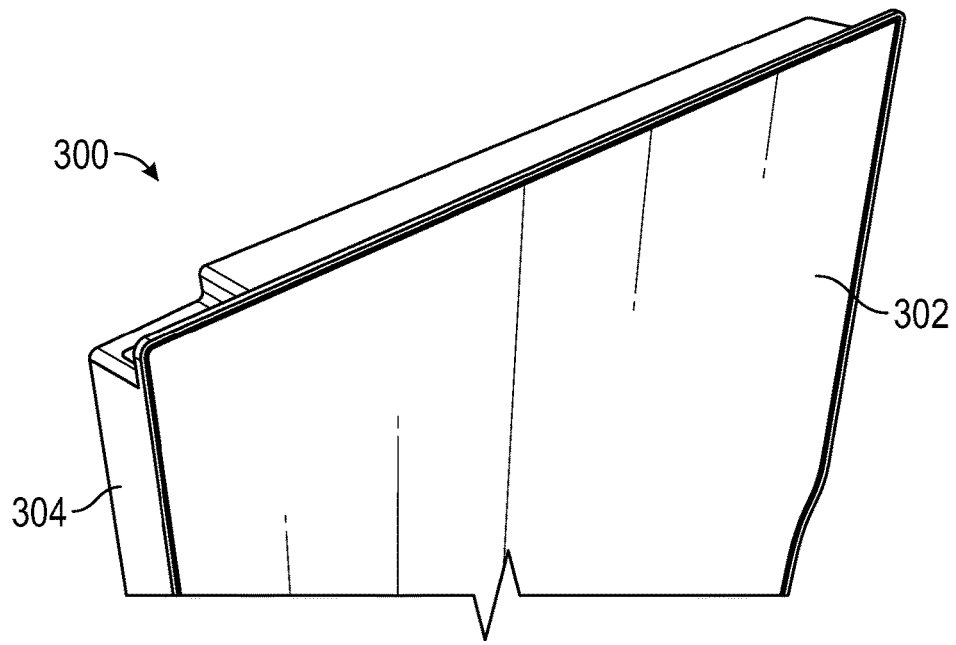

FIG. 41 is a perspective view of a decorative panel construction for a refrigerator door in accordance with the present teachings.

Figure 42:
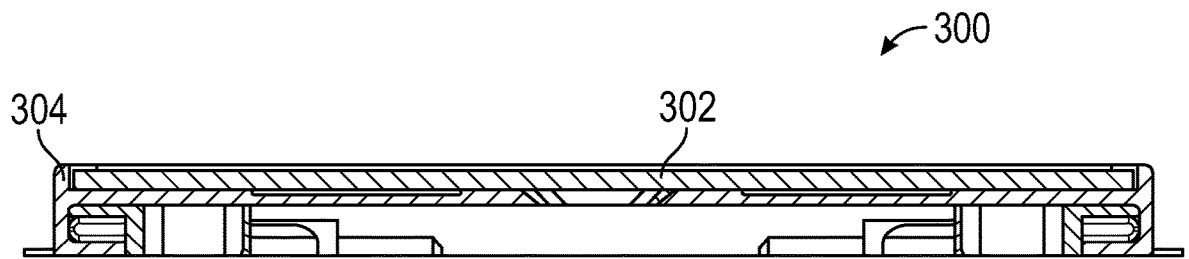

FIG. 42 is a cross-sectional view taken through the decorative panel construction of FIG. 41.

Figure 43:
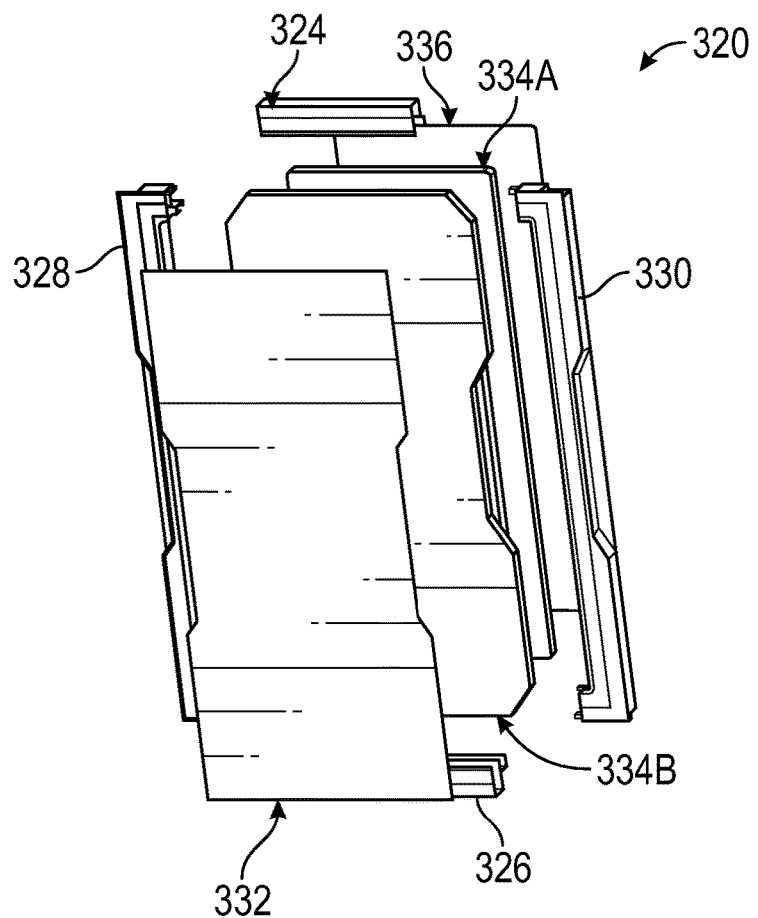

FIG. 43 is an exploded view of a refrigerator door construction in accordance with the present teachings.

Figure 44:
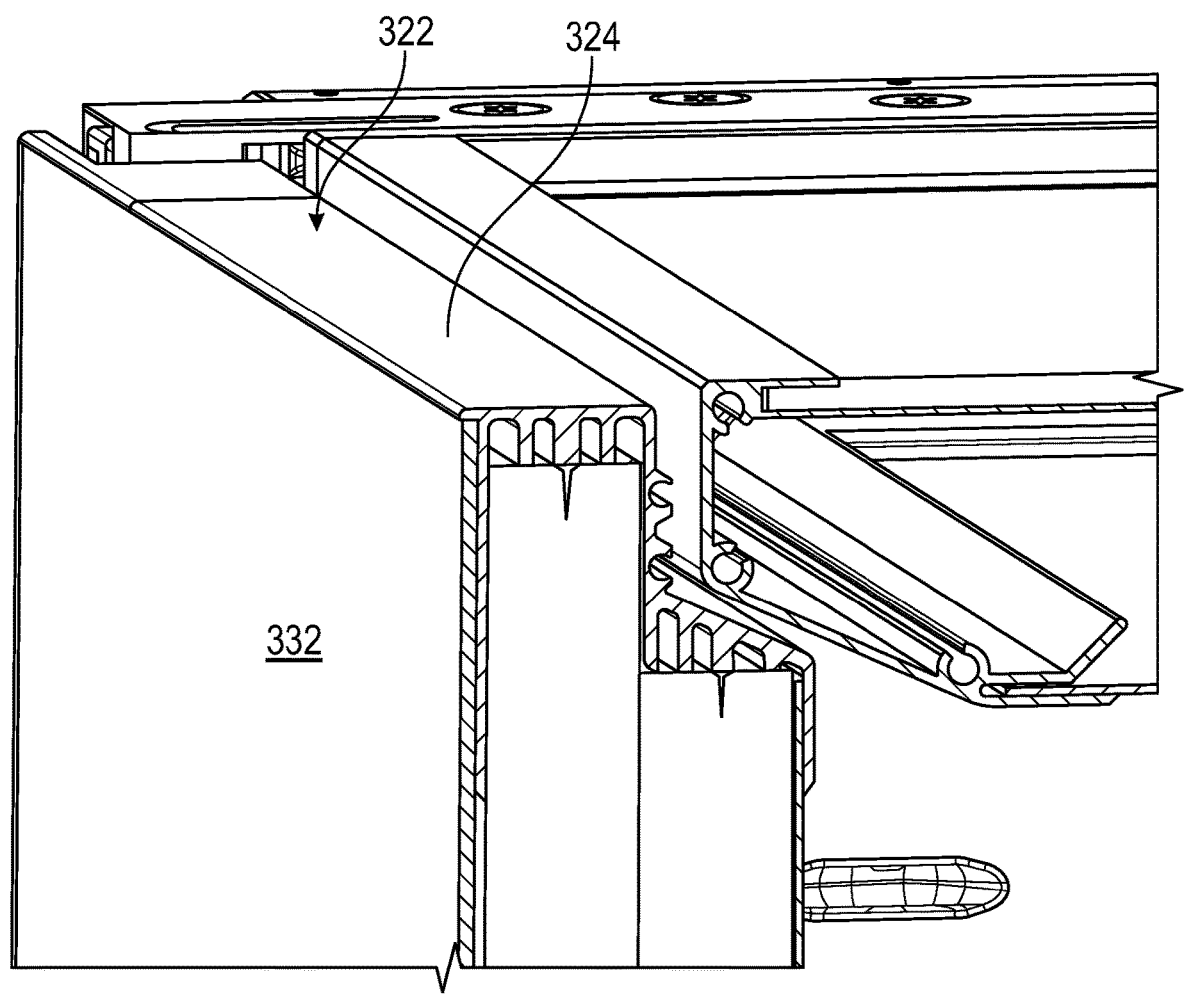

FIG. 44 is a cross-sectional view taken through a portion of a refrigerator incorporating the refrigerator door construction of FIG. 43.

FIGS. 45A-45E are perspective views of a refrigerator drawer with interior bins in accordance with the present teachings.

Figure 46:
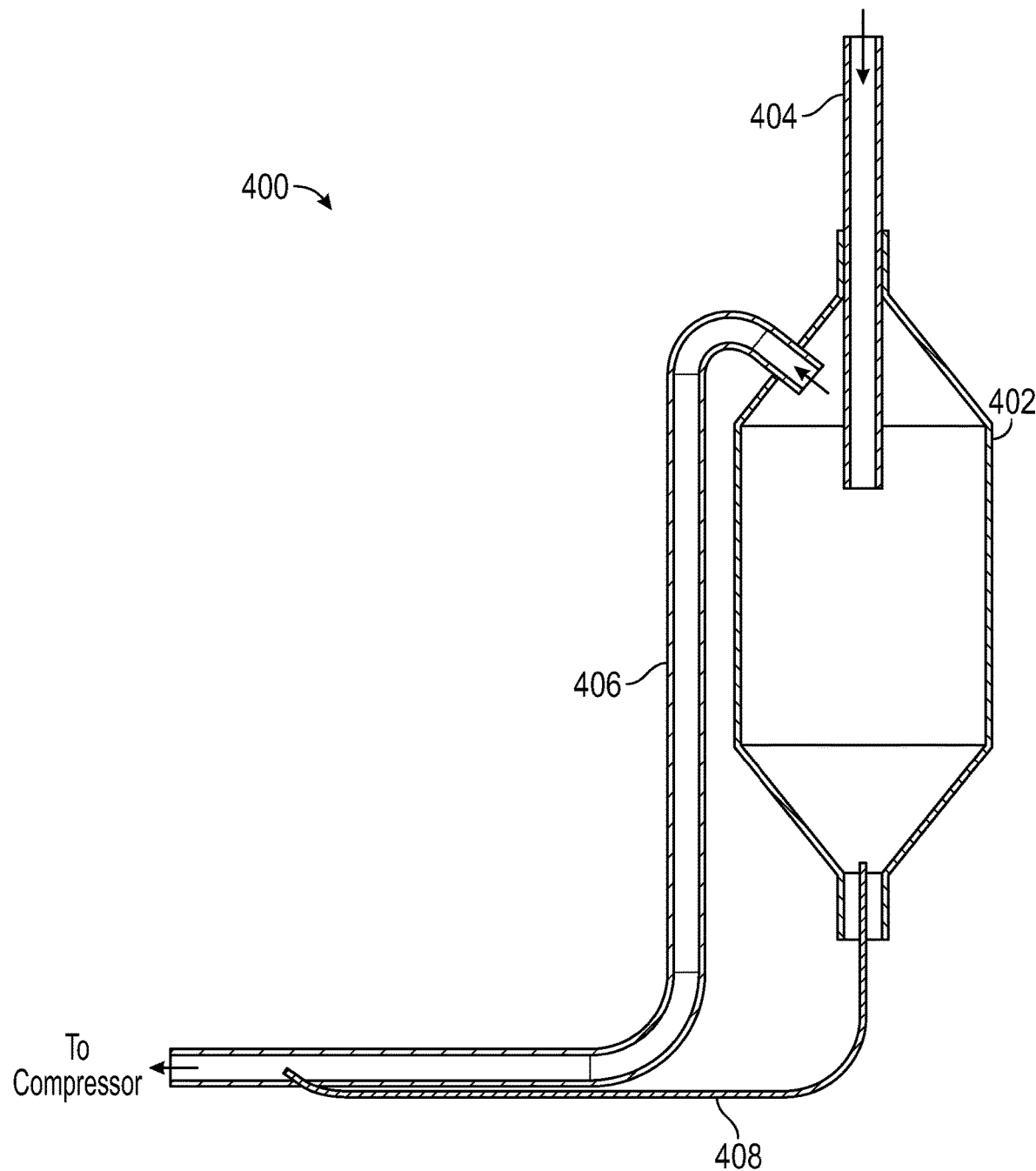

FIG. 46 is a simplified cross-sectional view of an accumulator in accordance with the present teachings.

Figure 47:
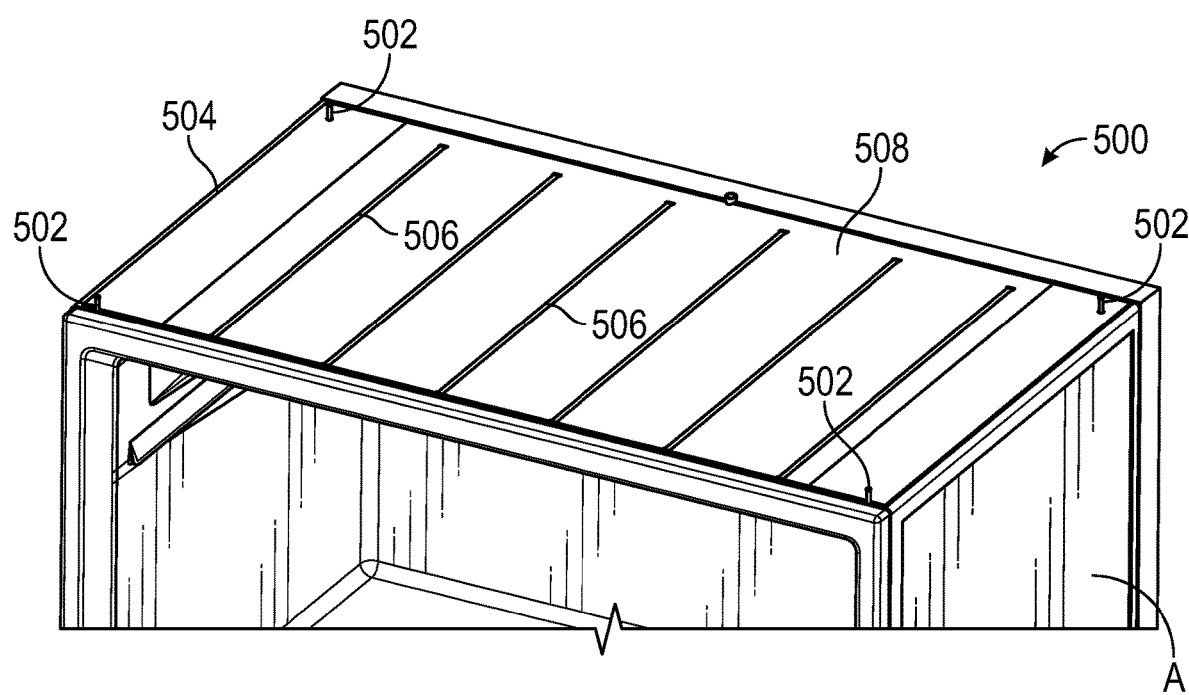

FIG. 47 is a perspective view of a portion of a refrigeration module constructed in accordance with the present teachings to include a mechanical interface for connection with an adjacent module.

Figure 48:
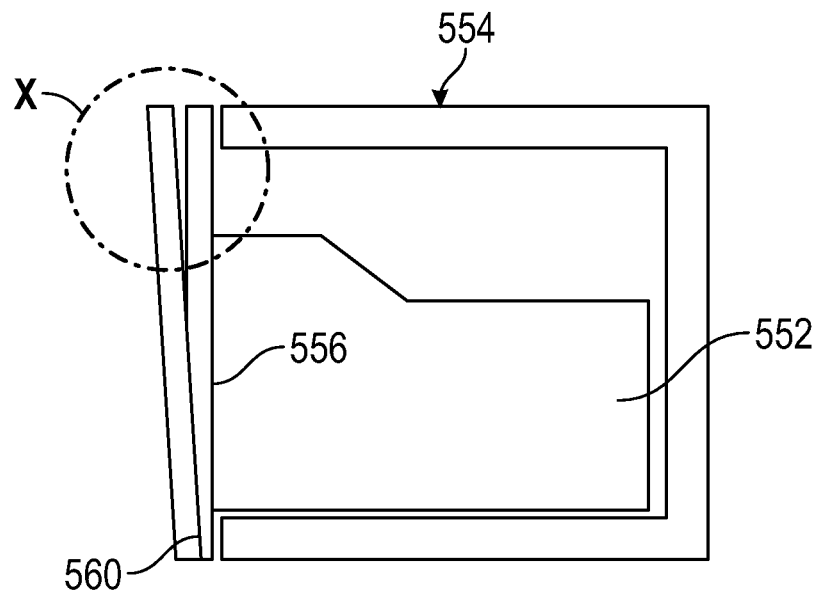

FIG. 48 is a simplified view of a bin latching arrangement in accordance with the present teachings, the bin latching arrangement shown operatively associated with a bin of a refrigerator.

Figures 48A, 48B:
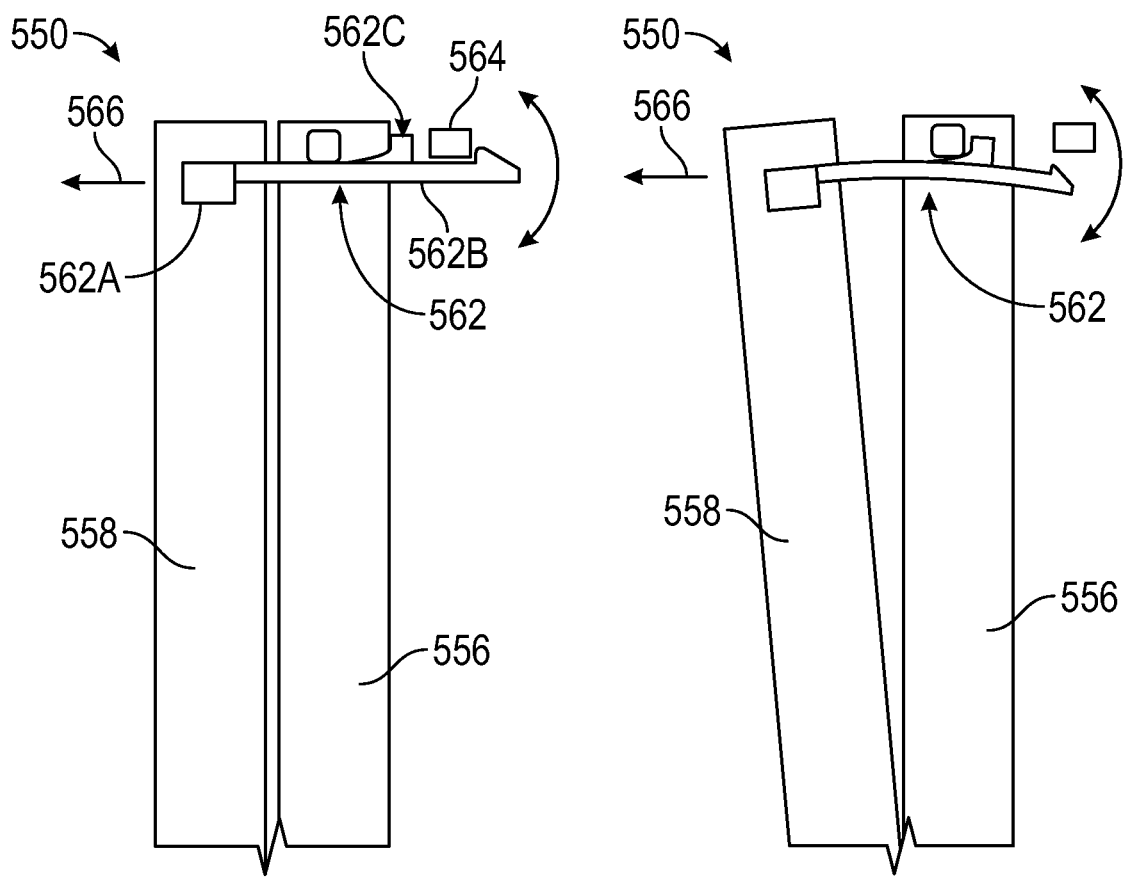

FIGS. 48A-48B are enlarged views of the detail of circle X in FIG. 48 in which FIG. 48A shows the latching arrangement in a latched position and FIG. 48B shows the latching arrangement in an unlatched position.

Figure 49A:
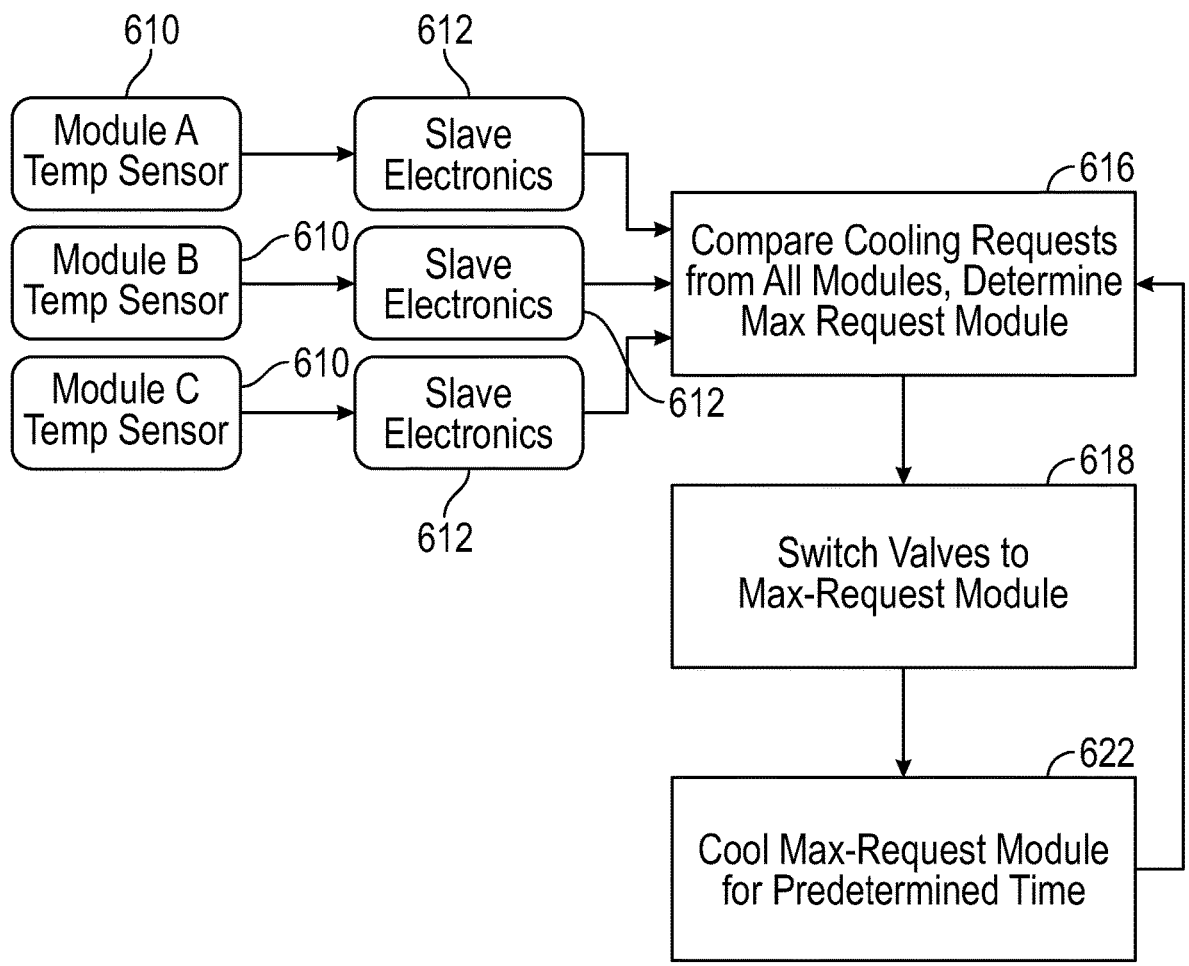

FIG. 49A is a flow diagram illustrating a method of controlling cooling of a refrigerator in accordance with the present teachings.

Figure 49B:
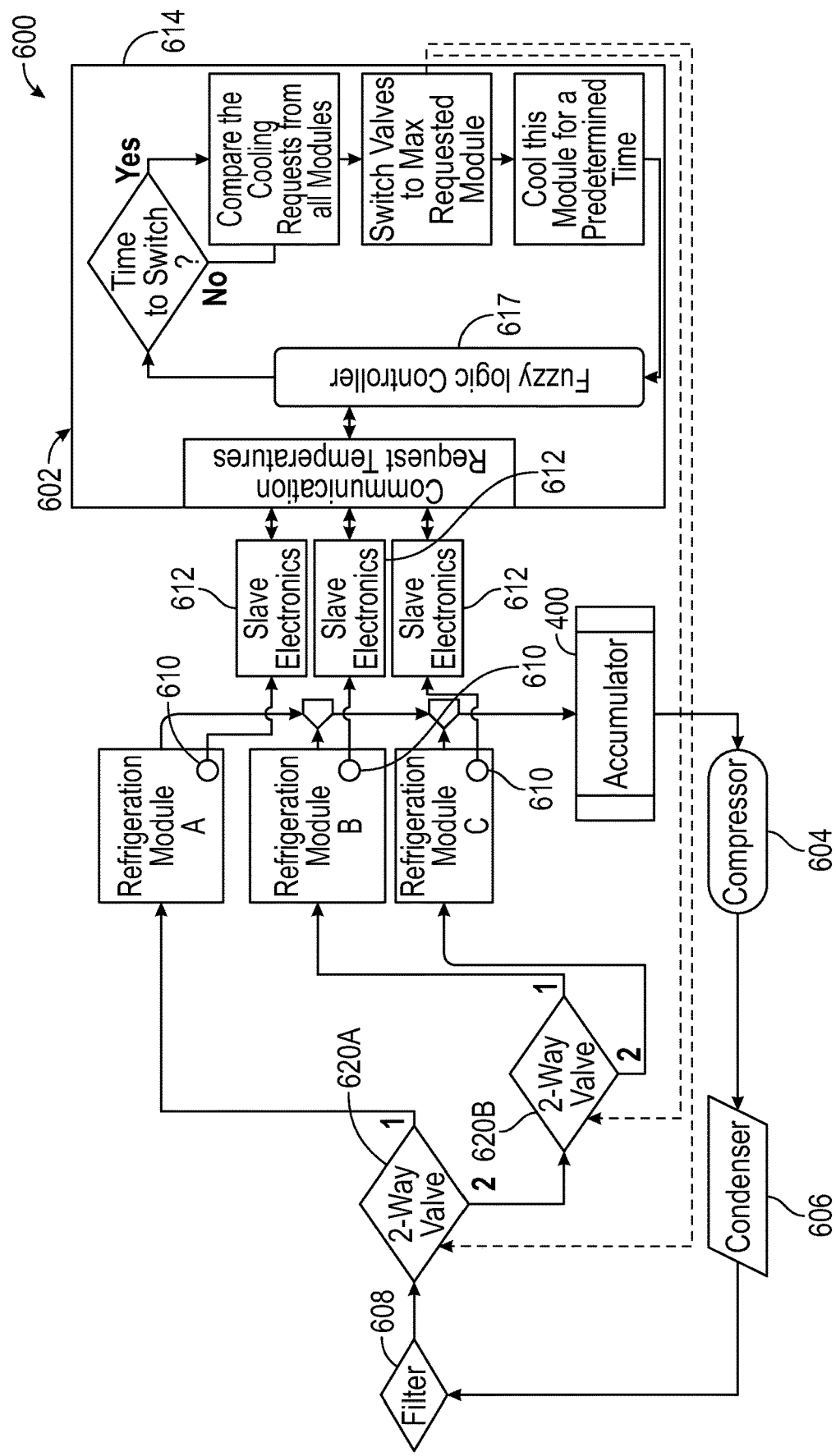

FIG. 49B is a simplified schematic view of a modular refrigerator in accordance with the present teachings.

Figure 50A:
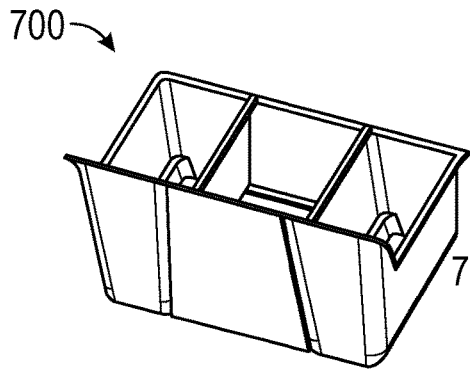
Figure 50B:
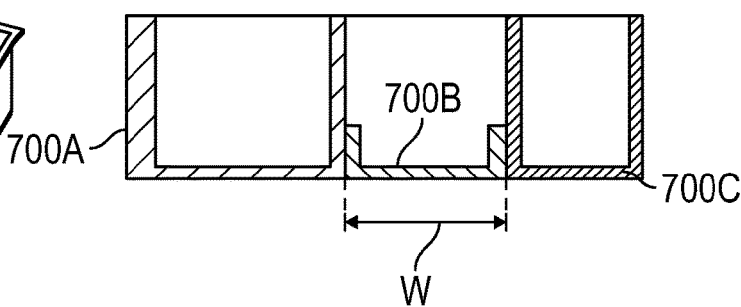

FIGS. 50A and 50B, perspective and schematic views, respectively, illustrate a bin of a refrigerator in accordance with the present teachings, the bin including a variable width component.

Figure 51A:
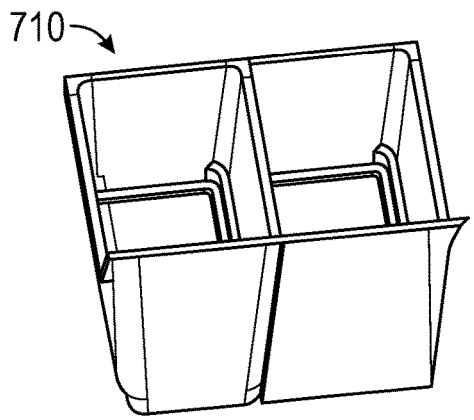
Figure 51B:
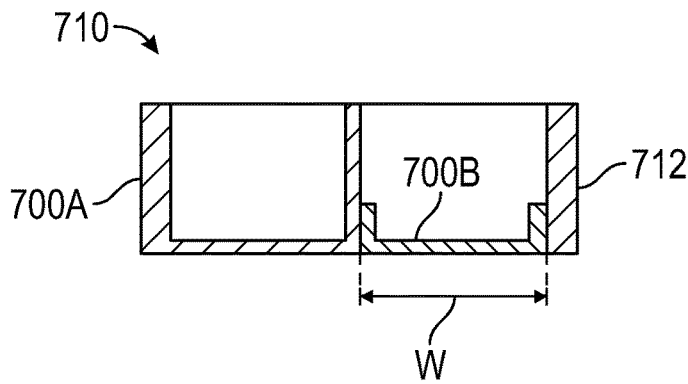

FIGS. 51A and 51B, perspective and schematic views, respectively, illustrate another bin of a refrigerator in accordance with the present teachings, the bin again including a variable width component.

Figure 52A:
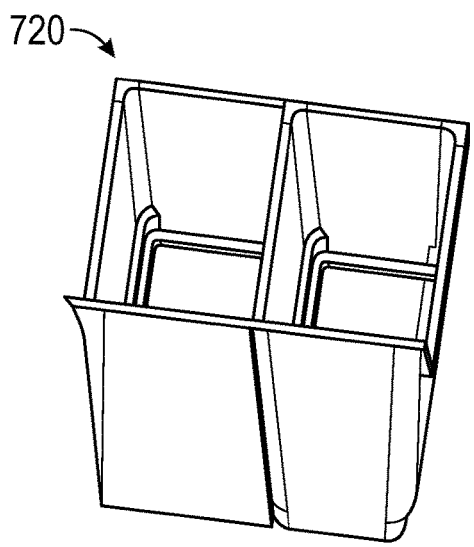
Figure 52B:
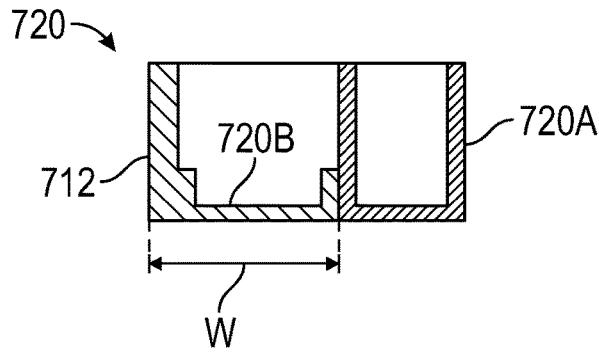

FIGS. 52A and 52B, perspective and schematic views, respectively, illustrate another bin of a refrigerator in accordance with the present teachings, the bin again including a variable width component.

Figure 53A:
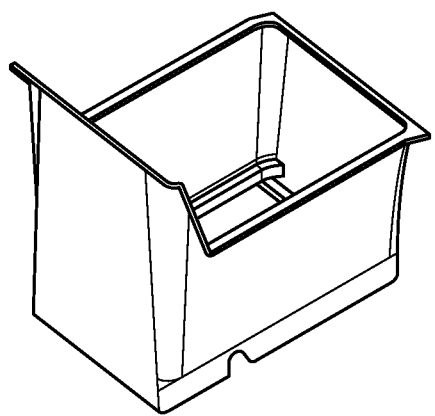
Figure 53B:
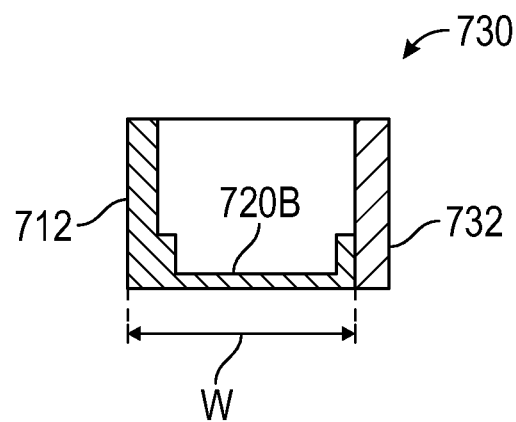

FIGS. 53A and 53B illustrate, perspective and schematic views, respectively, another bin of a refrigerator in accordance with the present teachings, the bin again including a variable width component.

Figure 54A:
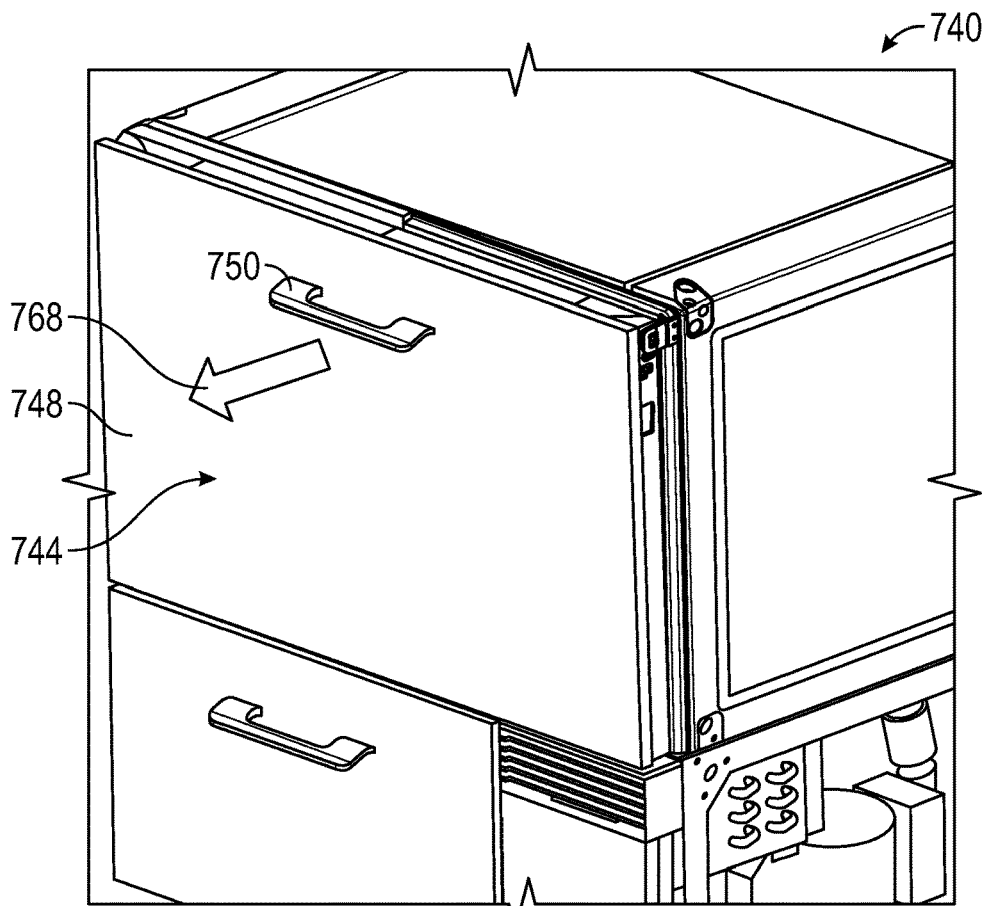

FIG. 54A is a perspective view of a refrigerator constructed in accordance with the present teachings to include a door latching arrangement to prevent inadvertent opening of a door.

Figure 54B:
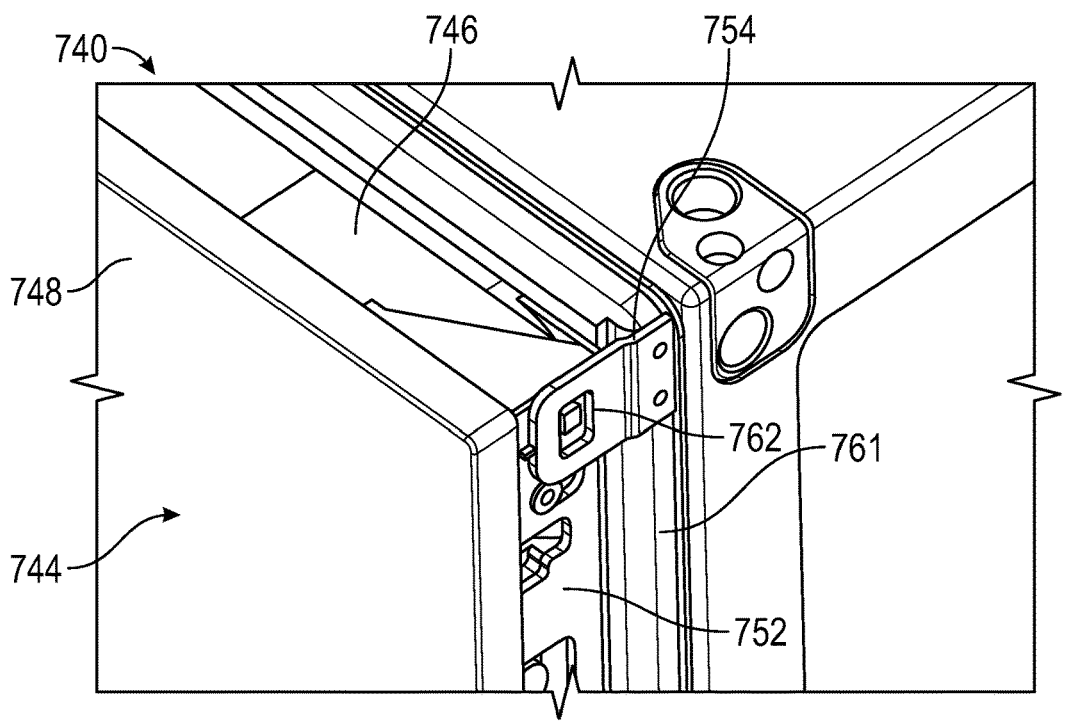

FIG. 54B is an enlarged detail view of a portion of the refrigerator of FIG. 54A.

Figure 54C:
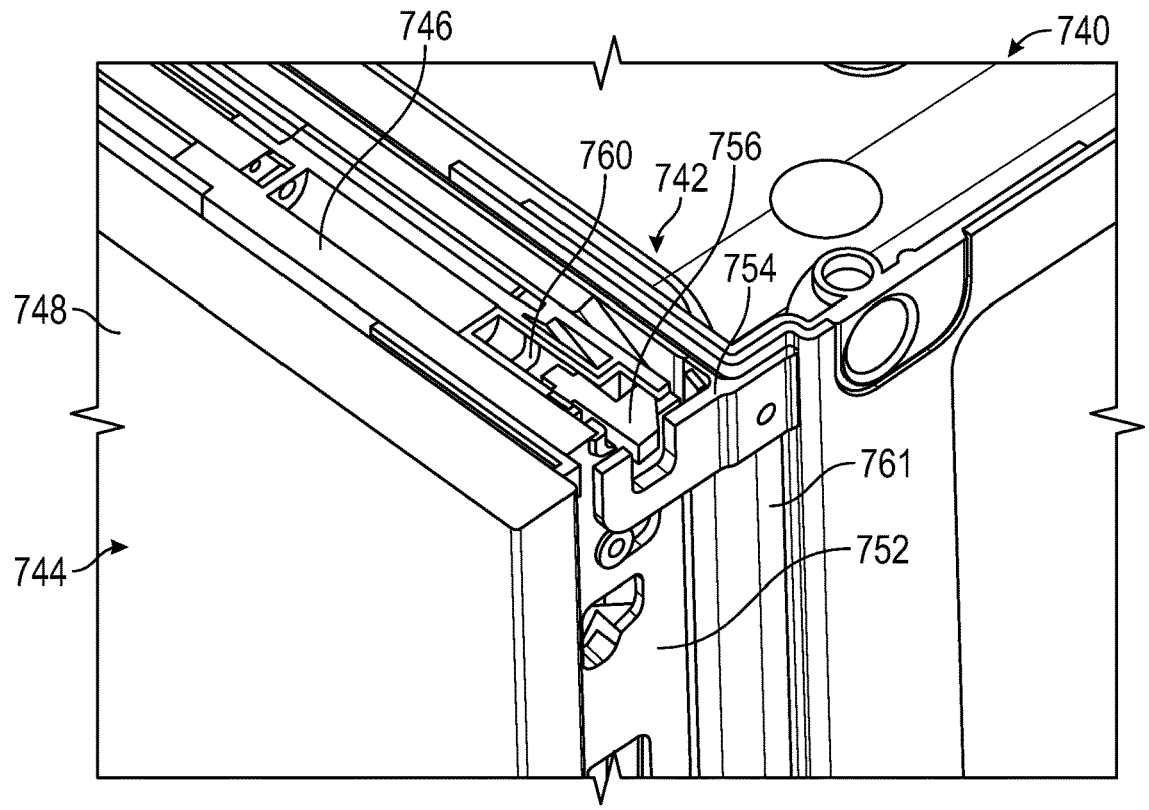

FIG. 54C is another view of the enlarged detail of FIG. 54B shown partially cut-away for purposes of illustration, the door latching arrangement shown in a latched condition.

Figure 54D:
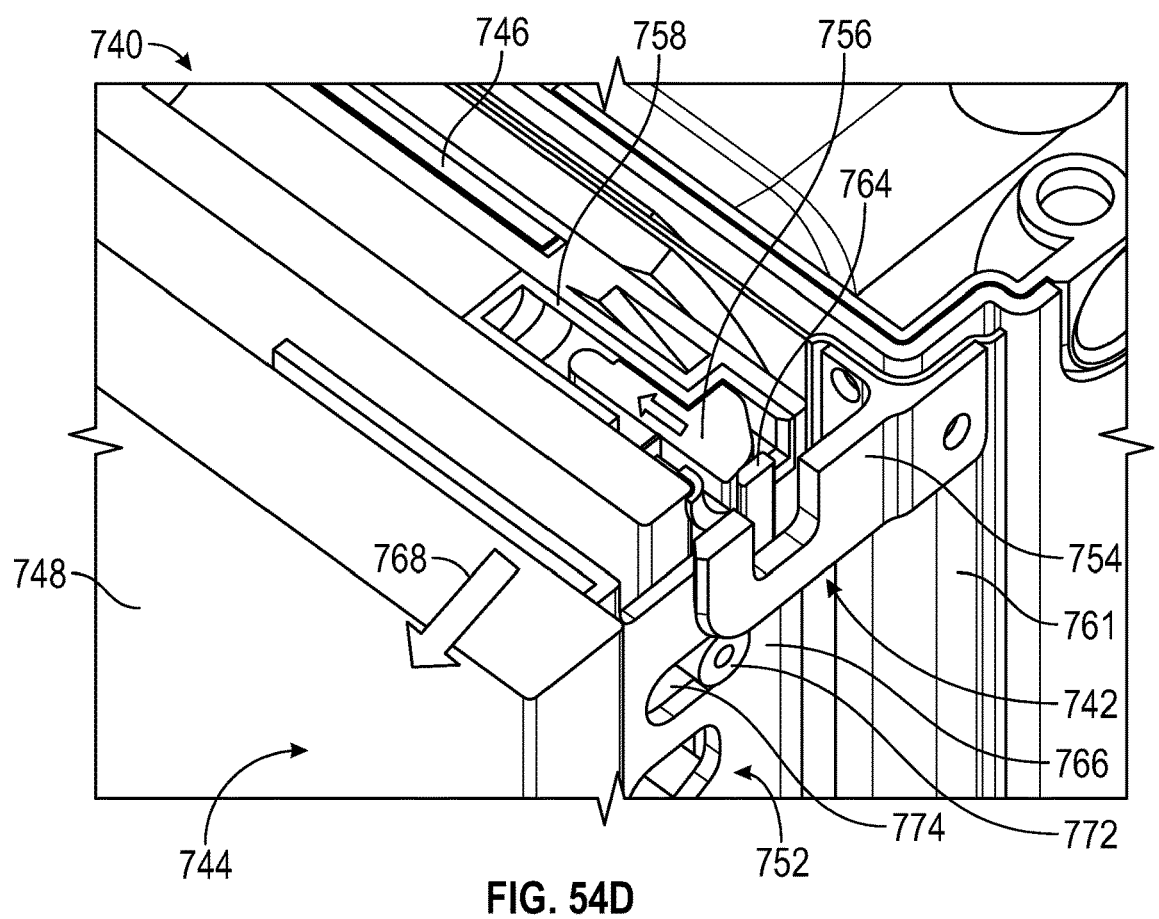

FIG. 54D is a partially cut-away view similar to FIG. 54C, the door latching arrangement shown in an unlatched condition.

Figure 54E:
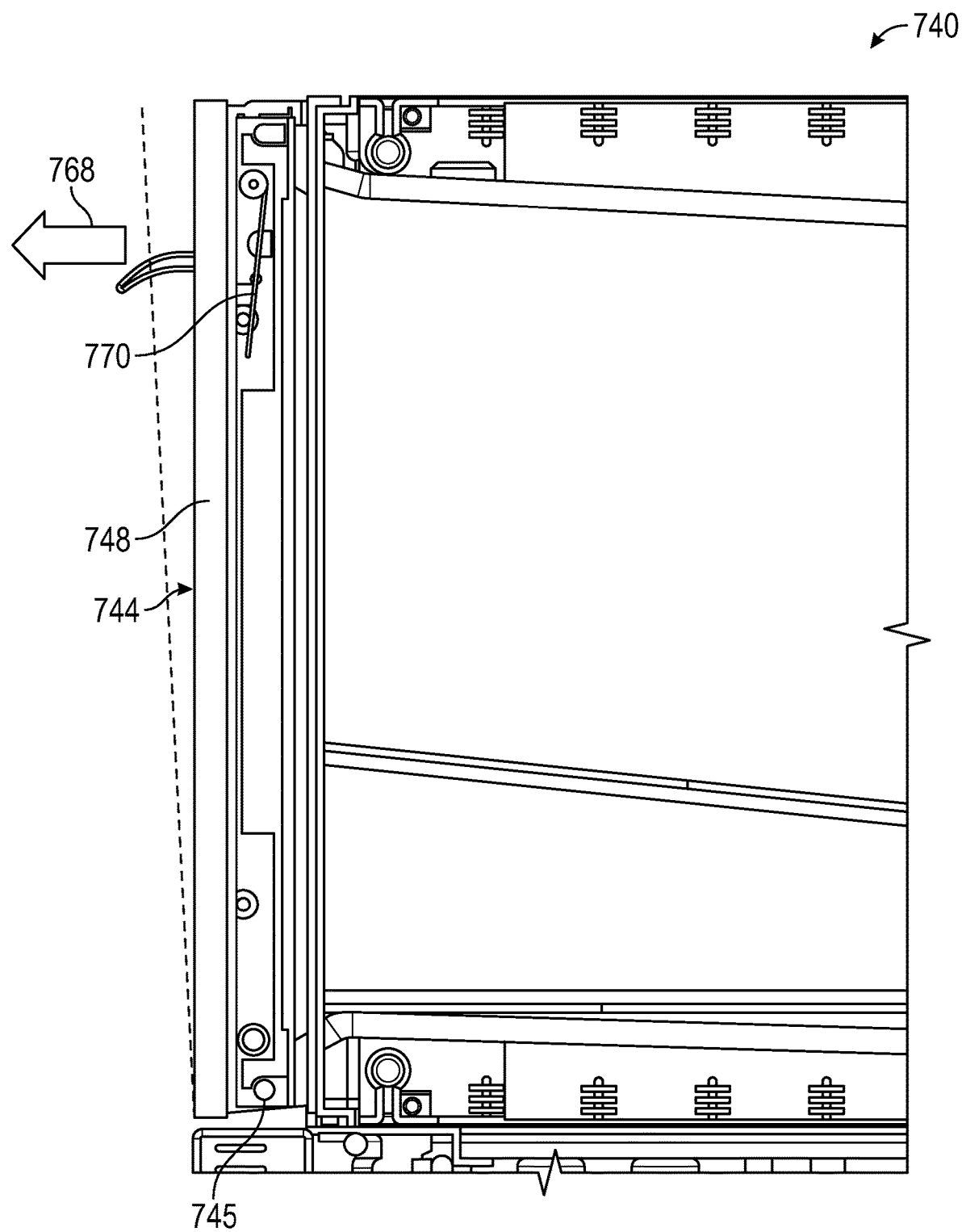

FIG. 54E is a simplified sectional view taken vertically through the refrigerator of FIG. 54A.

Corresponding reference numerals indicate corresponding parts throughout the several views of the drawings.

DETAILED DESCRIPTION OF VARIOUS ASPECTS

The following description is merely exemplary in nature and is not intended to limit the present disclosure, its application, or uses. It should be understood that throughout the drawings, corresponding reference numerals indicate like or corresponding parts and features.

Described herein are various features or methods particular adapted for refrigerators, including but not limited to mobile refrigerators for use in camper vans, recreational vehicles, trucks, tractor trailers, airplanes, boats, trains and the like. It will be understood, however, that these features and method may be used in connection with other refrigerators and for applications other than refrigerators. The various features described herein may be used separately or may be combined in any manner within the scope of the present teachings.

Figure 1:
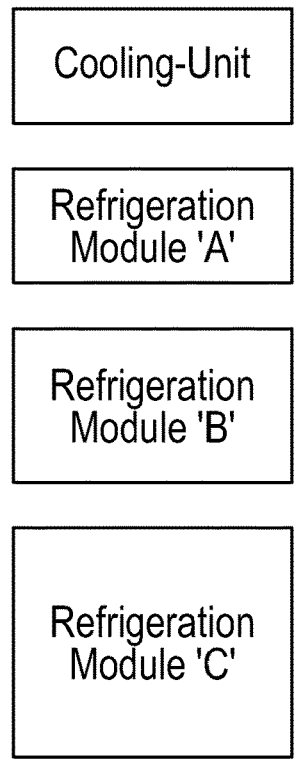
FIG. 1 is a schematic representation of the components of a modular refrigerator system in accordance with the present teachings.

With initial reference to FIG. 1, the components of a modular refrigeration system constructed in accordance with the present teachings are illustrated. As will be further appreciated below, the present teachings provide a modular refrigerator platform comprised of individual modules that may be put together into variously configured assemblies. The modular refrigeration system may generally include at least one cooling unit module and at least one refrigerator module.

The cooling unit module functions to condense gaseous refrigerant to be used by the refrigeration modules. While the cooling unit module or cooling module is intended to be operatively interconnected with one or more refrigeration modules, the cooling unit module is a module that is constructed independently from the refrigeration modules. The cooling unit module may include:

A thermally insulated housing.

A refrigerant compressor, the specific type of compressor dependent on the intended cooling power of the cooling-unit. The compressor creates a pressure differential within the cooling system. Refrigerant evaporates on the low-pressure side of the compressor and condenses on the high-pressure side of the compressor.

A condenser or heat exchanging device for condensing the compressed gaseous refrigerant into a liquid state.

A filter/dryer.

An accumulator which serves as a device which collects any refrigerant which remains in liquid form once passed through evaporative heat exchangers in the refrigerator modules. The liquid is collected in the accumulator in order to prevent liquid refrigerant entering the refrigerant compressor thus damaging the compressor.

Refrigerant 'feed-line' and 'return-line' ports to connect to the feed-line and return-line ports on the refrigerator modules and valves for controlling the flow of refrigerant.

An illuminated bar indicating an operational status to the end-user.

Noise-absorbing materials.

'Master' electronics which monitor and adjust the temperatures in all refrigerator modules towards their set points.

An electrical bus connector PCB.

In some applications, the cooling unit may contain a compartment in which an ambient temperature is significantly higher than an ambient temperature of a space in which the refrigerator is contained by utilizing heat given off by the condenser during operation. The increased ambient temperature in the compartment may be used for purposes including but not limited to: thawing or defrosting frozen food products; drying wet or damp products including but not limited to clothing and the like; keeping pre-heated food or liquids warm; and heating water. The heated water may be used for various purposes including but not limited to: central hot water supply, preheating stage to provide a pre-heated source of water to be used by a tap supplying boiled water.

Each refrigeration module is a temperature controlled module which can come in various configurations to fulfill various functionalities. A refrigeration module may include:

A thermally insulated cabinet or housing.

One or more thermally insulated doors or drawers.

One or more evaporative heat-exchangers ("evaporator").

A refrigerant feedline which feeds into a two-way refrigerant-valve, from which it continues and exits the module on opposite side.

A refrigerant-return-line which passes through the cabinet completely. The lower end of the evaporators feeds directly into the return-line.

A two-way refrigerant valve to either direct the flow of refrigerant towards the evaporative heat exchanger contained within the module or direct the flow of refrigerant towards the next 'module' in the assembly.

'Response' electronics that communicate the current state of the refrigerator module to the control electronics, and execute commands given by the control electronics.

An electrical bus connector PCB.

Figure 1A:
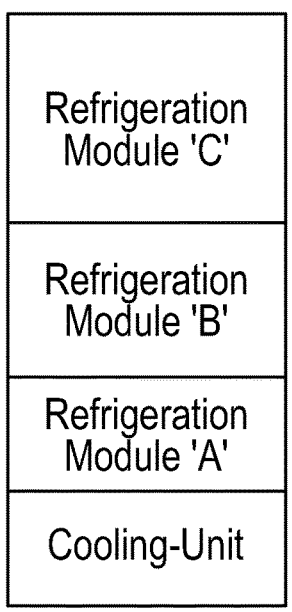
FIG. 1A is schematic representation of a first exemplary assembly of the modular refrigerator system of the present teachings.
Figure 1B:
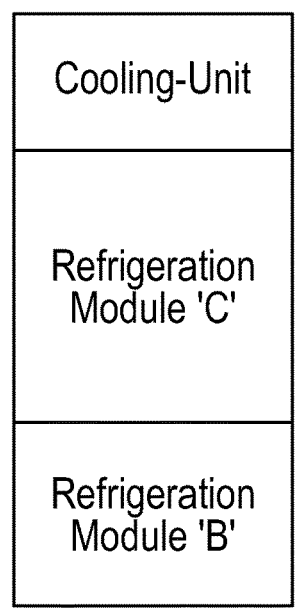
FIG. 1B is schematic representation of a second exemplary assembly of the modular refrigerator system of the present teachings.
Figure 1C:
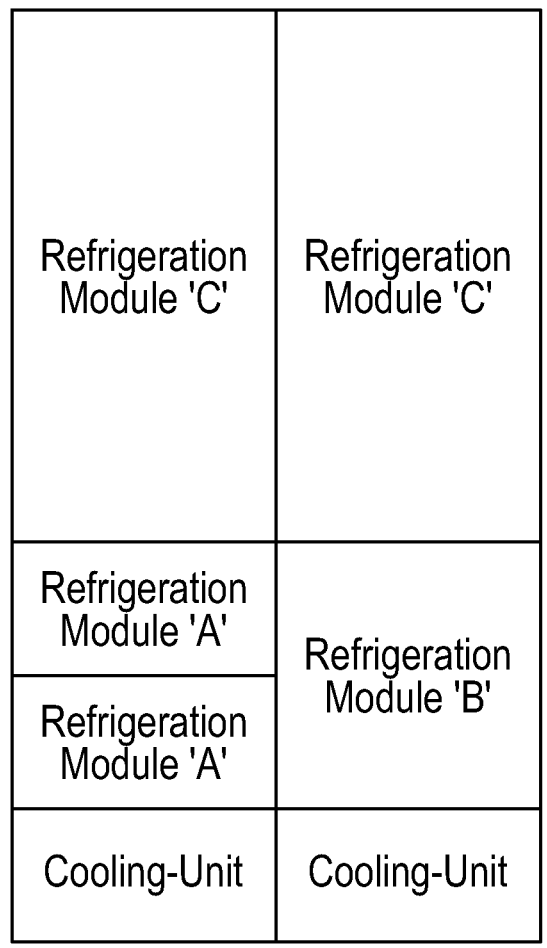
FIG. 1C is schematic representation of a third exemplary assembly of the modular refrigerator system of the present teachings.
Figure 1D:
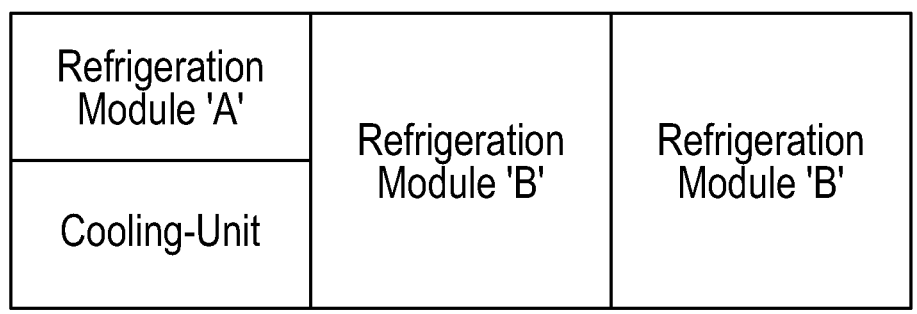
FIG. 1D is schematic representation of a fourth exemplary assembly of the modular refrigerator system of the present teachings.

With reference to FIGS. 1A-1D, various exemplary assemblies of the modular refrigeration system 10 are schematically illustrated. FIG. 1A illustrates a first assembly including a vertical stack of refrigeration modules with the cooling unit on the bottom. FIG. 1B illustrates a vertical stack of refrigeration modules with the cooling unit on the top. FIG. 1C illustrates a combination of horizontally and vertically stacked refrigeration modules with two cooling modules. FIG. 1D illustrates a horizontal stack of refrigeration modules with the cooling unit below one of the refrigeration modules.

Turning to FIGS. 1E through 1H, further exemplary assemblies of the modular refrigeration system 10 are schematically illustrated. By these further embodiments, it will be understood that additional configurations within the scope of the present teachings can be made. In this regard, the present teachings are not limited to rectangular configurations. Explaining further, the corner of one module may connect somewhere between the corners of another module, for example. Modules can be connected to one another at any point. With particular reference to FIG. 1G, a connection is made between modules that are not rectangular themselves. In this way, a refrigerator may be constructed to more precisely fit around a fixed element in a vehicle. For example, such a refrigerator may be able to better accommodate wheel arches, chassis elements, boat hull shapes, and the like. Such accommodations may also be achieved within the scope of the present teachings by varying the widths of rectangular modules, such as shown in FIG. 1H, but perhaps less efficiently. In FIG. 1H, a connection is shown between module "C" and module "A" where module "A" connects to module "C" in a way that none of the corners of module "C" connect to the corners of module "A".

Versions of a cooling unit can exist which are situated under a countertop of a kitchen where the cooling unit incorporates a sink. In such an arrangement, which is shown schematically in FIG. 1I, a condensing device D may be connected to the sink A in a way that the condensing device D allows energy E which is released during the condensation of the refrigerant to be transferred to material of the sink A. The sink A acts as a heat-exchanging device which transfers the energy from the sink to the ambient air, or to the water which is held in the sink bowl. The condensing device D may include a coil wrapped around the sink A. The coil may have an inlet B and an outlet C for transport refrigerant.

The modules (e.g., cooling unit module and refrigeration modules) may be connected to one another in any manner well known in the art within the scope of the present teachings. Significantly, the module may be independently constructed and later assembled as desired to provide a large degree of design flexibility.

According to the present teachings, various module connection mechanisms are disclosed for connecting first and second refrigeration modules. For example, FIGS. 1J and 1K illustrate a module connection mechanism 10 for a corner-to-corner connection between a first refrigeration module A and a second refrigerator module B in accordance with the present teachings is illustrated. Corner-to-corner connections may be made through a connection that is pulled from two directions. As illustrated, the connection mechanism 10 may include an elongated coupling element or elongated tension element 12 and one or more locking nuts or tightening elements 14. The connection mechanism 10 is illustrated to further include first and second mounting members 16A and 16B. One of the mounting members 16 is secured to the first refrigeration module A and the other mounting member is secured to the second refrigeration module B. As illustrated, the first mounting member 16A is secured to a first corner of the first refrigeration module A and the second mounting member 16B is secured to a second corner of the second refrigeration module B. The first and second mounting members 16A and 16B are predefined geometries that may be integrated within the housings of the refrigeration modules A and B. The first and second mounting members 16 may be secured to the first and second refrigeration modules A and B with fasteners or in any suitable way known in the art.

The elongated coupling element 12 is elongated along an axis 18 and includes a first end 12A interconnected to the first mounting member 16A and a second end 12B interconnected to the second coupling element 16B. In the embodiment illustrated, the connection mechanism 10 includes first and second tightening elements 14A and 14B. In the embodiment illustrated, the tightening elements 14A and 14B are locking cam nuts such as conventionally used with flat-packaged furniture designs. The first and second tightening elements 14A and 14B are rotatably carried by the first and second mounting members 16 and 16B, respectively. The first end 12A of the elongated coupling element 12 is connected to the first mounting member 16A by the first tightening element 14A. The second end 12B of the elongated coupling element 12 is similarly connected to the second mounting member 16B by the second tightening element 14B. The first and second tightening elements 14A and 14B may be conventionally rotated with a screw driver to apply a tension force to the elongated coupling element 12 along the axis 18 to secure the first refrigeration module to the second refrigeration module.

Figure 1I:
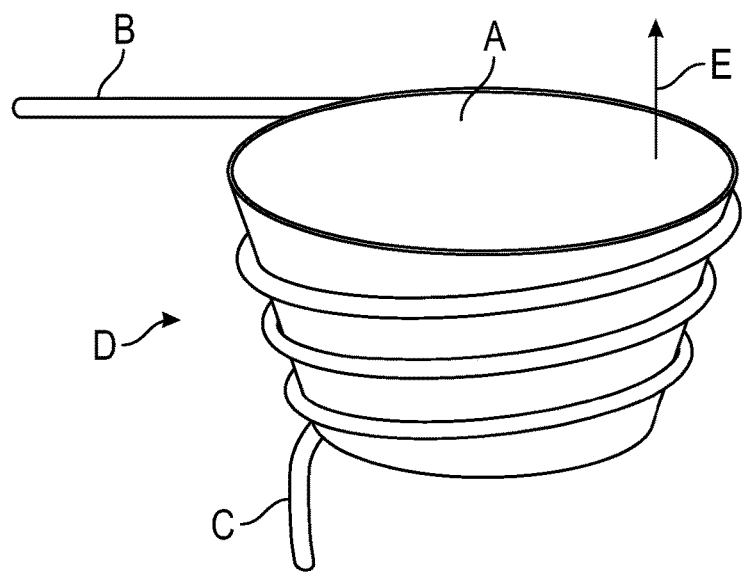
FIG. 1I is a schematic representation of cooling unit of the present teachings adapted to be located under a countertop of a kitchen for releasing energy from the condensation of the refrigerant to the sink and ultimately to the atmosphere.
Figures 1J, 1K:
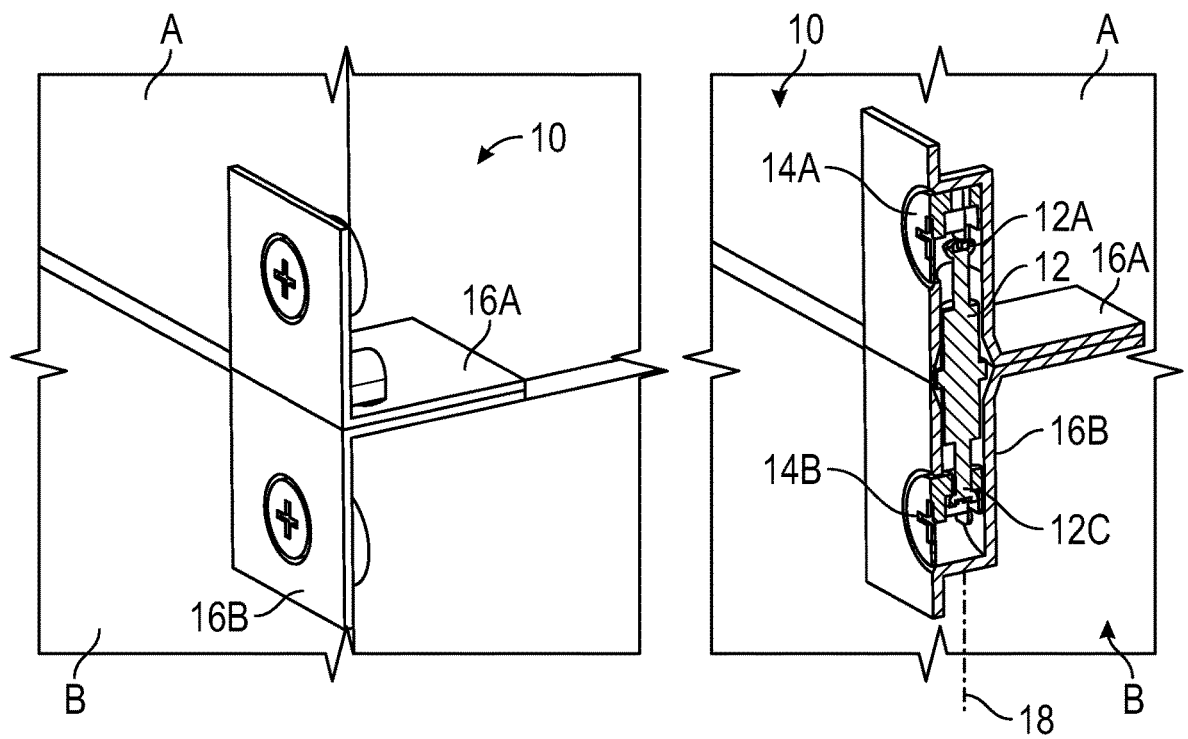
FIGS. 1J and 1K are perspective and sectional views illustrating a module connection mechanism for a corner-to-corner connection, respectively, in accordance with the present teachings.
Figure 1L:
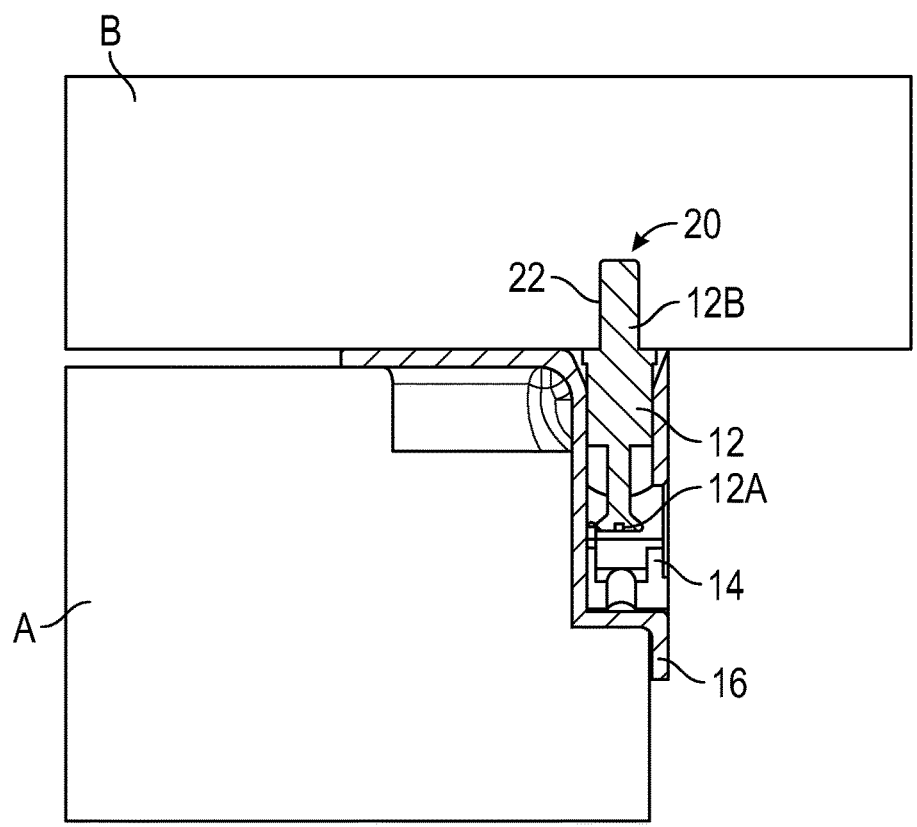
FIG. 1L is a simplified sectional view of a module connection mechanism for a corner-to-face connection in accordance with the present teachings.
Figure 1M:
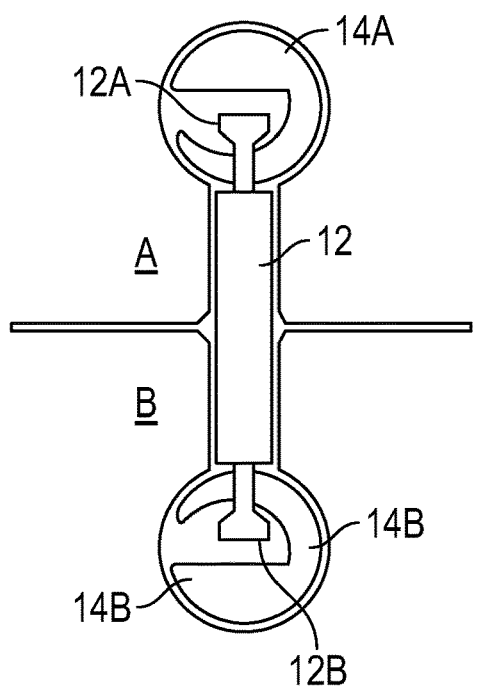
FIG. 1M is a simplified sectional view of another module connection mechanism for a corner-to-corner connection in accordance with the present teachings.
Figure 1N:
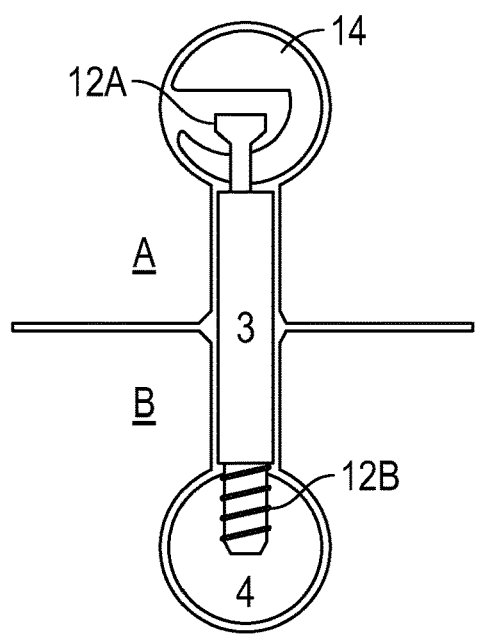
FIG. 1N is a simplified sectional view of another module connection mechanism for a corner-to-corner connection in accordance with the present teachings.

Turning to FIG. 1L, a simplified sectional view of a module connection mechanism 20 for a corner-to-face connection between first and second refrigeration modules A and B in accordance with the present teachings is illustrated. Like reference characters are used in FIG. 1L to identify similar elements from the embodiment of FIGS. 1J and 1K. As compared to the embodiment of FIGS. 1J and 1K, the connection mechanism 20 includes only a single mounting member 16. The mounting member 16 is secured to the first refrigeration module A. A tightening element 14 is rotably carried by the mounting member 16. The first end 12A of the elongated coupling element 12 is connected to the mounting member 16 by the tightening element 14. The second end 12C of the elongated coupling element 12 may be secured directly to the housing of the second refrigeration module B. For example, a hole 22 can be drilled in refrigeration module A, to receive the second end 12C of the connecting element 12. The tightening elements 14 may be conventionally rotated with a screw driver to apply a tension force to the elongated coupling element 12 along the axis 18 to secure the first refrigeration module A to the second refrigeration module B.

Figure 1P:
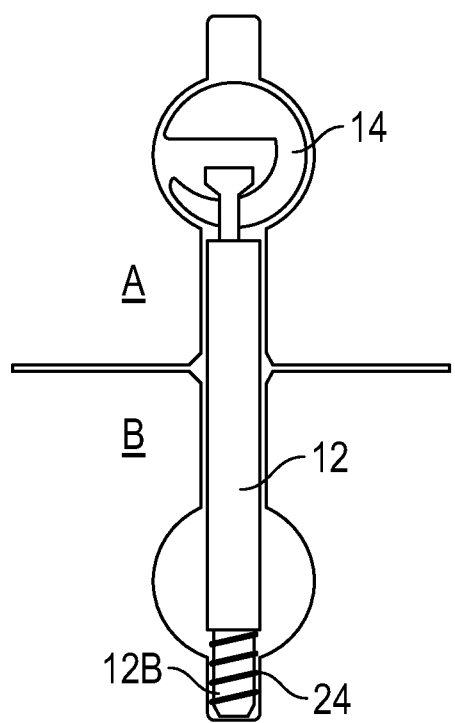
FIG. 1P is a simplified sectional view of another module connection mechanism for a corner-to-corner connection in accordance with the present teachings.
Figure 1Q:
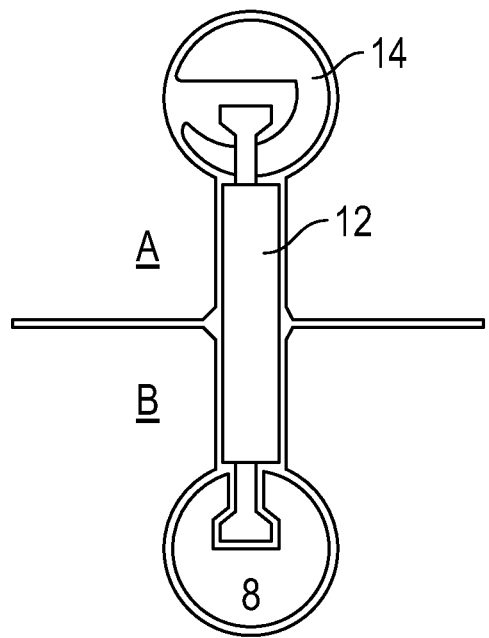
FIG. 1Q is a simplified sectional view of another module connection mechanism for a corner-to-corner connection in accordance with the present teachings.

Turning to FIGS. 1M, 1N, 1P, and 1Q, additional module connection mechanisms for a corner-to-corner connection in accordance with the present teachings are illustrated. Again, like reference characters are used to identify elements similar to those introduced above in connection with the embodiment of FIGS. 1J and 1K. The embodiment of FIG. 1M uses two tightening elements 14B and 14B and one coupling element 12, and is similar to the embodiment of FIGS. 1J and 1K. The embodiment of FIG. 1N uses a single tightening element 14 and a coupling element 12 having a second end 12B including a screw thread. The head screws into element 4, which is a separate part. In the embodiment of FIG. 1P, the interface geometry of one of the mounting plates is changed by incorporating a screw hole 24. This transfers loads to the housing directly. The screw thread of the second end 12B of the coupling element 12 may be screwed into this screw hole 24. This connection mechanism may be tightened with a tightening element 14. In the embodiment of FIG. 1Q, the connection mechanism includes a tightening element 14, a coupling element 12, and a fastening element or anchor 26 that locks the coupling element 12 in place and transfer loads through the fastening element 26 to the refrigerator housing.

Figure 1R:
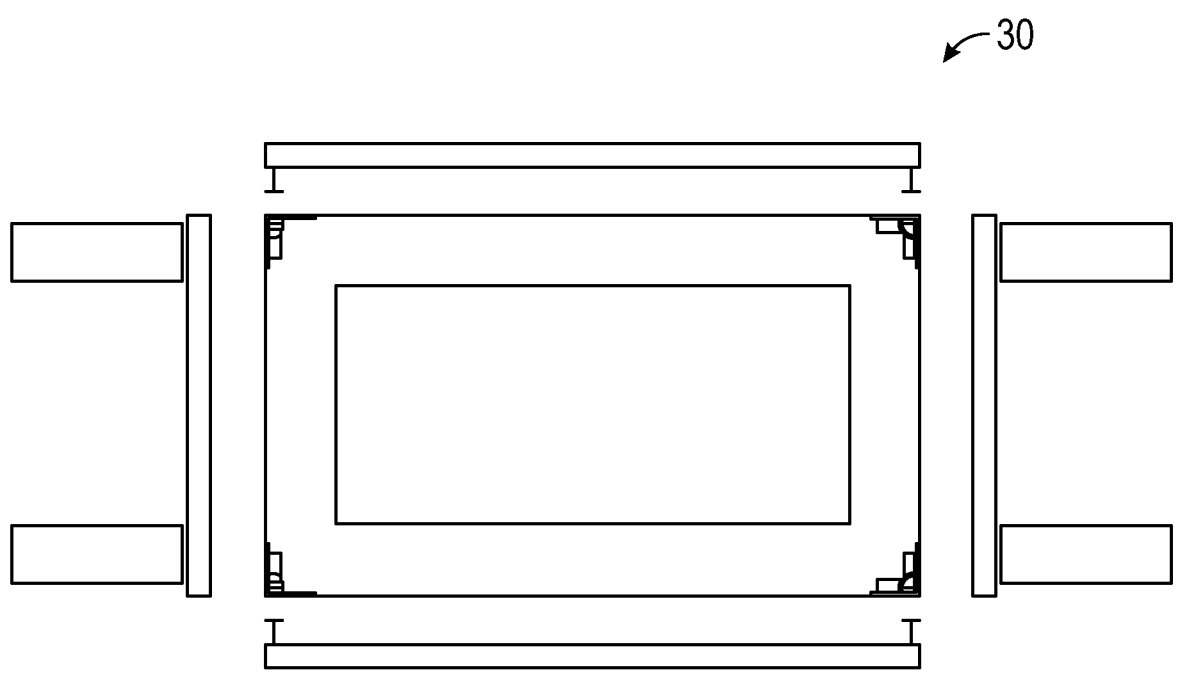
FIG. 1R is a simplified view of a jig for assembling a refrigerator in accordance with the present teachings.

Turning to FIG. 1R, a jig arrangement 30 for assembling a refrigerator in accordance with the present teachings is illustrated. The jig arrangement ensures that the mounting members 16 of the coupling mechanisms aligns properly by positioning and fixing the housing of the refrigerator module in a jig by integrating tightening or pulling elements into the jig itself. The jig thereby forces the coupling elements 12 to the proper locations, which ensures that the housing members 16 do not displace or otherwise deform under the loads exerted onto them by the expanding insulating foam of the refrigerator modules.

Figure 2:
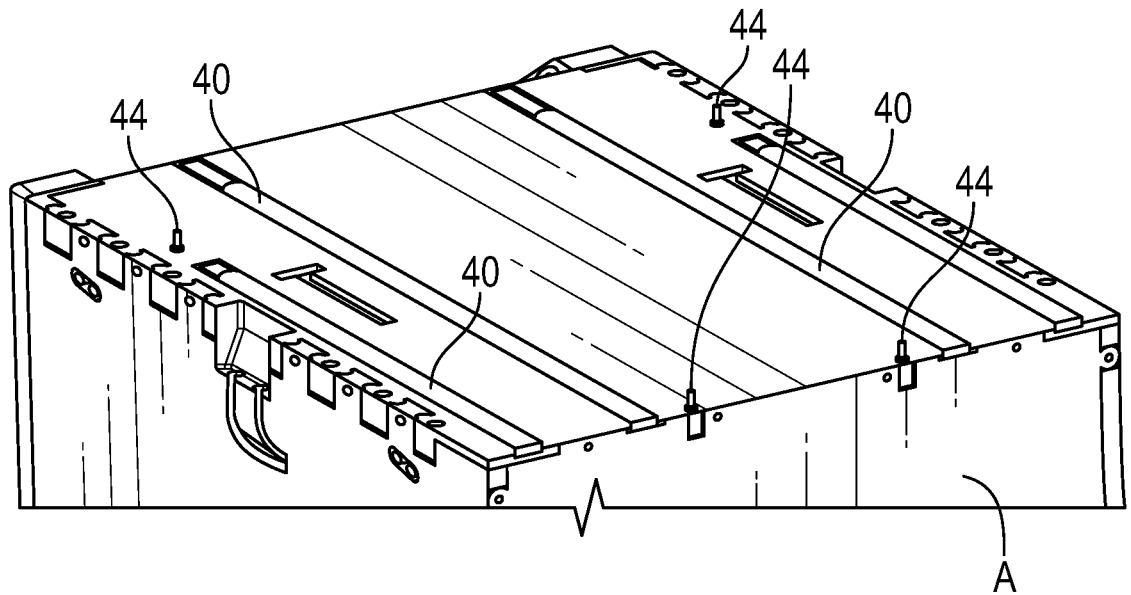
FIG. 2 illustrates an exemplary interface for selectively connecting adjacent modules of the modular refrigerator system of the present teachings.
Figure 3:
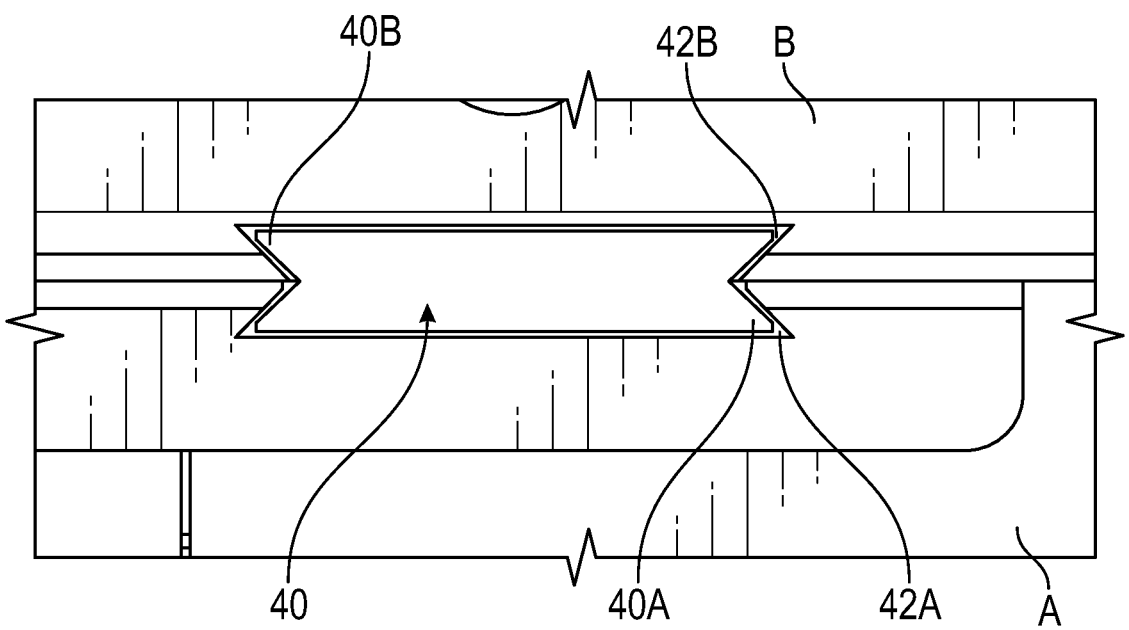
FIG. 3 is another view of the exemplary interface of FIG. 2.

With reference to FIGS. 2 and 3, modular connectivity between the various modules (cooling and refrigeration modules) may be achieved by providing the walls of each module with one or more connecting features. In the embodiment of FIGS. 2 and 3, at least one connection element 40 is provided for connecting the first refrigeration module A to the second refrigeration module B. In the embodiment illustrated, the refrigerator is shown to include four (4) similarly configured connection elements 40. One of the connection elements 40 and cooperating geometries of the first and second refrigeration modules A and B is shown in greater detail in the sectional view of FIG. 3. The connection members 40 are shown to include a first portion 40A slidably received within first slot 42A defined by the housing of the first refrigeration module A. In the embodiment illustrated, the first and second portions of the connection member 40 are first and second dovetail portions 40A and 40B, respectively, and the first and second slots are first and second dovetail slots 42A and 42B that extend across a first face of the first refrigeration module A and a second face of the second refrigeration module B. The dovetail slots 42A and 42B may be provided in side walls, top walls and/or bottom walls or a dedicated part which contains the interfacing geometry and is added to the sidewalls and/or top walls and/or bottom walls. The dovetail slots 42A and 42B may correspond in width to the refrigerator assembly.

In the embodiment of FIGS. 2 and 3, the refrigerator is further shown to include a plurality of alignment pins 44. The plurality of alignment pins extending in a direction perpendicular to the connection element and connect the first and second refrigeration modules by each engaging both of the first and second refrigeration modules. The alignment pins 44 are received within holds provided in each of the walls of the refrigeration modules A and B. When the modules A and B are stacked together, the connection members 40 may be slide into the hollow geometry cooperatively defined by the dovetail slots 42A and 42B in adjacent refrigeration modules A and B. The connection members 40 prevent the modules A and B from separating away from one another and the alignment pins 44 align the modules A and B and prevent the modules A and B from sliding relative to one another.

Figure 3A:
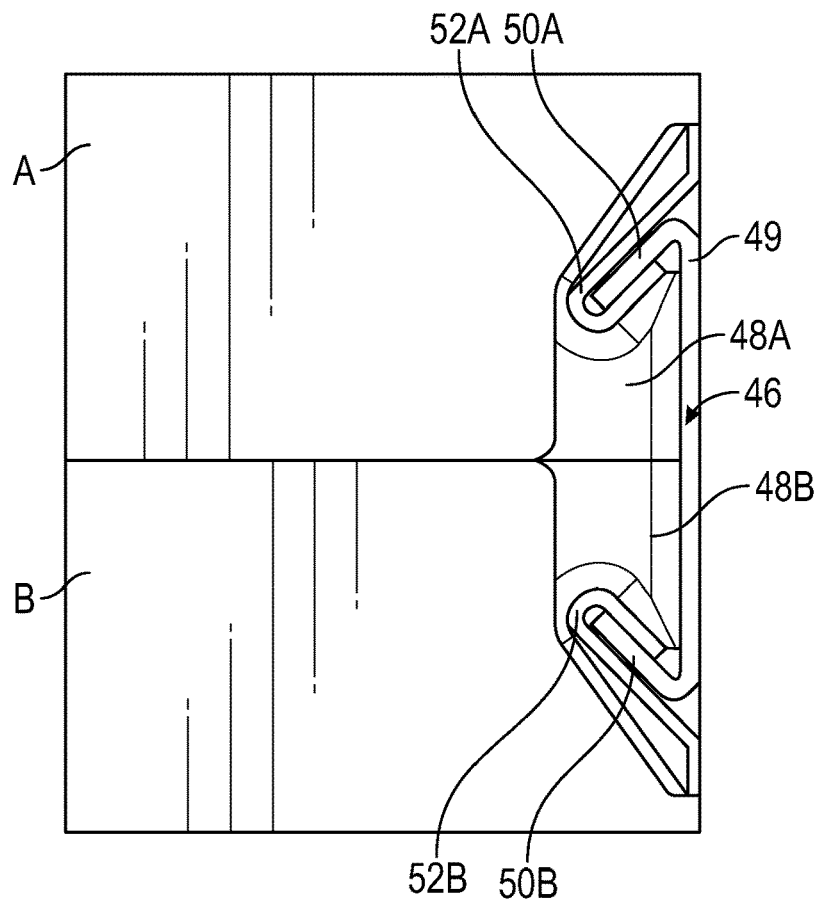
FIG. 3A is a simplified view of another interface for selectively connecting adjacent modules of the modular refrigerator system of the present teachings.
Figure 3B:
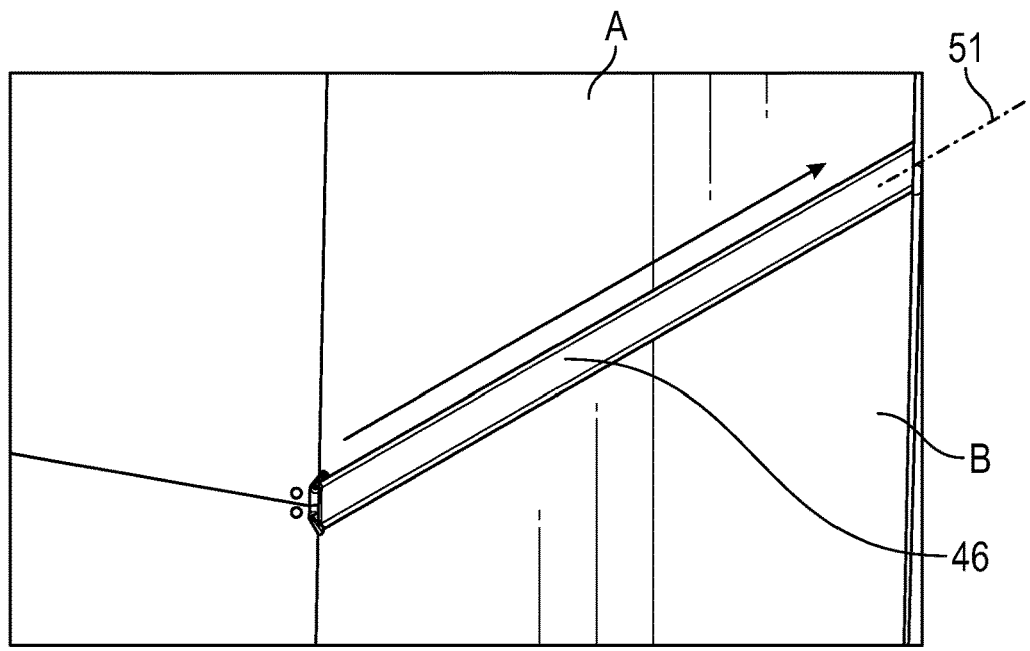
FIG. 3B is another simplified view of the interface of FIG. 3A.
Figure 4:
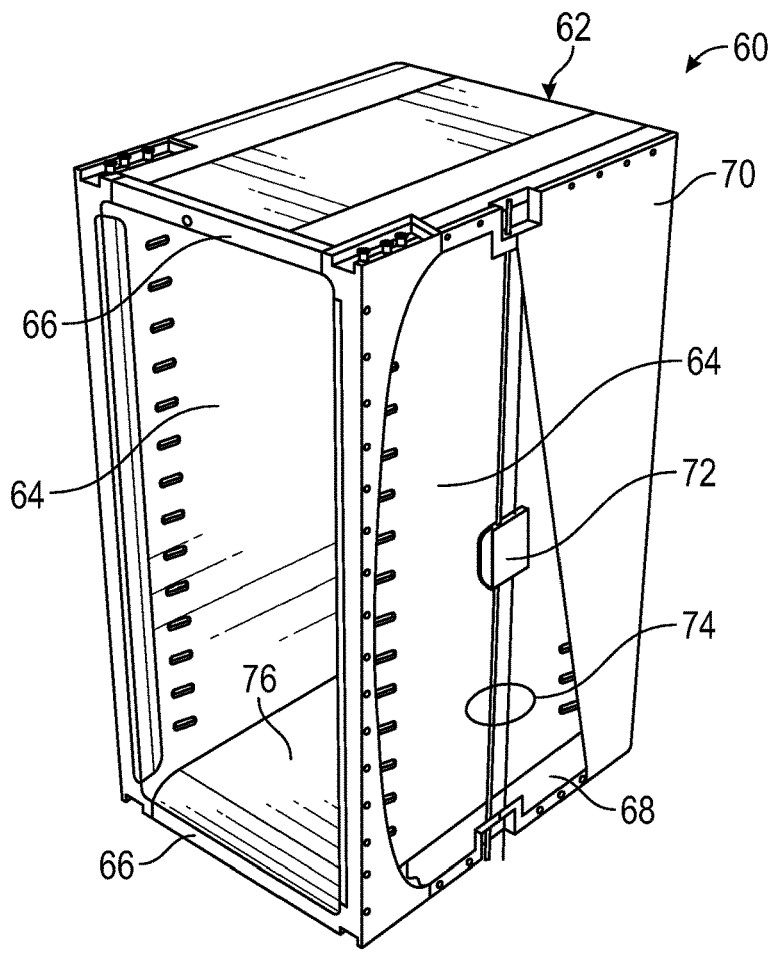
FIG. 4 is a perspective view of a refrigerator module of the present teachings.
Figure 5:
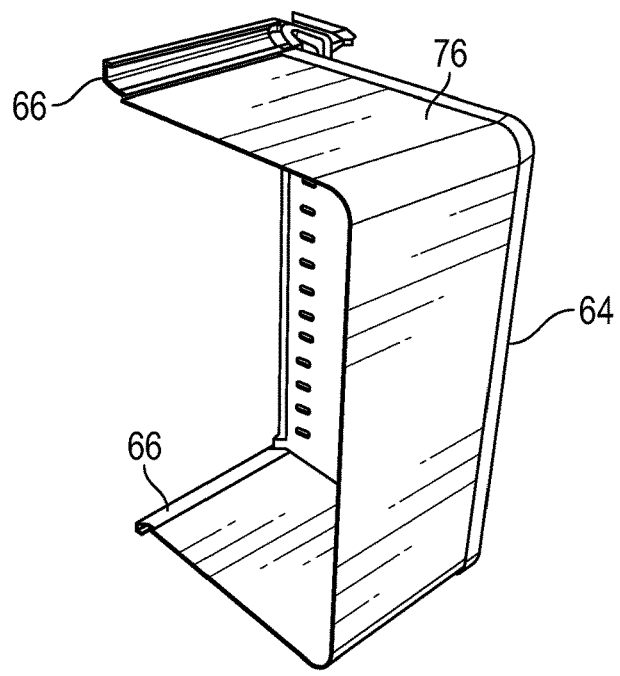
FIG. 5 is a perspective view of a portion of the refrigerator module of FIG. 4 illustrating interfacing locations between a side wall, liner plate and cabinet extrusions.
Figure 6:
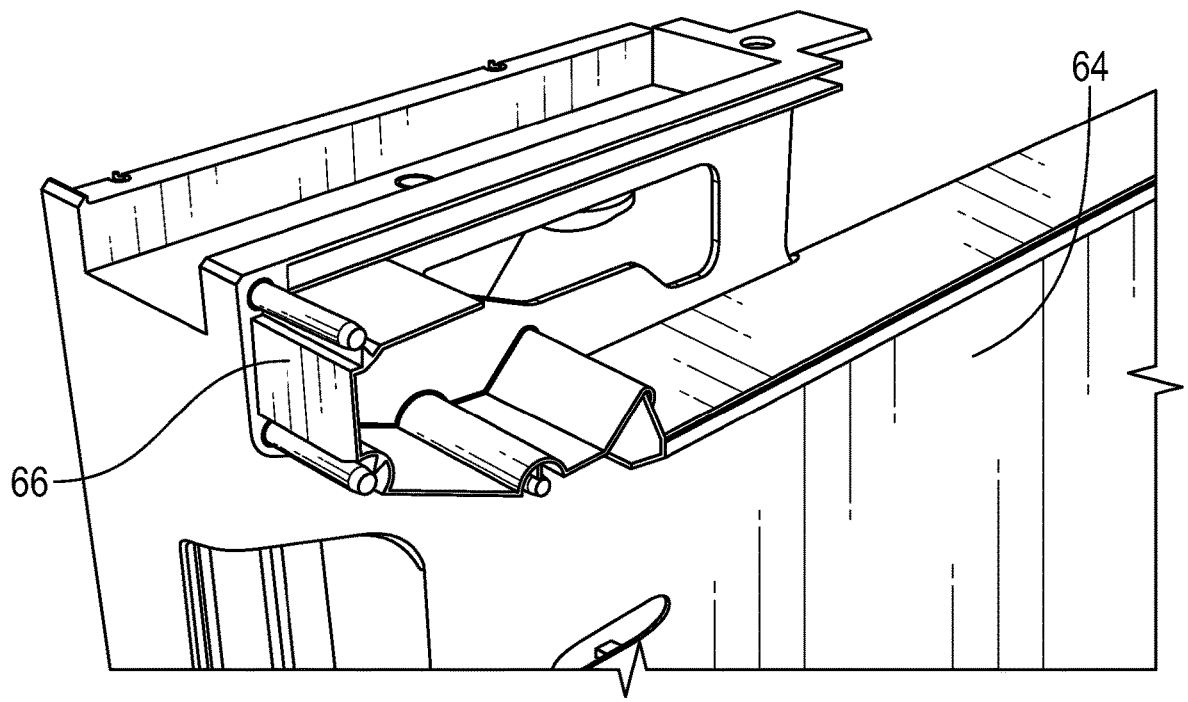
FIG. 6 is another perspective view of a portion of the refrigerator module of FIG. 4 illustrating interfacing geometry between the cabinet and the cabinet extrusion, as well as the interface plates, and a recess for hinging mechanisms.
Figure 7:
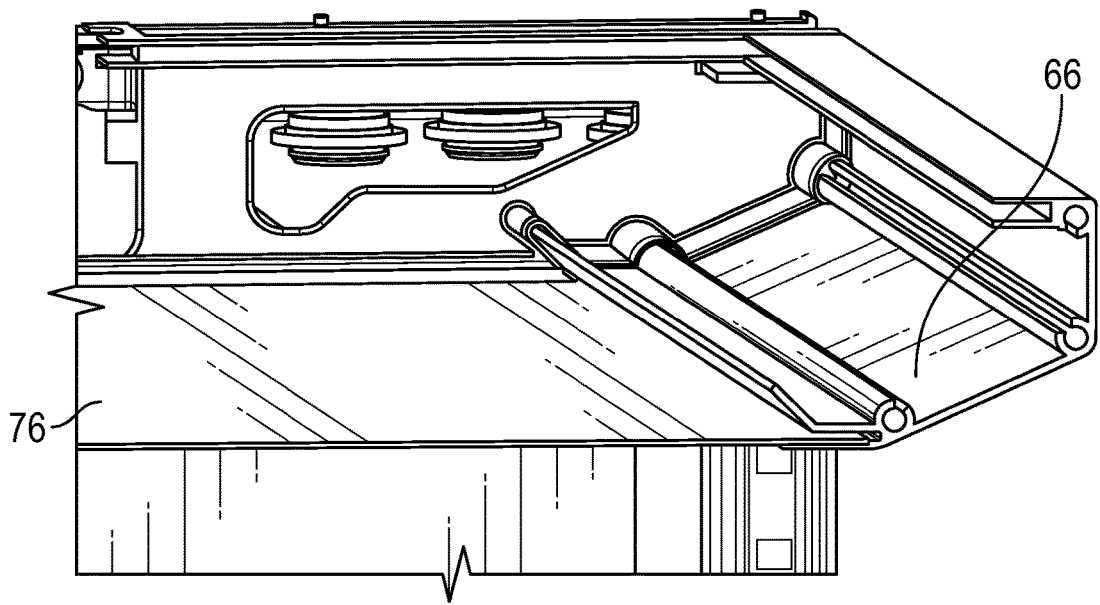
FIG. 7 is an enlarged view of a portion of the refrigerator module of FIG. 4 illustrating the liner plate positioned inside the cabinet extrusion and the side wall.

With reference to FIGS. 3A and 3B, another embodiment of a connection between first and second refrigeration modules A and B in accordance with the present teachings is illustrated. In this embodiment, the connection between the first and second refrigeration modules A and B is made in a way that mechanical loads exerted on the modules A and B are transferred directly to the housing of each module A and B via a connection element or clamping device 46. The clamping device 46 cooperates with the mating geometry of first and second mounting members 48A and 48B carried by the first and second refrigeration modules A and B, respectively. In the embodiment illustrated, the first and second mounting members are injection molded corners 48A and 48B attached to the first and second refrigeration modules A and B, respectively, in any manner well known in the art. In the embodiment illustrated, the connection element 46 is elongated along an axis 51. The connection element 46 includes a central portion 49 and first and second legs 50A and 50B depending from the central portion 49. The first and second legs 50A and 50B extend substantially along the length of the central portion 49 and both define an acute angle with the central portion 49. The first and second legs 50A and 50B are slidably received in first and second slots 52A and 52B, respectively, defined by the first and second mounting members 48A and 48B. The connection element 46 and the cooperating geometry of the first and second mounting members 48A and 48B prevent the first and second refrigeration modules A and B from separating.

Turning to FIGS. 4-8, one of the refrigeration modules of the present teachings is shown in further detail. The modules may be readily manufactured in various widths. In this regard, the refrigeration modules may be constructed to have a width that may vary from approximately 300 mm to approximately 900 mm, for example. Other widths may be employed, however, within the scope of the present teachings.

The refrigeration module is shown to include an insulated housing 60 including an outer shell 62 and an insulating material (not particularly shown). The outer shell 62 may be considered to be a pre-insulation assembly and may include a pair of side walls 64 (i.e., left and right side walls), cabinet extrusions 66, interface plates 68, and a wrapper 70. The insulated housing 60 is further shown to include a valve 72 and cooling pipes 74. The side walls 64 form an interior side wall and partial front face of the insulated cabinet and contain interfacing geometry that functions to provide a structural connection between a liner plate 76, the cabinet extrusions 66, the interface plates 68, the wrapper or outward facing housing part 70, hinge (see FIG. 30, for example) and/or drawer mechanisms (see FIG. 8A, reference character 77, for example), and electrical components such as wiring, printed circuit boards, connectors, lighting components and sensors. The cabinet extrusions 66 form the front face and transition from the front face toward the liner plate 76. The interface plates 68 form the top and bottom of the outer shell and include a geometry (e.g., dovetail slots, as discussed above) for forming a structural connection between adjacent modules. The wrapper 70 is a layer of material that forms the outer left, back and right walls of the outer shell and wraps around the other cabinet components.

The insulating materials may be selected from a group of insulating materials consisting of: reaction polymers such as closed or open cell polyurethane based foams; vacuum insulation panels, glass fibers, fumed nano-porous silica particles, and combinations thereof.

Figure 8:
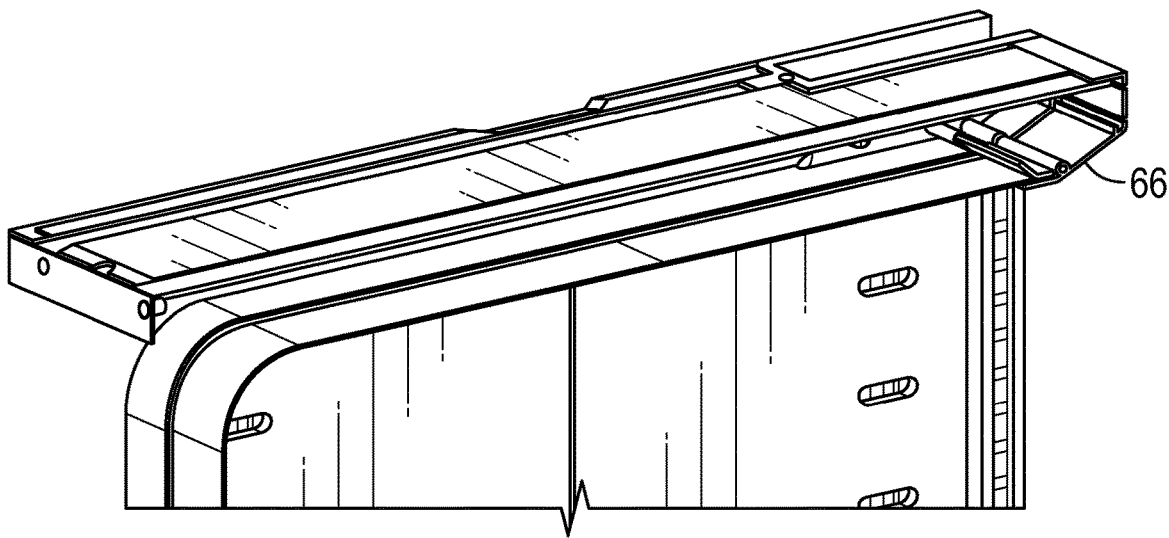
FIG. 8 is another perspective view of a portion of the refrigerator module of FIG. 4 illustrating a housing top with interface geometry positioned into the side wall and cabinet extrusion.
Figure 8A:
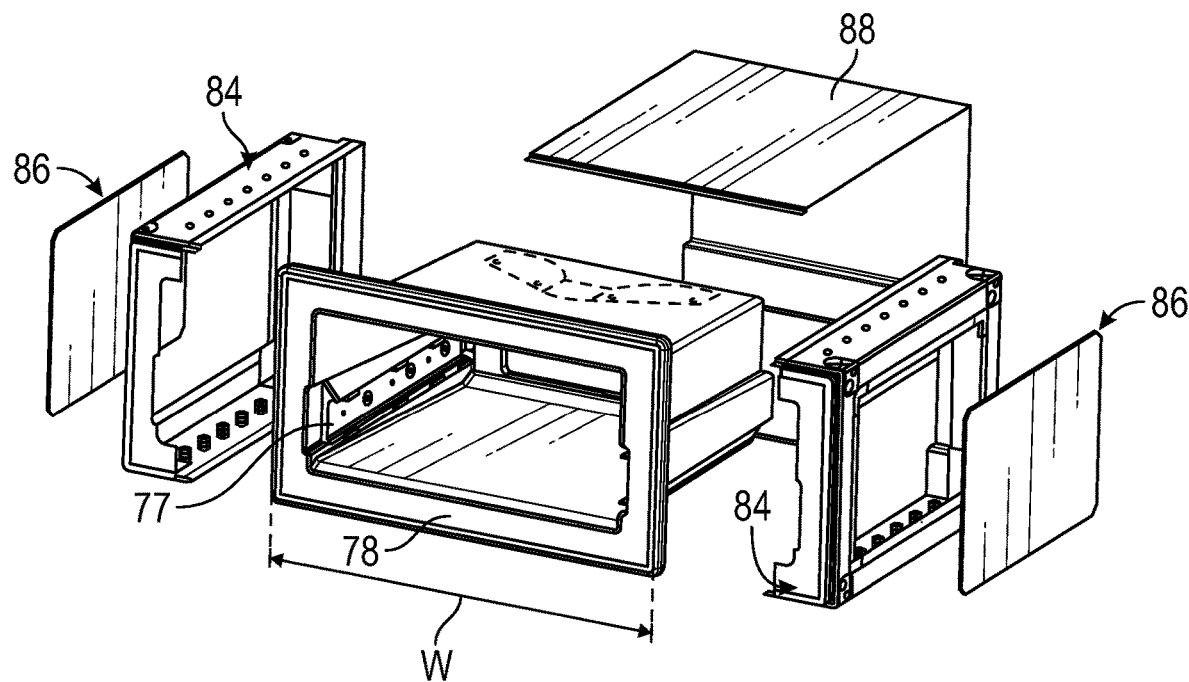
FIG. 8A is an exploded perspective view of a portion of a refrigerator constructed in accordance with the present teachings.
Figure 8B:
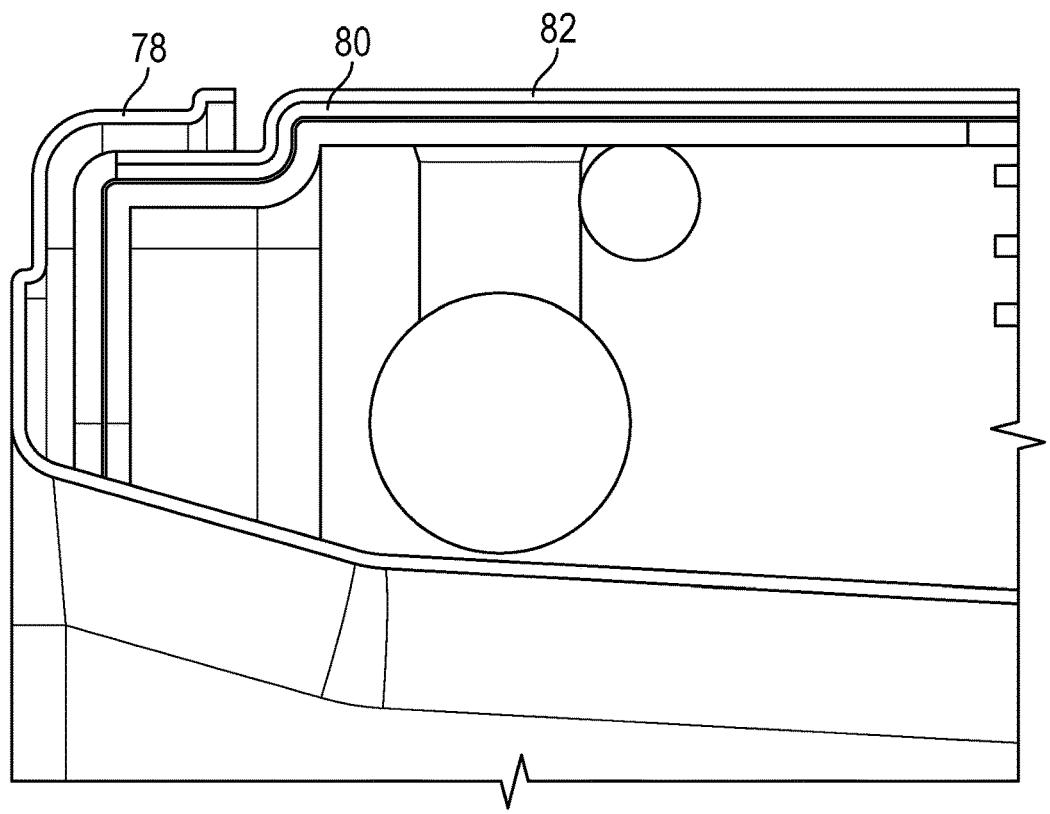
FIG. 8B is an enlarged cross-sectional view taken along the centerline of the liner plate of FIG. 8A.
Figure 8C:
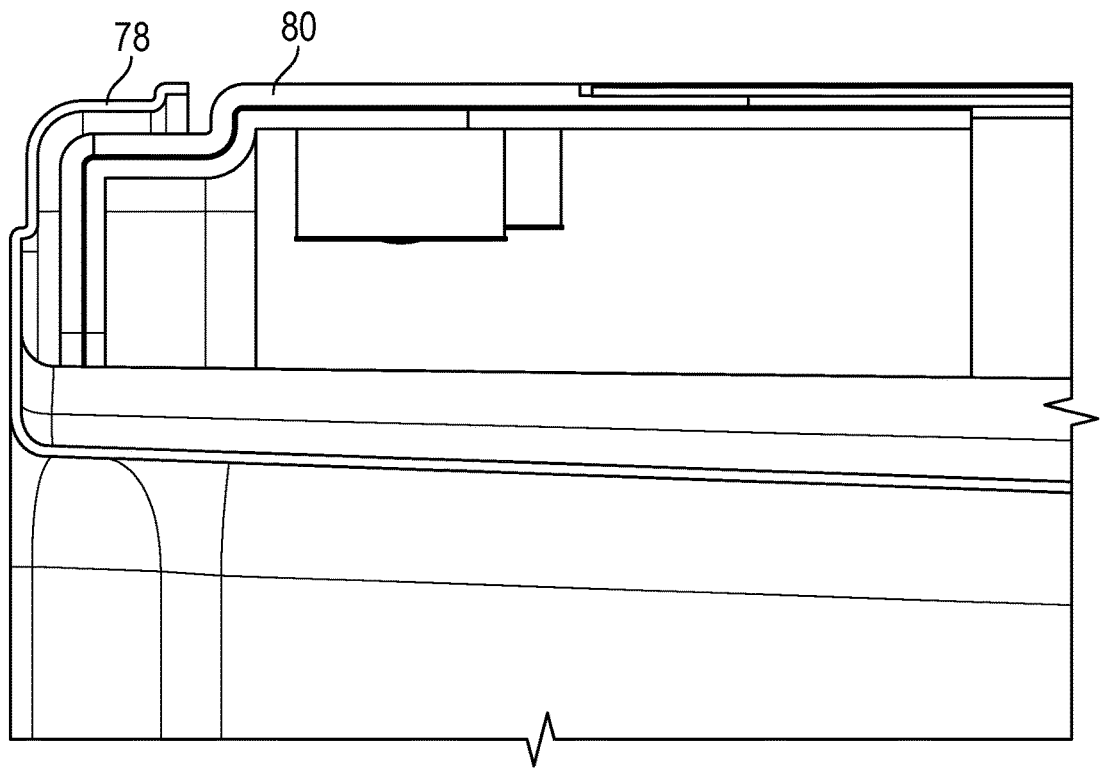
FIG. 8C is an enlarged cross-sectional top view taken along the centerline of the liner plate of FIG. 8A.

Turning to FIGS. 8A-8C a portion of another refrigerator module in accordance with the present teachings is illustrated. FIGS. 8A-8C are directed to a refrigerator module with a different construction than the refrigerator module of FIGS. 4-8. In the module of FIGS. 4-8, the side walls 64 are leading construction in variable width. The module of FIGS. 8A-8C differs in that a center, liner plate 78 is the leading construction in variable width W. This results in different interface geometries for the various components. In the embodiment of FIGS. 4-8, variable width is realized with a plate. In the module of FIGS. 8A-8C, the variable width is realized through a vacuum formed liner.

FIG. 8B is an enlarged cross-sectional side view taken along the centerline of the liner plate 78, illustrating a side wall 80 and a wrapper/enclosure material 82 positioned inside the liner plate 76. FIG. 8C is an enlarged cross-sectional top view taken along the centerline of the liner plate 76, illustrating the side wall 80 positioned inside the liner plate 78. The advantage of this construction method is that the wrapper enclosure material 82 has a 2-dimensional cross-section and can thus be cut to the correct width. The material is placed inside a slot in the side wall 80. This slot allows the housing material to move relative to the side wall, yet provides a geometry where foam can not leak out from during the foaming process. These parts are placed over the liner 78 and the interface between the liner 78 and side wall 80 are filled with a compressible material to prevent foam from leaking out during the foaming process. This is important because during because the foaming process, sidewall 80 is pulled into the correct position by actuators on the foaming mold prior to the foaming process to ensure that the modular interface of the cabinet is always in the correct position.

The construction of the center piece/liner 78 can be used in combination with the jig construction (as described in FIG. 1R). The module is further illustrated to include side parts 84 and inserts 86 that can be preassembled with the mechanical interface (as described above) in the jig. By applying a barrier (such as foam tape or the like) on the back of the liner/interface areas with the side parts and the wrapper/outer housing 88, the construction will position itself on the outline of the jig. This way all tolerances in the product will be limited to the tolerances of the jig. Resulting in a consistent (and predictable) tolerance on the insulation foamed cabinet, after foaming process.

Figure 9:
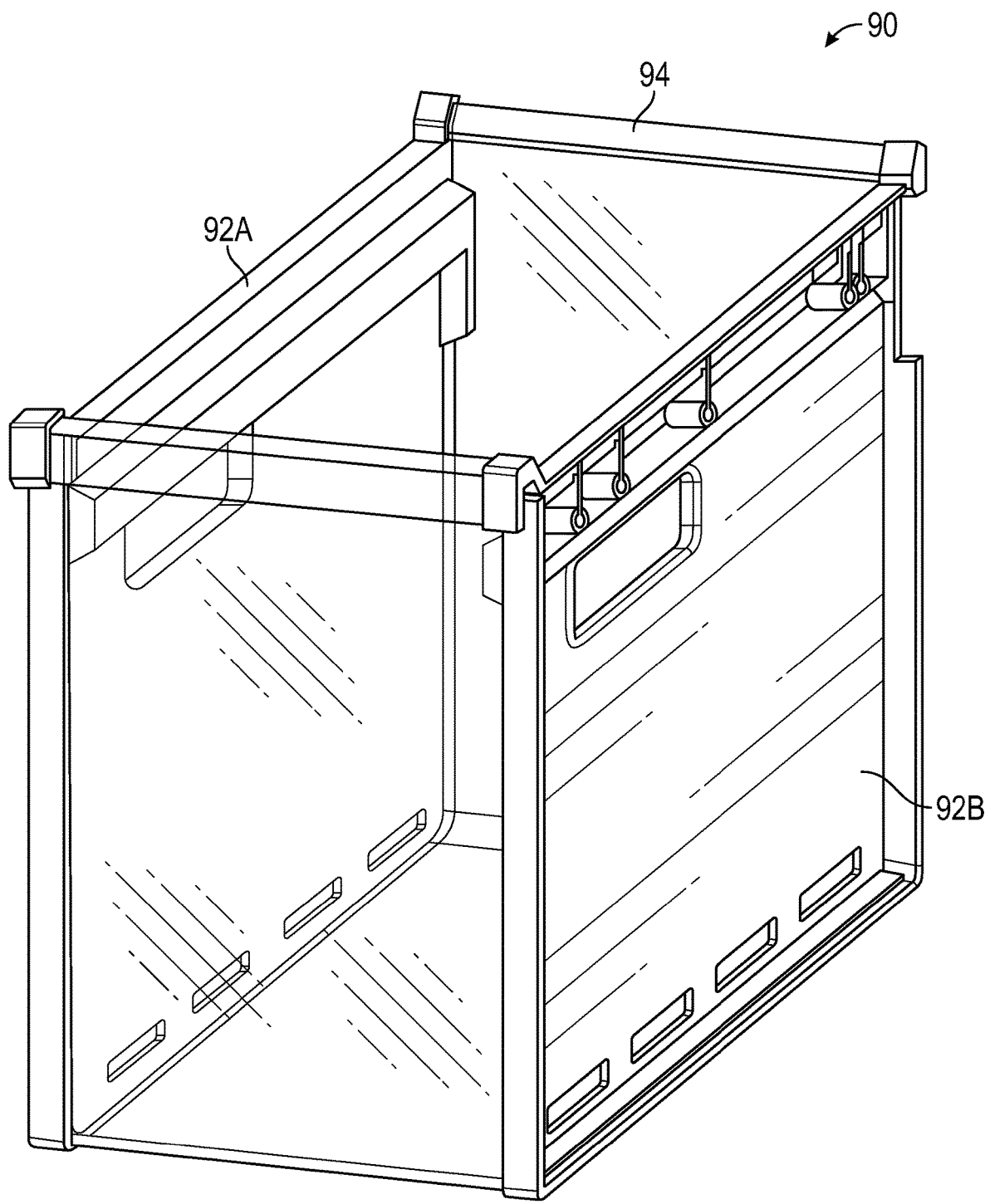
FIG. 9 is a perspective view of a bin of the refrigerator the present teachings.
Figure 10:
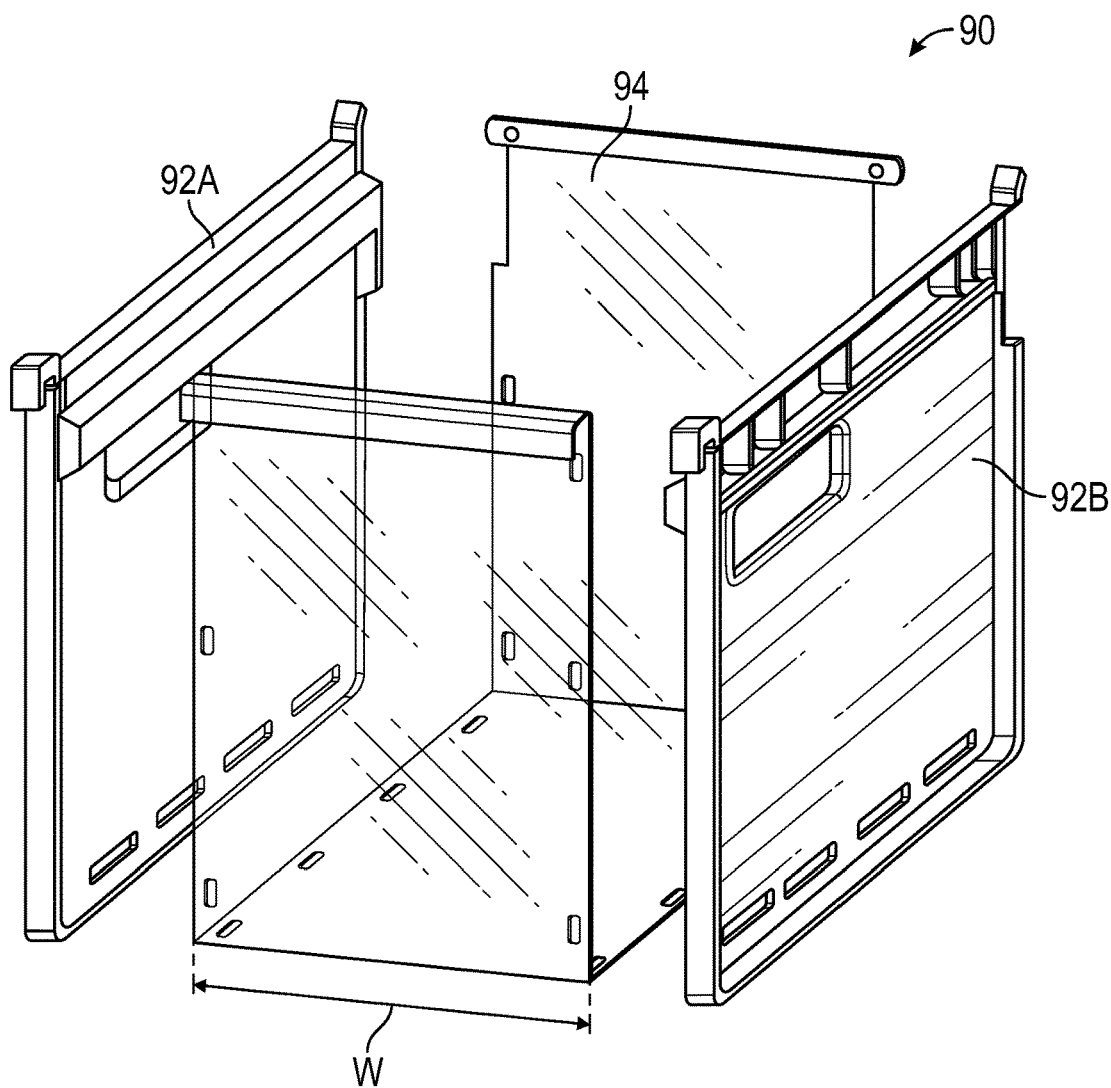
FIG. 10 is an exploded perspective view of the bin of FIG. 9.
Figure 10A:
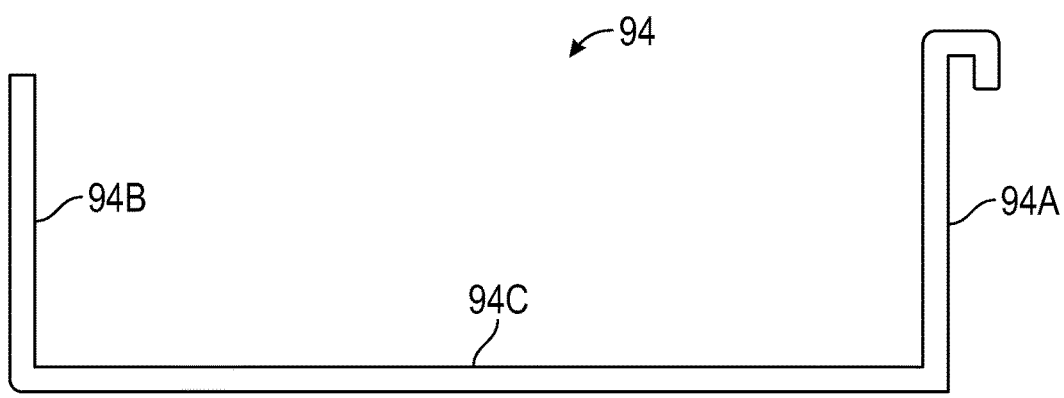
FIG. 10A is a cross-sectional view taken along the centerline of the central member of the bin of FIG. 9.

Turning to FIGS. 9, 10 and 10A, an interior component of a refrigerator of the present teachings is illustrated and identified at reference character 90. In the embodiment illustrated, the interior component is a bin. The interior component may also be selected from a group consisting further of shelves, trays and the like. As will become understood further below, the interior component 90 may be readily manufactured in various widths.

The bin 90 is shown to include first and second lateral sides 92A and 92B and a central member 94 extending laterally between the first and second lateral sides. The first and second lateral sides 92A and 92B may be injection molded, for example. The central member 94 may be unitarily formed of a plastic sheet, cut to a desired size and bended to a desired shape. The width W of the central member 94 may be selected based on a desired width of the interior component 90. As perhaps best shown in the cross-sectional view of FIG. 10A, the central member 94 has a generally U-shape defining front, rear and bottom walls 94A, 94B and 94C of the bin 90.

Figure 10B:
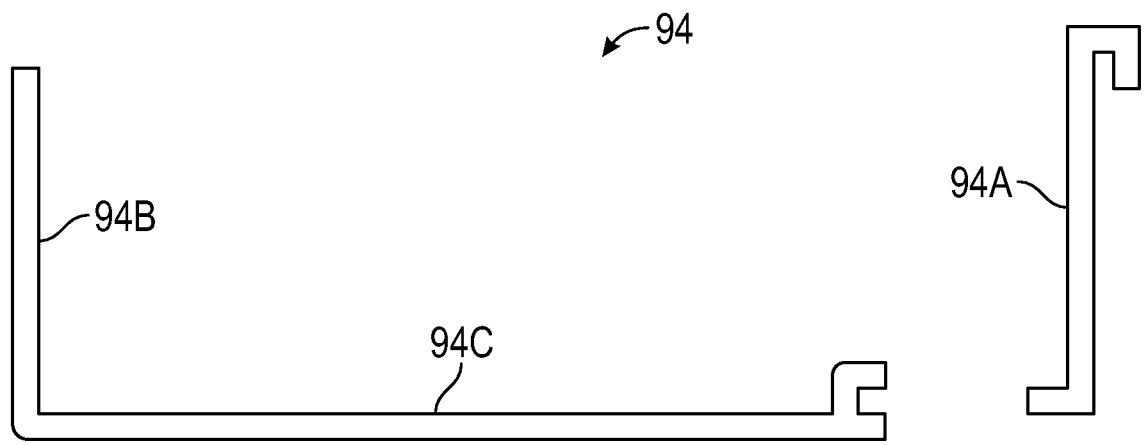
FIG. 10B is a cross-sectional view similar to FIG. 10A illustrating an alternative construction of the central member of the bin of FIG. 9.
Figure 10C:
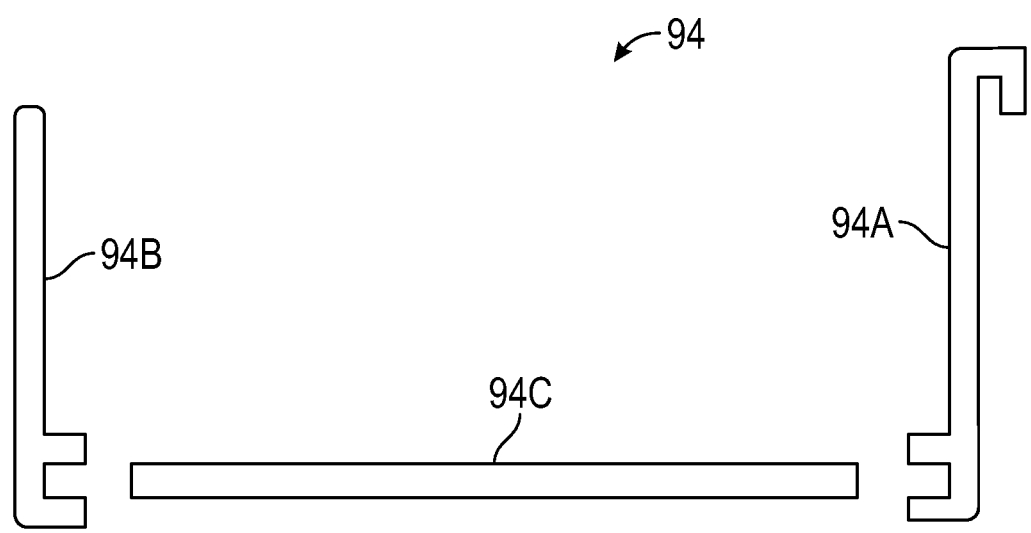
FIG. 10C is another cross-sectional view similar to FIG. 10A illustrating an alternative construction of the central member of the bin of FIG. 9.
Figure 11:
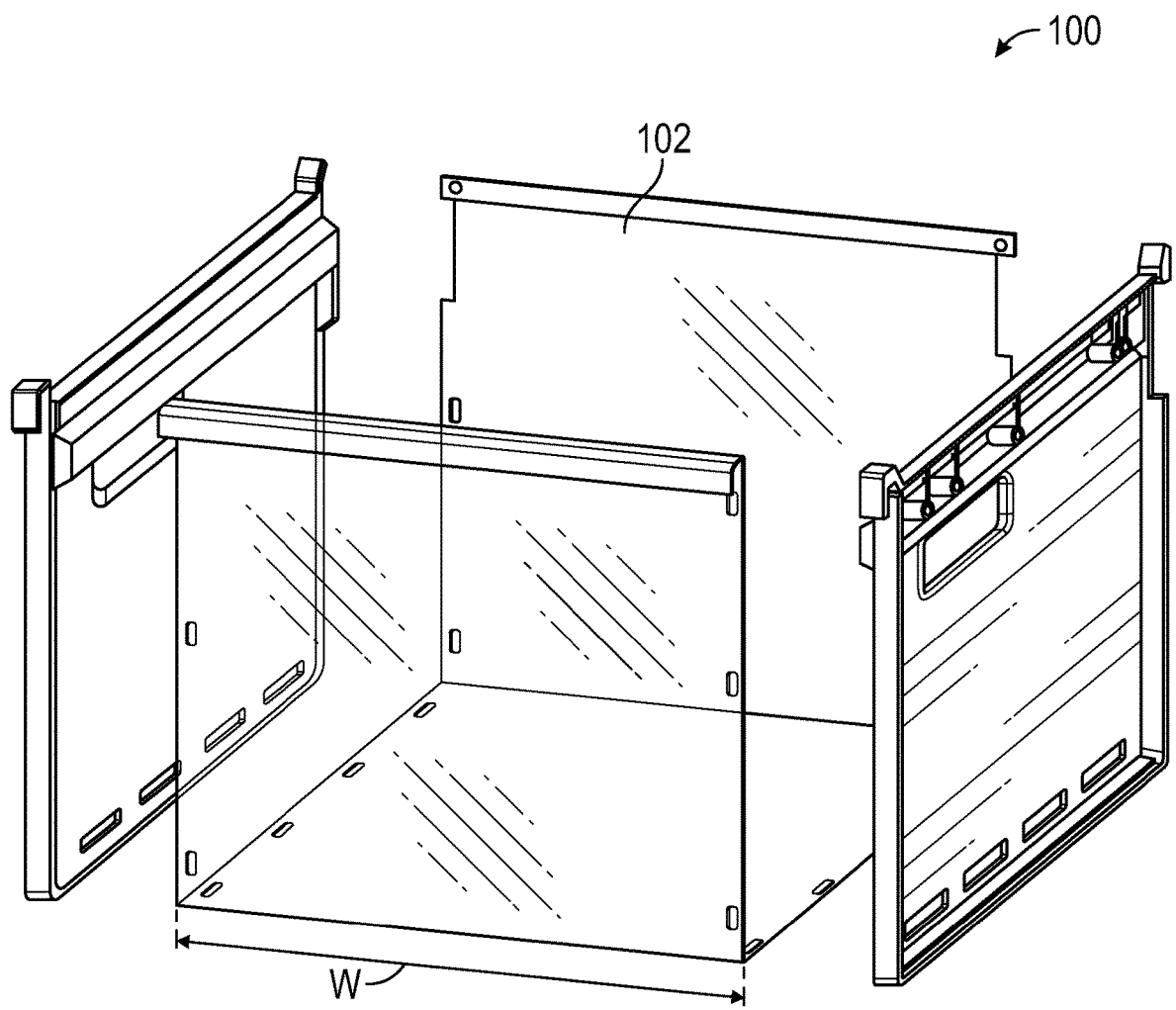
FIG. 11 is an exploded perspective view similar to FIG. 10 illustrating another bin of the refrigerator of the present teachings.

Turning to FIGS. 10B and 10C, alternative constructions for the central member 94 are illustrated. As shown in the cross-sectional views of FIGS. 10B and 10C, the central member 94 of the bin 90 may alternatively consist of multiple discrete parts defining the sides of the bin 90. In FIG. 10B, the central member 94 includes a first discrete part defining the rear and bottom walls 94B and 94C of the bin 90 and a second discrete part defining the front wall 94A of the bin 90. In FIG. 10C, the central member 94 includes a first discrete part defining the rear wall 94B of the bin, a second discrete part defining the bottom wall 94C of the bin 90, and a third discrete part defining the front wall 94A of the bin 90.

Turning to FIG. 1I, another bin in accordance with the present teachings is illustrated and identified at reference character 100. The bin of FIG. 1I is constructed similarly to the bin 90 of FIGS. 9 and 10, but the central member 102 of the bin 100 of FIG. 1I is cut wider to readily provide a bin having a greater width W'.

Figure 12:
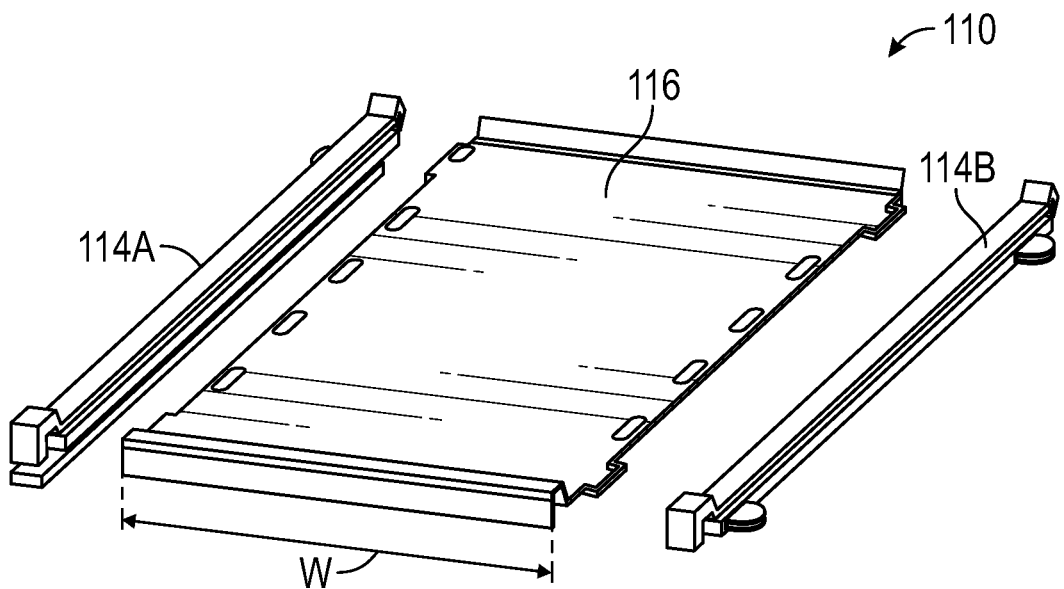
FIG. 12 is an exploded perspective view of a shelf of a refrigerator accordingly to the present teachings.
Figure 13:
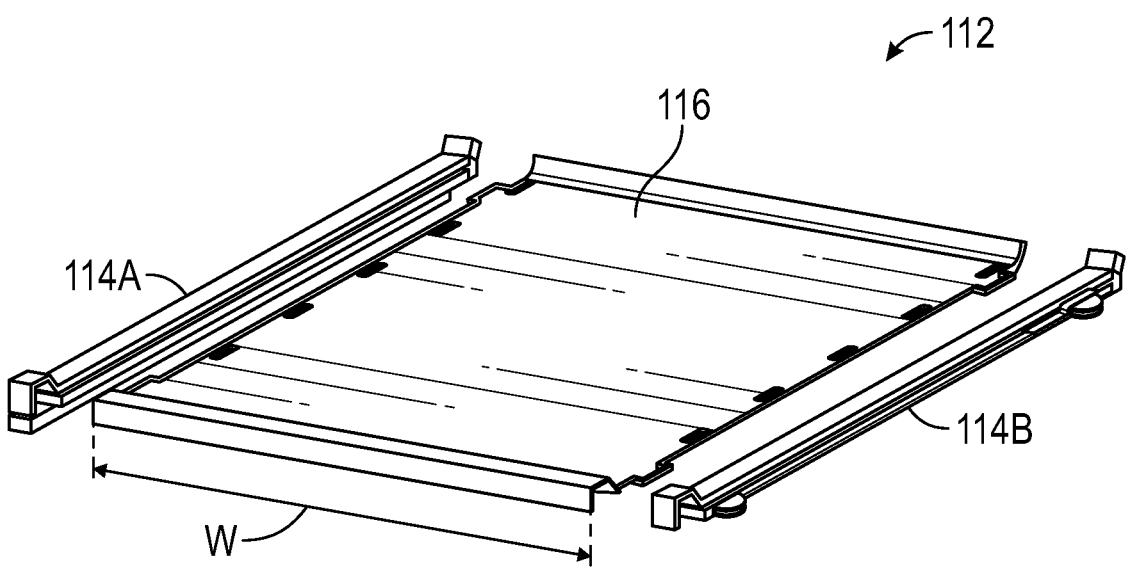
FIG. 13 is an exploded perspective view similar to FIG. 12 illustrating another shelf of a refrigerator according the present teachings.

Turning to FIGS. 12 and 13, first and second shelves in accordance with the present teachings, respectively, are illustrated and identified at reference characters 110 and 112. The first and second shelves 110 and 112 are similarly constructed to include first and second lateral sides 114A and 114B that may be injection molded and a central member 116 unitarily formed of a transparent plastic sheet laterally extending between first and second lateral sides 114A and 1146. The central member 116 of the second shelf 112 is cut wider (e.g., has a bigger width W) than the central member 116 of the first shelf 110 to readily provide a shelf 112 having a greater width W. A tray may be similarly constructed.

Figure 14:
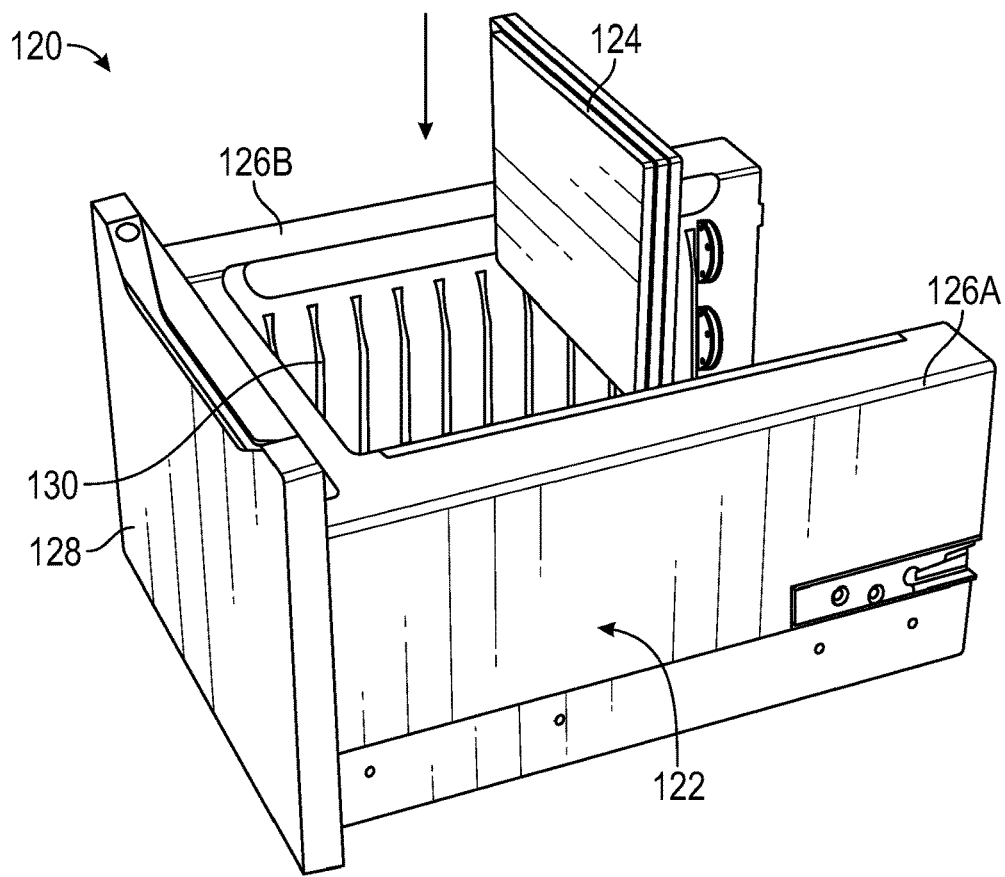
FIG. 14 is a perspective view of a refrigerator drawer having a variable size freezer portion in accordance with the present teachings.
Figure 15:
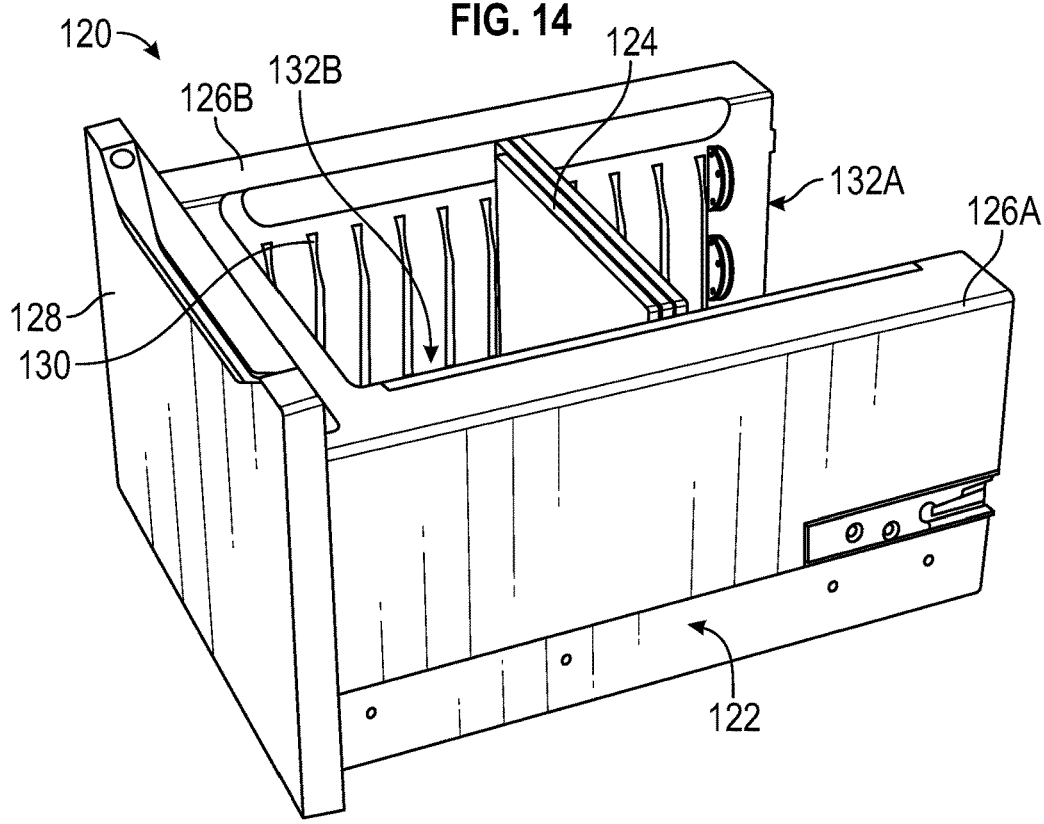
FIG. 15 is another perspective view of the refrigerator drawer of FIG. 14.
Figure 16:
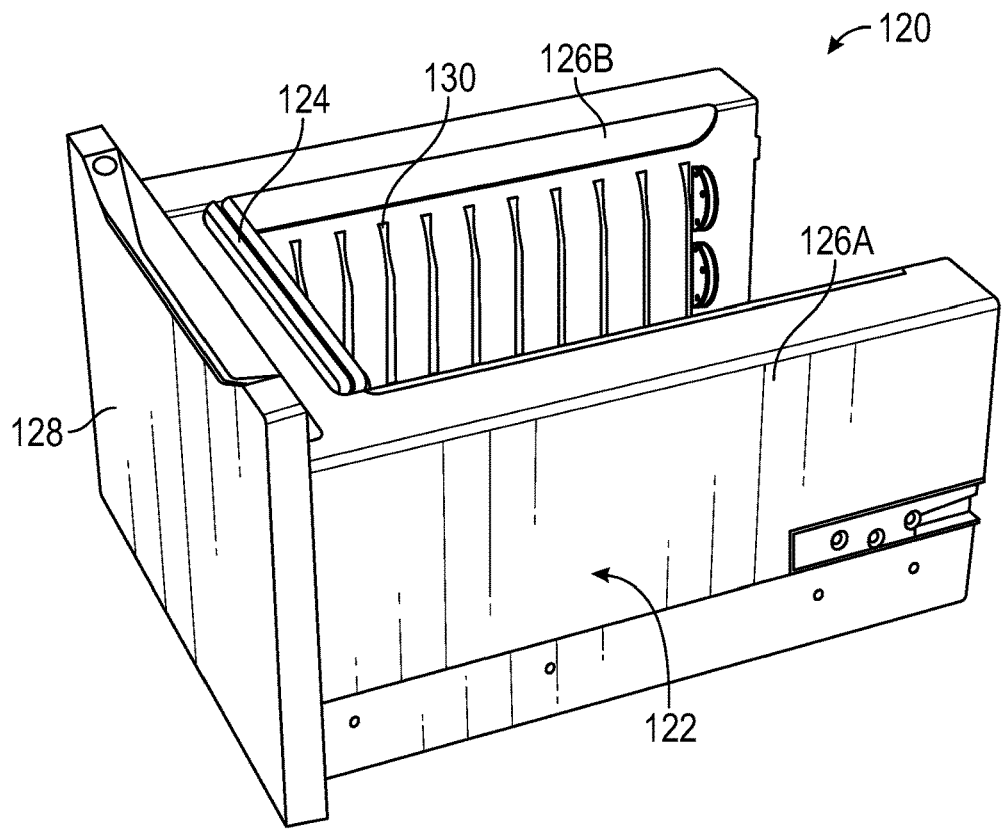
FIG. 16 is another perspective view of the refrigerator drawer of FIG. 14.
Figure 17:
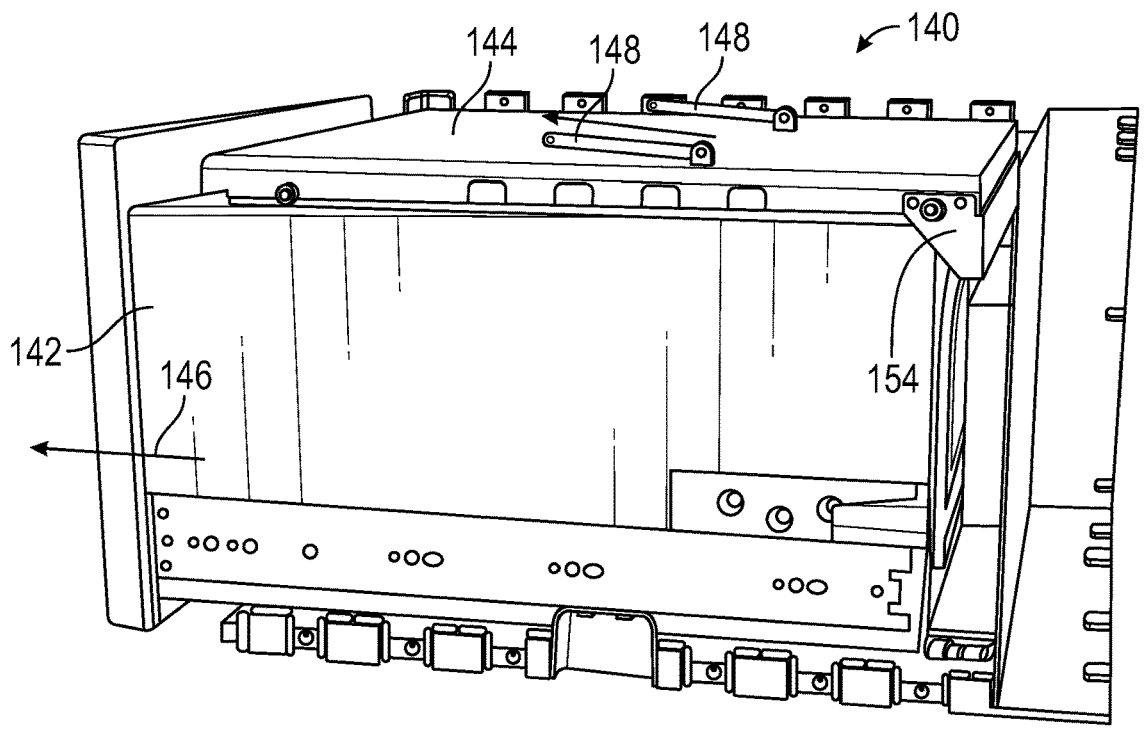
FIG. 17 is a partially cut-away, perspective view illustrating a drawer assembly for a refrigerator including a lid that is moveable from a sealed position to an unsealed position in response to movement of a drawer from a closed position toward an open position.
Figure 18:
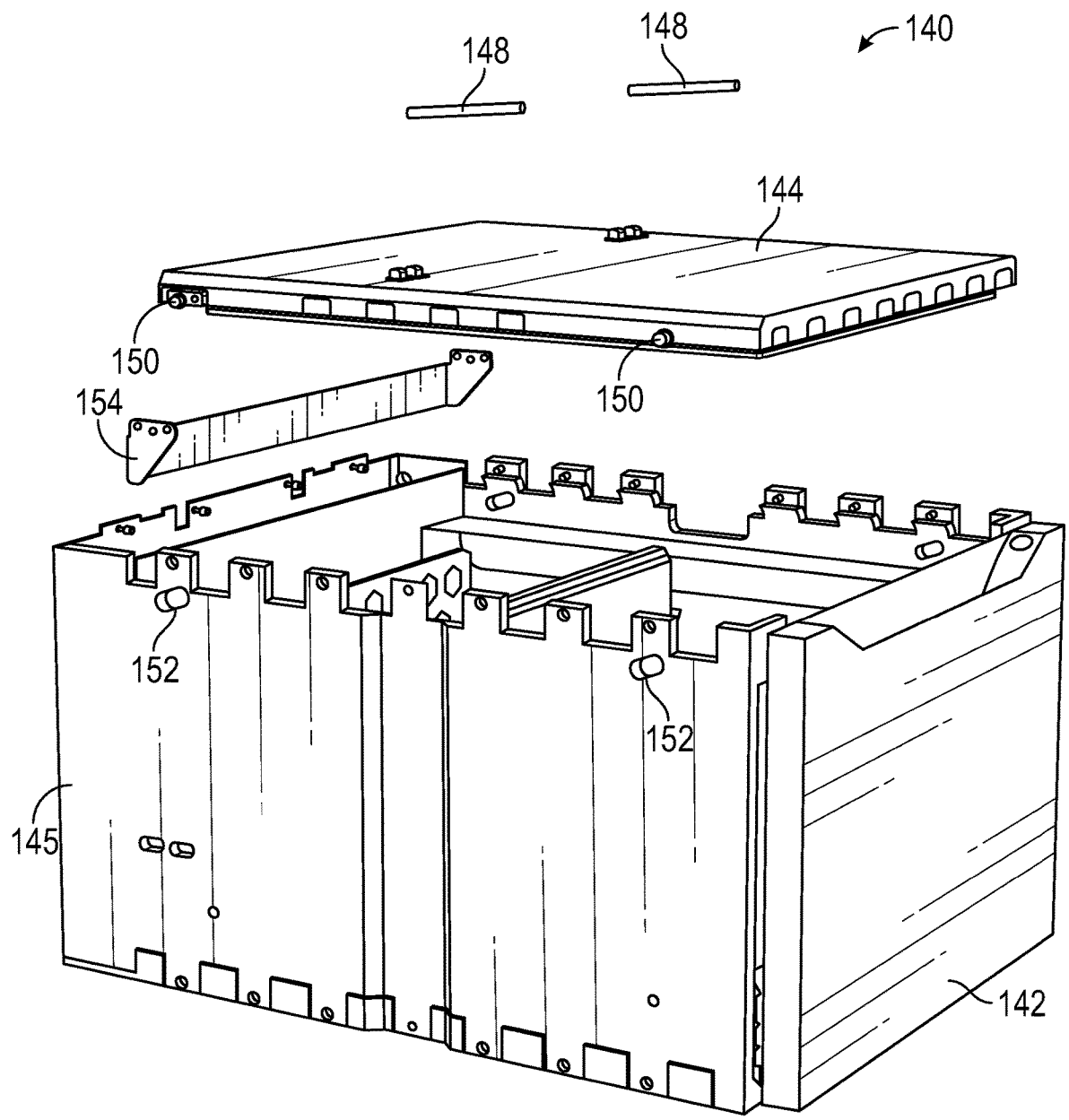
FIG. 18 is an exploded view of the drawer assembly of FIG. 17.

With reference to FIGS. 14 through 16, a refrigerator drawer in accordance with the present teachings is illustrated and generally identified at reference character 120. As will become understood, the refrigerator drawer 120 has a variable volume size freezer portion. The drawer 120 is illustrated to include a housing portion 122 and a divider 124 that can be variably positioned within the housing portion 122. The housing portion 122 includes first and second lateral side walls 126A and 126B, a front wall 128 and a bottom wall (not specifically shown). A rear side of the housing portion 122 may be open and exposed to an evaporator of the refrigerator. The first and second side walls 126A and 126B may be formed to include vertically extending slots 130 or other structure to selectively receive the divider 124 in one of a plurality of distinct positions.

An interior space of the refrigerator drawer 120 is defined by the first and second lateral side walls 126A and 126B, the front wall 128 and the bottom wall. This interior space may be subdivided by the divider 124 into a freezer portion 132A and a fresh food portion 132B. The fresh food portion 132B may be maintained at a first temperature and the freezer portion 132A may be maintained at a second, lower temperature. The first temperature is preferably above a temperature that would freeze contents in the fresh food portion 132B. The second temperature is preferably below a temperature necessary to freeze the contents of the freezer portion. In one application, the fresh food portion 132B may be maintained at a temperature of approximately 4 degrees C. and the freezer portion 123A may be maintained at a temperature of approximately −18 degrees C., for example. When the divider 124 is removed from the refrigerator drawer 120 or placed against the front wall 128 (as shown in FIG. 16), the entire interior space may be maintained at the lower temperature and the entire interior space may be a freezer portion 132A. When the divider 124 is removed, the drawer 120 can be set (with setting in APP) to complete fresh food (e.g., 4 degrees Celsius When the divider 124 is in a forward-most position, insulation of the divider 124 will help maintain the interior space at lower temperature without loss of performance and/or to prevent the temperature from rising due to a loss of insulation thickness at front.

Turning to FIGS. 17 through 21, a drawer assembly for a refrigerator in accordance with the present teachings is illustrated and generally identified at reference character 140. The drawer assembly 140 is shown to generally include a drawer 142 and a lid 144. As will be discussed below, the lid 144 is automatically moveable from a sealed position to an unsealed position in response to movement of a drawer from a closed position toward an open position.

The drawer 142 is normally stored in the closed position within an interior of the refrigerator housing 145 and movable in a direction 146 from the closed position to the open position at least partially extending from the refrigerator housing 145. The lid 144 is coupled to the refrigerator housing 145 for movement between the sealed position for sealing the drawer 142 and the unsealed position in which the drawer 142 is unsealed and free to move relative to the lid 144.

Figure 20:
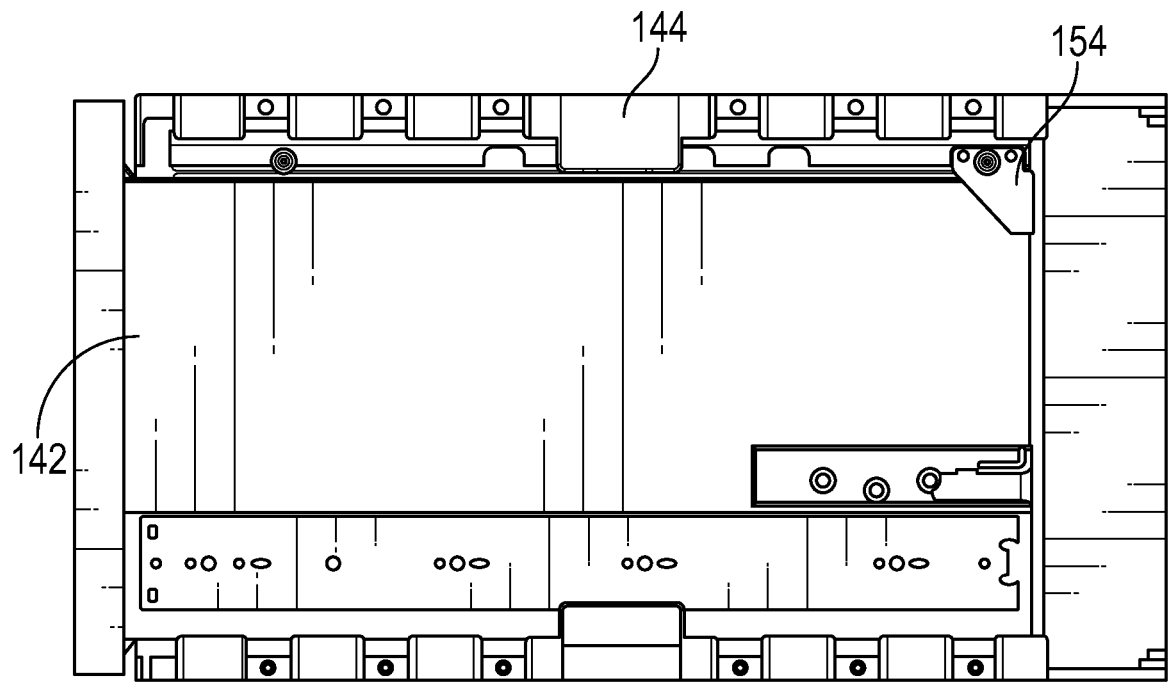
FIG. 20 is a side view of the drawer assembly of FIG. 17 illustrating the drawer in the closed position and the lid in the sealed or down position.
Figure 21:
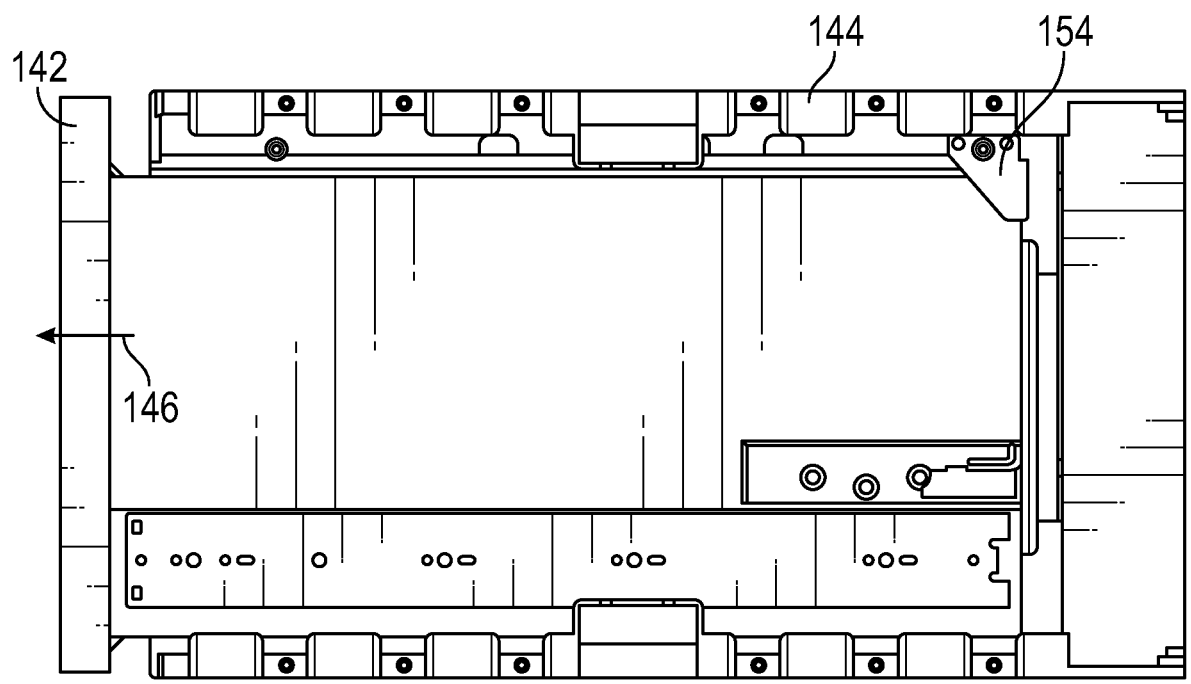
FIG. 21 is a side view similar to FIG. 20 illustrating the drawer moved toward the open position and the lid in the unsealed or raised position.

The drawer 142 is shown in the closed position and the lid 144 in the sealed position in FIG. 20, for example. From this closed position, the drawer 142 is opened by manual urging by the user in the direction of arrow 146 in FIG. 17. The lid 144 is interconnected to the refrigerator housing 145 with one or more springs 148. In the embodiment illustrated, the lid 144 is coupled to the refrigerator housing 145 with two springs 148. The springs 148 function to bias the lid 144 in a forward direction (i.e., parallel to the arrow 146).

Figure 19:
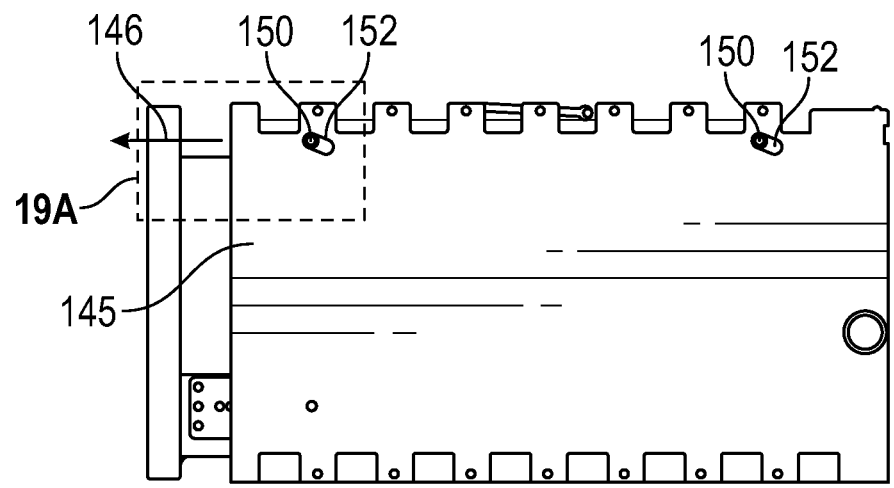
FIG. 19 is a side view of the drawer assembly of FIG. 17 illustrated with the drawer moved toward the open position.
Figure 19A:
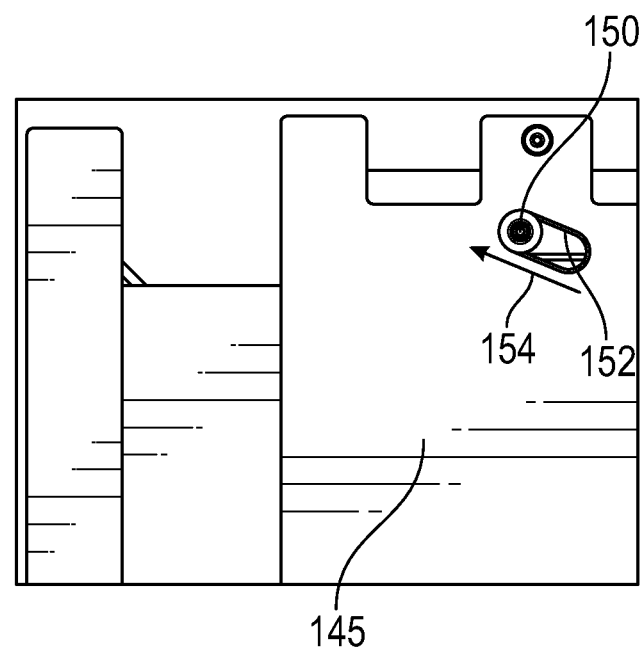
FIG. 19A is an enlarged view of a portion of FIG. 19 further illustrating the side wall geometry that cooperates with the drawer to couple the drawer to the housing.

The lid 144 is also coupled for movement relative to the refrigerator housing 145 by a plurality of pins 150. The pins 150 are fixedly mounted in holes in lateral sides of the lid 144. As illustrated, each lateral side of the lid carries first and second pins 150. The pins 150 are received within slots 152 defined by the refrigerator side walls of the housing 145. The slots 152 are angled upwardly in the forward direction (see arrow 154 in FIG. 19A) and define a lift geometry. In this manner, the slots 152 function to translate the lid 144 forwardly in an angled lifting direction.

When the drawer 142 is initially moved from the closed position toward the open position in the direction of arrow 146, the springs 148 pull the lid 144 forward and the angled slots 152 resultantly translate the lid 144 upwardly from the sealed position to the unsealed position. In this manner, the spring-loaded lid 144 of the drawer assembly 140 travels on four points along a defined trajectory to force the lid 144 upward. Resultantly, the pressure of a seal carried by the lid to seal the lid 144 to the drawer 142 is immediately released and no friction occurs between the seal of the lid 144 and the drawer 142 and the user has a smooth operating experience. No separate action is required to active the lid 144. When the drawer 142 is manually urged back to the closed position, the drawer 142 pushes against a bracket 154 carried by the lid 144 to move the lid 144 backwards against the bias of the springs 148. The geometry of the side wall slots 152 forces the lid 144 downward to the closed or sealed position.

Figure 22:
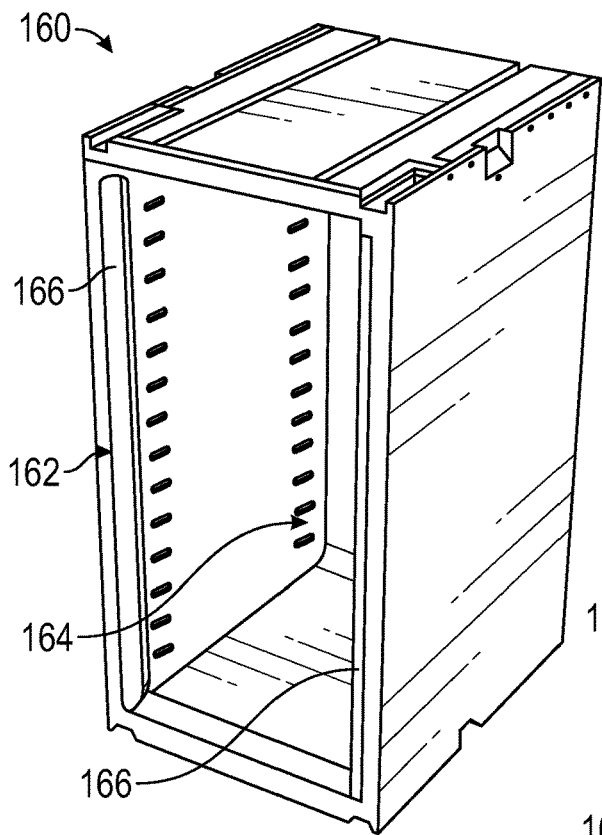
FIG. 22 is a perspective view of a refrigerator module of the present invention incorporating light diffusers.
Figure 23:
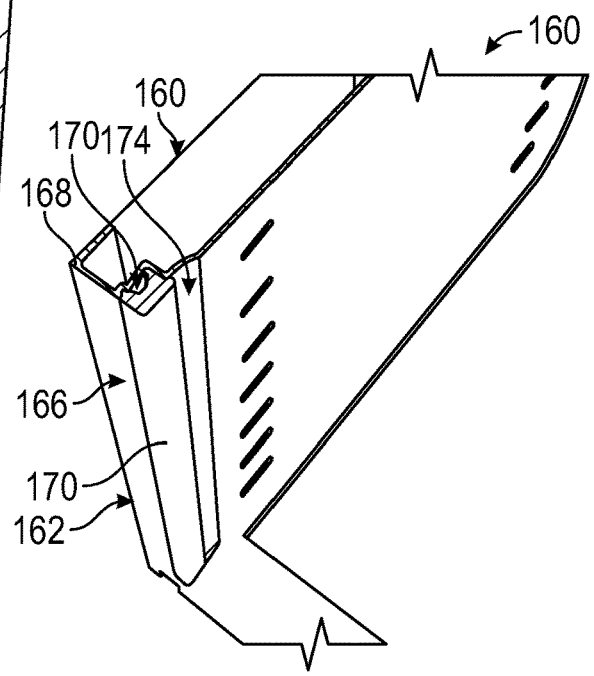
FIG. 23 is a cross-sectional view taken through a portion of the refrigerator module of FIG. 22.

With reference to FIGS. 22 and 23, an insulated housing of a refrigerator module in accordance with the present teachings is illustrated and generally identified at reference character 160. As illustrated, the housing may include a light diffusing arrangement 162 which functions to scatter light throughout an interior 164 of the refrigerator module. The light diffusing arrangement or lighting arrangement 162 may include includes one or more lighting units 166 that cooperate with a geometry of a side wall 168 of the refrigerator module to better illuminate interior 164 of the refrigerator module and an area immediately in front of the refrigerator module. In the embodiment illustrated, the lighting arrangement includes first and second lighting units 166 arranged on vertically extending edges of the refrigerator module between a front face of the refrigerator cabinet and interior walls of the refrigerator cabinet. Such lighting units 166 may be alternatively adapted for refrigerator drawers, by arranging the lighting units on a horizontally extending drawer edge between a tope face and interior side wall of the drawer.

Each lighting unit includes a light source such as an LED light source 170 and a lens diffuser 172. The lens diffuser 172 functions to scatter a first portion of the light emitted from the light source onto a lens-shaped geometry 174 of the side wall of the refrigerator module, which in turn scatters the light throughout the interior 164 of the refrigerator module.

A second portion of light is dispersed toward the front of the refrigerator module and functions to illuminate an area in front of the refrigerator module where products held in the hand of an end user may be better seen. In this manner, products and information written on the packaging thereof may be read significantly easier—particularly in low ambient light conditions. The light distribution may be controlled in intensity such that the human eye experience is more pleasant—particularly under low ambient light conditions.

The refrigerator may also be provided with a light strip on an exterior surface to inform the user of the status of the refrigerator. For example, the light strip may be illuminated in a first color (i.e., green) to indicate favorable functioning of the refrigerator and a second color (i.e., red) to indicate a "service required" or "door ajar" condition, for example.

Turning to FIGS. 24A and 24B through FIGS. 28A-28E, a refrigerator 180 in accordance with the present teachings is illustrated to include a drawer 182 that is accessible in two opposite directions. As shown in FIG. 24A, the drawer 182 may be opened in a first direction (to the left and from within a vehicle 184). As shown in FIG. 24B, the drawer 182 of the refrigerator 180 may also be opened in an opposite, second direction (to the right and from outside the vehicle 184).

The refrigerator 180 includes a tub 186 that connects to the drawer 182 through a latching arrangement 188. The latching arrangement 188 connects the tub 186 to the drawer 182 such that the drawer 182 may be opened to one of the first and second open positions while preventing the drawer 182 from opening to the other of the first and second open positions. In this manner, a significant convenience may be realized by an end user in that the contents of the tub 186 may be alternatively accessed from within the vehicle 184 or from outside the vehicle 184.

The latching arrangement 188 includes a first set of latching components associated with a first side (or the left side as shown in FIG. 24) of the drawer 182 and an identical second set of latching components associated with a second side (or the right side as shown in FIG. 24) of the drawer 182. The latching arrangement 188 will be described in detail with reference to the first side of the drawer 182. As schematically shown, however, it will be understood that similar components are provided at the second side of the drawer 182.

A handle 190 is carried by a rotation bracket 192 and pivots about an axis. The rotation bracket 192 is mounted on a front panel of the drawer 182. The handle 190 is coupled to a first or upper end of a connecting pin 194 such that rotation of the handle 190 by the user upwardly displaces the connecting pin 194. At a second or lower end, the connecting pin 194 connects to a locking pin 196. A tub locking mechanism 198 is carried on the tub 186. A tub pivot plate 200 is spring-loaded and is activated by the tub locking mechanism 198 of the tub 186. A locking bracket 202 is mounted on the front panel of the drawer 182 and holds the spring-loaded pivot plate 200 and the locking pin 196 in place. A base pivot plate 204 is spring-loaded and is activated by a base locking mechanism 206 on the base. Triggered by the connecting pin 194, the locking pin 196 moves up and down. In this regard, when a force is manually applied to the handle 190, the handle 190 rotates and the connecting pin 194 and the locking pin 196 are upwardly translated. The tub and base pivot plates 200 and 204 cooperate with the remainder of the latching arrangement to secure connection with the tub 186 and to prevent opening of the drawer 182 simultaneously from two opposite sides.

Figure 28A:
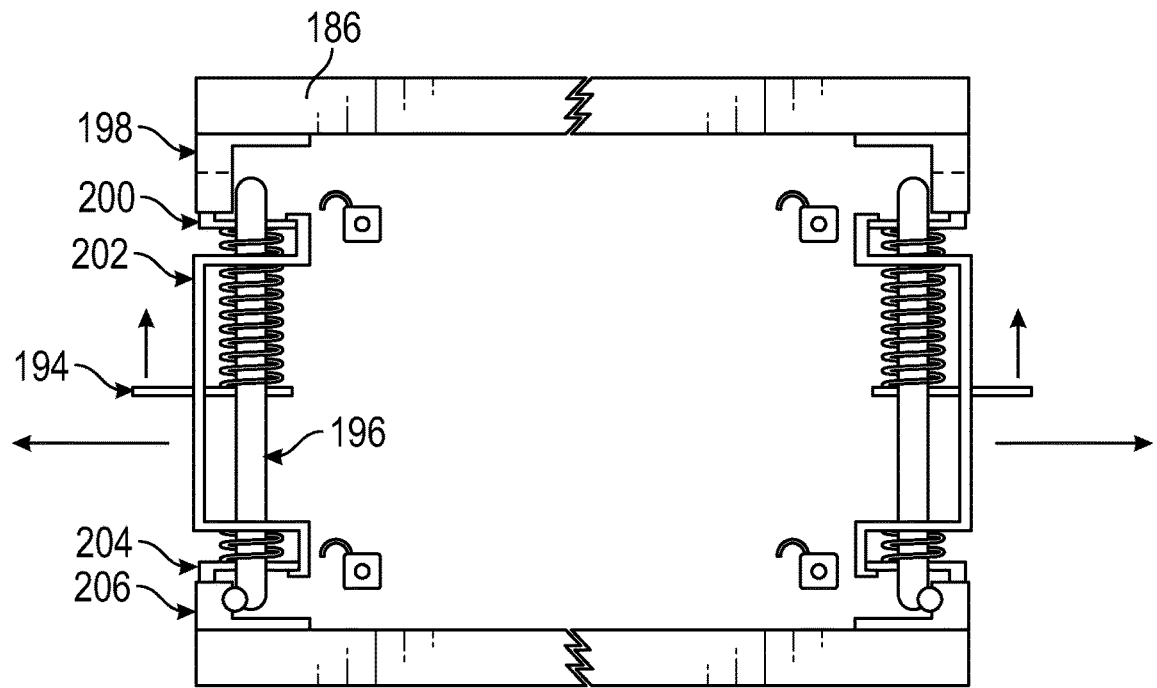
Figure 28B:
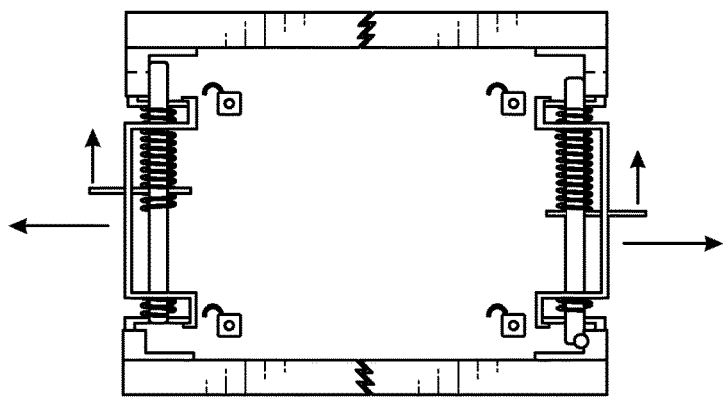
Figure 28C:
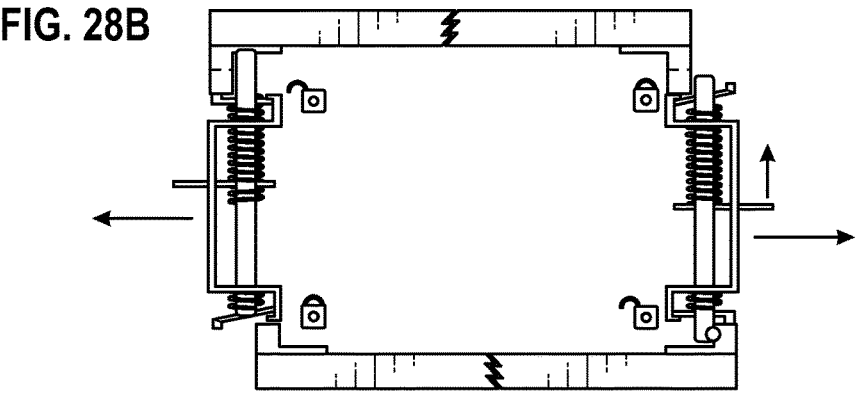

FIG. 28A illustrates a neutral position in which both sides of the latching arrangement are free to be activated by their respective handle 190, but the drawer 182 is locked on both sides by the locking pins 196. The images of the unlocked locks indicate the status of the latching arrangement. As shown in FIG. 28B, when the left handle 190 is rotated, the associated locking pin 196 is shifted to engage with the tub locking mechanism 198. By pulling the handle 190, the drawer 182 will be pulled out to the first open position (e.g., to the interior of the vehicle). At the same time, two mechanisms are activated. 1) The locking pin 196 on left side is connected to the tub locking mechanism 198 is locked in place by the base pivot plate 204 to thereby secure the connection between the locking pin 196 and the tub locking mechanism 198. 2) As shown in FIG. 28C, the locking pin 196 on the opposite, right side is locked in place by the tub pivot plate 200 to prevent the opposite handle 190 from moving and thereby securing the drawer 182 from movement toward the second open position.

Figure 28D:
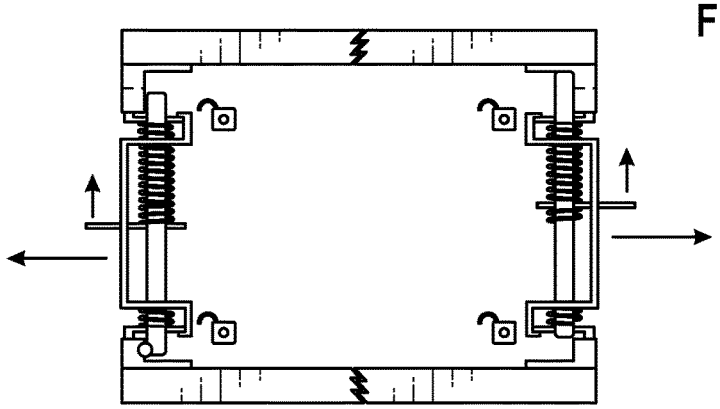
Figure 28E:
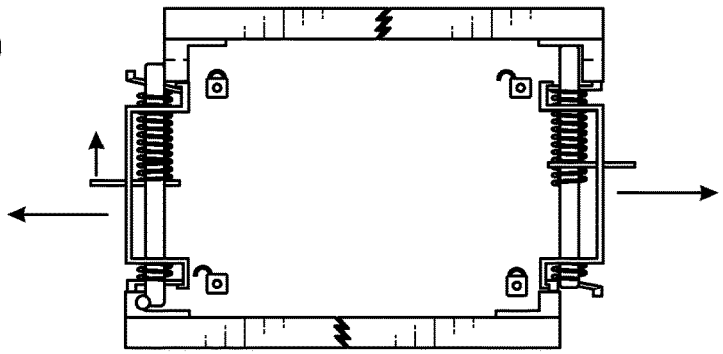

After the drawer 182 has been closed from the first open position and the system is returned to the "neutral" position, the handle 190 on the second or right side can be rotated and pulled (as shown in FIGS. 28D and 28E) to upwardly displace the associated connecting pin 194 and locking pin 196. Again, the two mechanism noted above are activated. Namely, the locking pin 196 is locked in place to secure the connection with the tub 186 and the locking pin 196 on the first or left side is locked to prevent the handle 190 from moving the locking pin 196 on the closed side of the drawer 182.

The drawer 182 may include a front panel 210 that is bigger than the opening through which the remainder of the drawer 182 may pass. The present teachings provide two solutions for selectively accessing the contents of the drawer 182 in two opposite directions. In accordance with one solution, the present teachings allow a tub 186 to selectively engage two drawers that open in opposite directions. According to another solution, detachable drawer panels on opposite sides of the tub may be selectively decoupled. When the drawer panel is decoupled on a first side, the drawer may be opened from the second side. Conversely, when the drawer panel is decoupled on the second side, the drawer may be opened from the first side.

Turning to FIG. 29, a refrigerator 220 in accordance with the present teachings is illustrated to include a plurality of hinge assemblies 222 for rotatably connecting a door 224 to a cabinet 226 of the refrigerator 220 for movement between a closed position and an open position. In the embodiment illustrated, and as will be further appreciated below, the refrigerator 220 includes four hinge assemblies 222 located at each of the corners of the front face of the cabinet 226. The hinge assemblies 222 may be substantially identical to one another and may advantageously allow the refrigerator 220 to be selectively opened from either a left side of the door 224 or a right side the door 224. Such a double hinging door 224 provides improved access to an interior 228 the refrigerator 220 and allows for a great degree of placement of the refrigerator 220 within a confined space, such a motor vehicle. Additionally, the hinge assemblies 222 allow for an elimination of conventional magnetic refrigerator gaskets. Rather, the present teachings utilize springs in the corners of the cabinet to pull the door toward the cabinet 226. The conventional magnetic gasket may be replaced with a non-magnetic gasket, such as rubber, which has sufficient travel to seat the front area of the cabinet 226. A damper may be associated with each hinge assembly 222 to provide a soft close for the door 224. Further, the hinge assemblies 222 of the present teachings may be provided with a self-locking mechanism that makes it impossible to open both lateral sides (e.g., left and right) of the door 224 at the same time.

The four hinge assemblies 222 include first and second hinge assemblies 222A and 222B mounting a first or left hand side of the door 224 to the cabinet 226 for right hand side opening of the door 224 and third and fourth hinge assemblies 222C and 222D mounting a second or right hand side of the door 224 to the cabinet 226 for left hand side opening of the door. At least one of the first and second hinge assemblies 222A and 222B includes a locking mechanism to prevent the left hand side of the door 224 from opening when the right hand side of the door 224 is opened and at least one of the third and fourth hinge assemblies 222C and 222D includes a further locking mechanism to prevent the right hand side of the door 224 from opening when the left hand side of the door 224 is opened.

One of the hinge assemblies 222 and its operation will be described in detail with particular reference to FIGS. 30 through 37A-C. The hinge assembly 222 is shown to generally include a first portion 230 attached to the door 224 and a second portion 232 attached to the cabinet 226. The first portion includes a hinge pin 234 received in a hole of the door 224 and a striker 236 carried at an end of the hinge pin 234. The first portion 230 also includes a lock part 238 rotatably carried on the hinge pin 234. As will be discussed further below, a torque spring 240 biases the lock part 238 toward a locked position.

The second portion 232 of the hinge assembly 222 includes a housing 242 and a taker 244. The housing 242 allows the second portion 232 to be attached to the cabinet 226 as a unit. The taker 244 is movable relative to the housing 242 between a closed position (see FIG. 32, for example) when the door 224 is closed and an open position (see FIG. 33, for example) when the door 224 is opened. When the door 224 is opened from the left side, for example, the geometry of the striker 236 cooperates with the geometry of the taker 244 to translate the taker 244 in a forward direction and rotate the taker 244 about a vertically extending axis. When the door 224 is closed, the cooperating geometries of the striker 236 and taker 244 rotate the taker 244 in the opposite direction about the vertically extending axis and translate the taker 244 in a rearward direction.

The lock part 238 defines a tracer geometry that guides the lock part 238 along a path. The path is shown with arrows in FIG. 37A. When tracer geometry of the lock part 238 enters the housing 242, the tracer geometry follows a first portion of the path (i.e., the lower portion of the path in FIG. 37A). Upon entering the housing 242, the lock part 238 cannot be pulled out from the housing 242 while it follows the first part of the path. Before the lock part 238 can be pulled from the housing 242, the lock part 238 first needs to be moved until it reaches a "rest position" (indicated at reference character 246 in FIG. 37A), before the door 224 can be opened again (e.g., the lock part 238 can be removed) from that side of the cabinet 226. After the lock part 238 reaches the rest position 246, the tracer geometry of the lock part 238 follows the second part of the path (i.e., the upper portion of the path in FIG. 37A) to move out of the housing 242 and allow the door 224 to be opened.

A pull spring 248 includes a first end attached to the taker 244 and a second end attached to the housing 242. The pull spring 248 pulls the door 224 to the cabinet 226. A damper 250 in the same direction provides a soft close for the door 224.

When the door 224 is closed and the opposite, right side of the door 224 is opened, the torque spring 240 of the first portion 230 of the hinge assemblies 222A and 222B on the left side of the door 224 automatically actuate a locking mechanism (e.g., self-locking mechanism). In this regard, the torque spring 240 urges the lock part 238 to engage a detent 250 of the housing 242 (see FIG. 37, for example) in response to rotation of the door 224 about the left side.

With reference to FIGS. 38, 39 and 40A-40C, a shelf 260 for a refrigerator including a release system is illustrated. The shelf 260 is illustrated to generally include a central shelf portion 262 and first and second mounting arrangements 264A and 264B carried at first and second lateral sides of the central shelf portion 262, respectively. Each mounting arrangement including a pair of pins or tabs 266 such that the shelf 260 is mounted in the refrigerator with four pins or tabs 266 that engage detents in a sidewall of the refrigerator housing. The pins or tabs 266 of at least one of the first and second mounting arrangements 264A and 264B are movable between extended and retracted positions. In the embodiment illustrated, only the pins or tabs 266 of the first mounting arrangement 264A are movable between extended and retracted positions. The mounting arrangement 264B is unitarily formed without any moving parts and is attached to the central shelf portion 262.

The mounting arrangement 264A may include a mounting member 270 secured to the central shelf portion 262 and a slider member 272. In the embodiment illustrated, a central portion of the mounting member 270 is secured to the central shelf portion 262 and the ends of the mounting member 272 are resiliently deflectable from an extended position to a retracted position. The slider member 272 is movable in a linear direction indicated by arrow 274. The slider member 272 includes a pair of pins 276 carried in slots 278 defined by the mounting member 270. A forward end 280 of the slider member 272 defines a button that may be pushed by the user to pull the pins or tabs 266 inwardly. Explaining further, the ends of the mounting member 272 are normally in extended positions to engage slots in the housing of the refrigerator. When the slider member 272 is pushed inward (in the direction of arrow 274, the pins 276 ride along the slots 278 and the ends of the slider member 272 are drawn inwardly in the direction of arrows 280. Thus, when the button is depressed, the slider member or slider moves associated two pins from the extended position to the retracted position (e.g. toward a centerline of the shelf) so that the shelf 260 can be removed from the refrigerator. The pins are biased toward the extended positions so that the button doesn't need to be pushed for attaching the shelf. As perhaps best illustrated in FIG. 40C, if you push the button (e.g., in the direction of the arrow) two pins are forced through a track. The shape of the track triggers a motion of the pins towards the center of the interior part (e.g., in the direction of the red arrows).

Turning to FIGS. 41 and 42, a decorative panel construction for a refrigerator door assembly in accordance with the present teaching is illustrated and generally identified at reference character 300. The refrigerator door assembly 300 includes a decorative panel 302 attached to a front face of a door 304 with double sided tape to hold the parts together. As compared to conventional doors in which decorative panels slide into a plastic frame, there is no large trim required around the door to hold the decorative panel to the door.

Turning to FIGS. 43 and 44, another refrigerator door in accordance with the present teaching is illustrated and generally identified at reference character 320. The refrigerator door 320 is shown to include a frame 322 having top and bottom injection molded profiles 324 and 326 and left and right injection molded profiles 328 and 330. The left and right extrusion profiles 328 and 330 define left and right handles, respectfully, for the refrigerator door 320. The door 320 further includes a decorative panel 332, one or more foam panels 334 and a liner plate 336. The one or more foam panels 334 may include a back foam panel 334A and a front foam panel 334B. In a first assembly step, the frame 332 is assembled with the foam panels 334 inside and the decorative panel 332 and liner panel 336 captured by the frame 334. As compared to conventional refrigerator doors that utilizing a foaming system to "glue" all the parts together, the present teachings provide a door construction with significantly reduced manufacturing times. The present teachings also provide a door construction that can be readily adapted for various sizes allowing a single door design for different modules.

Turning to FIGS. 45A-45E, a refrigerator drawer assembly in accordance with the present teachings is illustrated and generally identified at reference character 350. A conventional refrigerator drawer such as a fresh food drawer offers a large open space to store products. This space, however, is not very effectively used since the user is required to stack products within the drawer to use all the available storage volume. The refrigerator drawer assembly 350 of the present teachings is shown to conventionally include a drawer 352 that is slidable relative to a housing or frame 354 between a closed position and an open position. The drawer assembly 350 further includes a plurality of bins 356. In the embodiment illustrated, the drawer assembly 350 includes two bins 356. It will be understood, however, that the drawer assembly 350 may include a greater or lesser number of bins 356 within the scope of the present teachings. Furthermore, the bins 356 may vary in width to optimize use of the space in the total scope of the variable width refrigerator platform described herein. The bins 356 are slidable relative to the drawer 352 and removable from the drawer 352 to more effectively use the storage space within the drawer 352. The bins 356 are connected to the drawer 352 and normally translate with the drawer 352 upon opening and closing of the drawer 352. To gain access to a space below the bins 356, the user can simply slide the bins toward a back of the drawer 352. The drawer 352 can be closed without having to bring the bins 356 back to the original or forward position. The bins 356 may be easily removed from the drawer 352 for use outside the refrigerator.

Figure 45A:
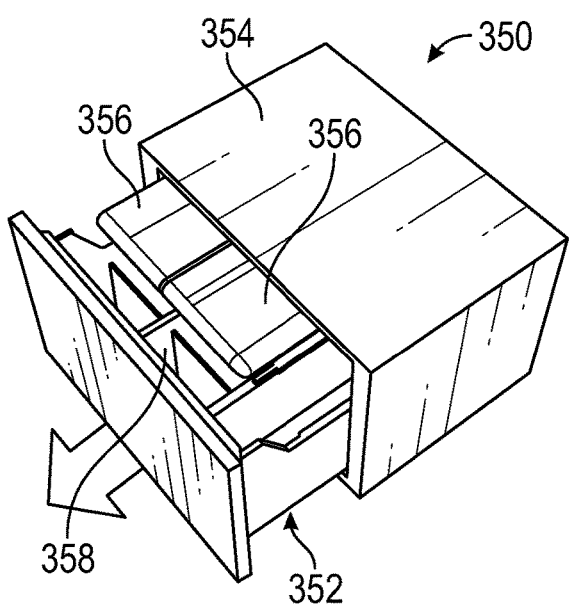
Figure 45B:
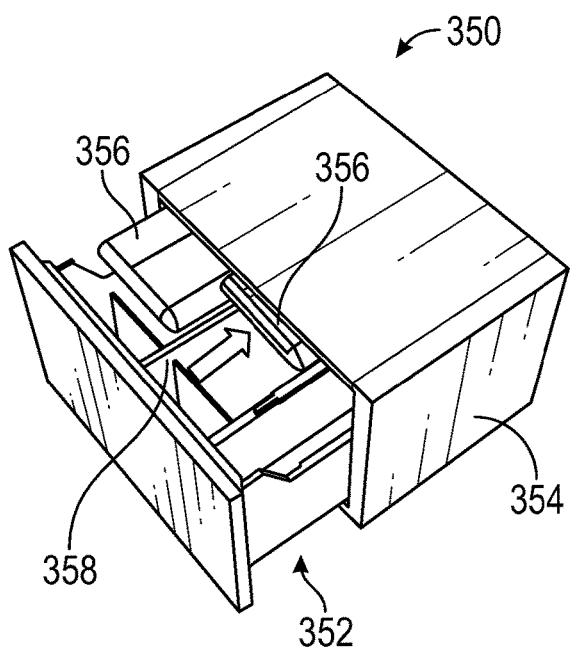
Figure 45C:
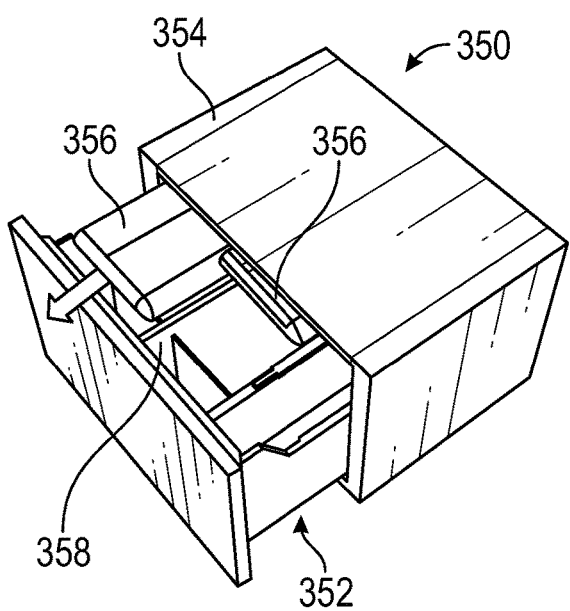
Figure 45D:
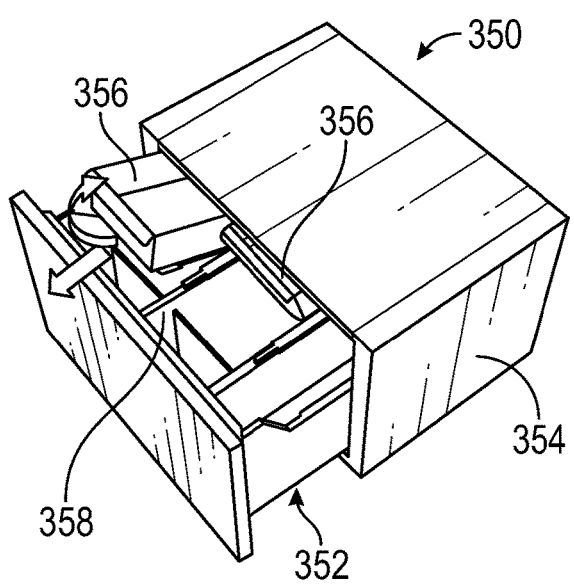
Figure 45E:
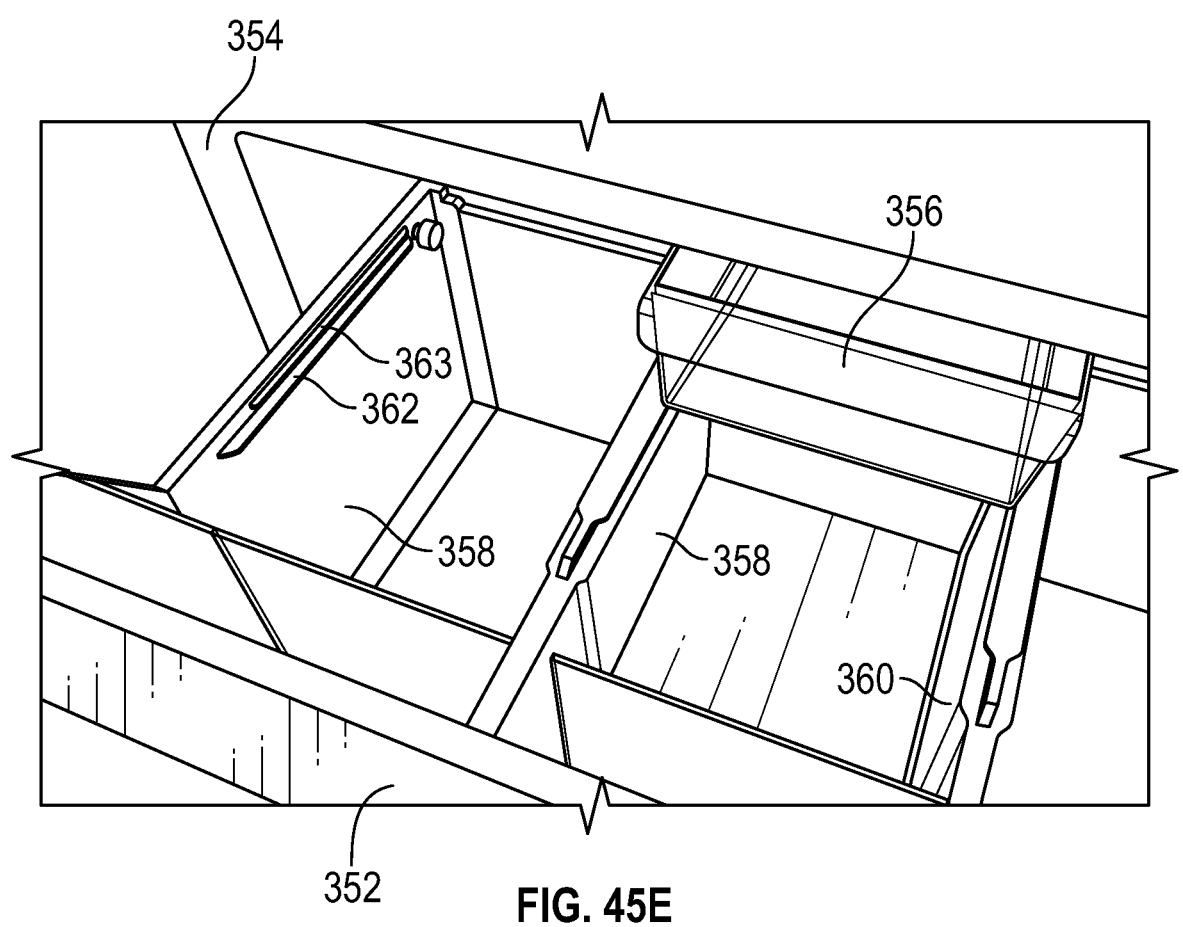

The bins 356 may have a sliding interface with the adjacent sides 360 of the drawer 352 and any drawer dividers 358. As shown in FIG. 45E, for example the bin 356 may include a stepped lower surface that horizontally overlaps one of the adjacent drawer sides 360 and the divider 358. The bin 356 may be supported for sliding movement on the upper surfaces of the adjacent drawer side 360 and the divider 358. Alternatively, the sides 360 or the divider 358 may include an inwardly extending ledge 362 to support the bin 356. While not illustrated, the interface between the drawer 352 and bin 356 may include one or more wheels or bearings 363.

When the drawer 352 is conventionally translated to the open drawer position, the bin(s) 356 normally translate with the drawer 352 as a result of friction between the cooperating surfaces of the bin(s) 356 and the sides 360 and/or divider 358. To gain access to the interior of the drawer 352, the user may remove the bin(s) 356 from the drawer 352 or the user may slide the bin(s) 356 rearward. When the drawer 352 is conventionally translated to the closed drawer position, the bin(s) 356 will contact a back surface of the housing or frame 354 and the bin(s) 356 will resultantly translate forwardly relative to the drawer 352.

Turning to FIG. 46, an accumulator for a modular refrigerator in accordance with the present teachings is illustrated and generally identified at reference character 400. A modular refrigerator has cooling requirements that greatly differ from a conventional, fixed sized cabinet refrigerator. For example, a modular refrigerator may have an accumulator that accommodates for both large and small refrigerator modules that may have large and small evaporator systems, respectively.

The accumulator 400 is shown to include an accumulator vessel 402, an inlet pipe 404, an outlet pipe 406 and a capillary tube 408. The accumulator 400 generally functions to collect (e.g., accumulate) the excess refrigerant in the cooling system to prevent fluids from entering the compressor, as the compressor is only able to process gas. The accumulator 400 of the present teachings also allows oil that is normally carried through the cooling system by the refrigerant to pass through, while allowing the refrigerant to accumulate in the vessel 402 and slowly evaporate away through the outlet pipe 406 leading to the compressor.

In operation, a mixture of liquid, gases and oil enters the accumulator vessel 402 via the input pipe 404. The liquid and oil accumulate in the vessel 402. A mixture of oil and a small amount of liquid refrigerant leaves the vessel 402 via the capillary tube or small diameter tube 408 where it is introduced into the flow of the outlet pipe 406. Only gases leave the vessel 402 from the top of the vessel 402 via the outlet pipe 406. As illustrated, the outlet pipe 406 leaves the vessel 402 at a point that is higher than the end of the inlet pipe 404 within the vessel 402. The small amount of liquid refrigerant that leaves the vessel 402 via the capillary tube 408 will evaporate immediately after entering the flow of the outlet pipe or return tube 406. As a result, an amount of fluid will end up in the return line to the compressor based on a size of the restriction made in the bottom of the vessel 402 or the diameter of the capillary tube 408. These dimensions may be modified for particular systems to ensure sufficient evaporation of the liquid upon introduction into the flow of the return tube 406.

Turning to FIG. 47, mechanical interface 500 for a modular refrigerator is illustrated in connection with a first module A of the refrigerator. The mechanical interface is shown to include a plurality of barbed alignment pins 502, a perimeter of caulk 504, and lines of caulk 506. As shown, the module A is ready for attachment of another module to be installed on top. The alignment pins 502 extends upwardly from the top side 508 of the module A. The lines of caulk 506 extend substantially across the top side 508 and function to spread mechanical loads between the housings of the two modules. The perimeter of caulk 504 will function as a moisture barrier to prevent moisture from entering a space between adjacent modules. The present teachings provide a mechanical interface 500 and related method that ensures that adjacent modules of a modular refrigerator are securely fastened, aligned properly and sealed to prevent moisture from permeating into the void between them.

Turning to FIGS. 48 and 48A-48B, a latching arrangement 550 for a bin 552 of a refrigerator 554 in accordance with the present teachings is illustrated. As will become better understood below, the latching arrangement 550 cooperates with the rest of the refrigerator 554 to block the weight of the bin 552 and prevent the bin 552 from inadvertently opening. If the user wants to open the bin 552, however, the user may pull on the bin 552 in a conventional manner to overcome the latching arrangement 550 and the function of the latching arrangement 550 is transparent to the user.

The bin 552 includes a frame or front face 556 and an outer panel 558 (otherwise referred to as a furniture panel or decorative panel 558. The outer panel 558 and the frame 556 cooperate to define a door of the bin 552. The door of the bin 552 is movable along with the bin is movable between a closed position to an open position relative to a housing 566 of the refrigerator 554.

The outer panel or decorative panel 558 is movably secured to the frame or front face 556. In the embodiment illustrated, the outer panel 558 and frame 556 are connected at their respective lower ends such that the outer panel 558 may pivot relative to the frame 556 about a horizontally extending axis 560. The horizontally extending axis is a lateral extending axis that extends laterally across the refrigerator 554. In other embodiments within the scope of the present teachings, the outer panel 558 may be connected to the frame 556 for movement other than pivotal movement. Of importance, on door component is able to move relative to another door component to release the latching arrangement 550 in response to a conventional opening of the door by the user.

The latching arrangement is normally operative for maintaining the door (e.g., the outer panel 558 and the frame 556) in the closed position. The latching arrangement is operative in a latching condition when the outer panel 558 is in a first position (as shown in FIG. 48A) and operative in an unlatched condition when the outer panel 558 is in the second position (as shown in FIG. 48B).

The latching arrangement 550 includes a latch 562 with one end 562A attached to an upper end of the decorative panel 558 and an opposite end defining a barb or hook 562A. The latch 562 further includes an upwardly extending portion 562C defining a ramped surface. FIG. 48A, illustrates a normally latched position of the latching arrangement that prevents the door, and resultantly the bin 554, from unintentionally opening during transit of a motor vehicle including the refrigerator 554, for example. In the latched position, inadvertent opening of the bin 552 is prevented by engagement of the barb 562A with a detent 564 carried by the housing 566 of the refrigerator 554. As shown in FIG. 48B, when a user desires to intentionally move the door and bin 552 from a closed position to an open position, the user manually grabs the upper end of the decorative panel 558 and pulls in the direction of arrow 566. This action cause the decorative panel 558 to pivot slightly relative to the door frame 556 and brings the ramped surface of the upwardly extending portion 562 into engagement with a follower 568 carried by the door frame 556. This engagement downwardly rotates the barb 562A of the latch 562 and allows the barb to move past the detent 564. With the latching arrangement 550 now in the unlatched position, the door and the bin 552 may be translated to the open position. However, in the closed position when an external force is applied, for example a cornering or breaking force of a vehicle, it is impossible that the drawer opens by itself. So without applying a separate lock the drawer front functions as a driving lock.

Turning to the flow diagram of FIG. 49A and the system schematic of FIG. 49B, a method of controlling cooling of a modular refrigerator including a plurality of refrigeration modules in accordance with the present teachings will be further described. Additionally, a further exemplary embodiment of a module refrigerator 600 in accordance with the present teachings will be described. The method of the present teachings is particularly adapted for controlling refrigeration of a modular refrigerator 600 including a plurality of modules. In the embodiment illustrated, the module refrigerator 600 is shown to include a cooling unit or cooling module 602, and three refrigeration modules, A, B and C. The cooling module 602 further includes an accumulator 400, a compressor 604, a condenser 606, and a filter 608. These are related components of the cooling module 602 will be understood to be conventional in construction and operation to any extent not described herein.

Each refrigeration module A, B, and C has a dedicated temperature sensor 610 for sensing an internal temperature. Each refrigeration module A, B and C is shown to be associated with slave electronic 612 operative to transmit a temperature signal to master electronics 614 of the modular refrigerator 600. In the embodiment illustrated, the master electronics 614 are part of the cooling module 602. Alternatively, each refrigeration module A, B and C may include a dedicated controller such as a fuzzy logic controller, for example Each of the refrigeration modules A, B, and C will be cooled by the cooling module 602. As such, the cooling module 602 will be understood to be a common, central cooling unit. The modular refrigerator 600 of the present teachings is operative to switch active cooling between refrigerant circuits of the refrigeration modules A, B, and C. As the refrigerant circuits of the modules A, B, and C do not operate simultaneously, the method of the present teachings is adapted to prioritize active cooling of the modules A, B, and C based on need.

According to a first general step 616 of the method of the present invention, a system controller 617 of the master electronics 614 of the modular refrigerator 600 compares cooling requests from each of the modules A, B and C and determines a which module is most in need of cooling. The system controller 617 may be a fuzzy logic controller, for example. This module most in need of cooling is referred to as the Max-Request module or priority refrigeration module. The Max-Request module or priority refrigeration module may be determined based on the greatest temperature difference between a module set temperature and that module's sensed temperature. To compare the cooling request from each of the refrigeration modules to identify the Max-Request or priority refrigeration module for cooling includes thus includes sensing a sensed temperature from each refrigeration module, comparing the sensed temperature sensed from each refrigeration module with a corresponding set temperature of each refrigeration module, and identifying the priority refrigeration module for cooling based on the a largest difference between the set temperature and the sensed temperature for each refrigeration module.

The modular refrigerator 600 further includes a plurality of valves for controlling a selective flow of refrigerant to the refrigeration modules A, B and C. In the embodiment illustrated, the plurality of valves includes first and second valves 620A and 620B. The valves 620A and 620B may be carried by the cooling module 602. Each valve 620A and 620B includes one inlet and two outlets 1 and 2. If the modular refrigerator 600 alternatively includes only one refrigeration module, no valves are required. If the modular refrigerator 600 alternatively includes two refrigeration modules, one 2-way valves are required.

According to a second general step 618 of the method of the present teachings, the valves 620A and 620B of the modular refrigerator cooling unit 602 are controlled to direct cooling (e.g., refrigerant to a heat exchanger of the Max- Request module. For example, where the controller 617 determines that the refrigeration module A is the Max-Request module, valve 620A is controlled by the fuzzy logic controller 617 to a first state. In this first state, refrigerant will flow through the 2-way valve 620A to module A. Explaining further, outlet 1 of valve 620A is open and outlet 2 of valve 620A is closed. In this situation, the state of the second valve 620B is inconsequential. Where the controller 617 determines that module B is Max-Request module, the valve 620A is operated by the controller 617 such that refrigerant will flow from valve 620A, through outlet 2 and to valve 620B. Outlet 1 of valve 620A is inactive or closed and outlet 2 of valve 620A is active or open. At the same time, valve 620B is controlled by the controller 617 such that refrigerant will flow through outlet 1 of valve 620B to module B. Where the controller 617 determines that module C is the Max-Request module, the first valve 620A is controlled by the controller 617 such that refrigerant flows to the second valve 620B. Outlet 1 of valve 620A is inactive or closed and outlet 2 of valve 620A is active or open. At the same time, valve 620B is controlled by the controller 617 such that refrigerant will flow through outlet 2 of valve 620B to module C.

According to a third general step 622 of the present teachings, cooling of the Max-Request module continues for a predetermined time. In one example, cooling of Max-Request module may continue for ten (10) minutes. After the expiry of the predetermined time, the method returns to the first step 616 and re-determines the Max-Request module.

Turning to FIGS. 50A-50B, 51A-51B, 52A-52B and 53A-53B, various refrigerator bins including a variable width component are illustrated. FIGS. 50A-50B illustrated a first bin 700. The first bin includes first, second and third members 700A, 700B and 700C. The first, second and third members 700A, 700B and 700C may be individually formed of plastic or other suitable material and secured to one another in any manner well known in the art. As illustrated, the first and third members 700A and 700C are similarly formed to include laterally spaced apart side walls, a front wall, a rear wall and a bottom. The second member 700B is situated between the first and third members 700A and 700C and will be understood to be a variable width member having a variable width W. As illustrated, the second member 700B includes a front wall, a rear wall and a bottom. The laterally spaced walls of the second member 700B need only be so high as to facilitate attachment to the adjacent first and third members 700A and 700C. A width of the entire bin 700 may be readily adapted for particular uses by incorporating a different second member 700B. The first, second and third members 700A, 700B and 700C cooperate to define three bin compartments.

A second bin 710 is shown in FIGS. 51A and 51B. For this embodiment and the embodiments that follow, like reference characters are used for similar features/elements. The second bin 710 includes a first member 700A and a second member or variable width member 700B. The second bin 710 differs from the first bin 700 by incorporating and end wall 712, rather than a third member 700C. The first member 700A, the second member 700B and the end wall 712 cooperate to define two bin compartments.

A third bin 720 is shown in FIGS. 52A and 52B. Similar to the second bin 710, the third bin 720 includes a first member 700A, a second member or variable width member 700B, and an end wall 712 that cooperate to define two bin compartments.

A fourth bin 730 is shown in FIGS. 53A and 53B. This bin 730 includes variable width member 700B, a first end wall 712 and a second end wall 732 that cooperate to define a single compartment bin.

Turning to FIGS. 54A-54E, a refrigerator 740 including door locking arrangement 742 in accordance with the present teachings will be described. The refrigerator 740 includes a door 744. In the embodiment illustrated, the door 744 is movable from a closed position to an open position by rotation about a horizontally extending lower pivot axis 745. In other embodiments, the door may pivot about a horizontally extending axis or the door may be mounted to a bin for sliding movement between closed and open positions. As will become apparent herein, the door latching arrangement is operative to prevent inadvertent opening of the door 744 that may otherwise occur under the weight of the door 744 as the a vehicle including the refrigerator 740 is in transit, for example.

The door 744 is shown to include a door frame 746 and an outer panel 748. The door frame 746 conventionally includes insulation for insulating the refrigerator 740. The outer panel 748 may be otherwise referred to as a decorative panel or furniture panel. The outer panel 748 may carry a handle 750 and is mounted to the door frame 746 for pivotal movement relative to the door frame about the pivot axis 745. In other embodiments within the scope of the present teachings, the outer panel 748 may move relative to the door frame 746 in a manner other than pivotally.

The door latching arrangement 742 includes a lock frame 752, a striker plate 754 and a latch pin 756. As perhaps best shown in the partially cut-away views of FIGS. 54C and 54D, the latch pin 756 is carried within a channel 758 of the door frame 746 and is movable between a latched position (as shown in FIG. 54C) and an unlatched position (as shown in FIG. 54D). The latch pin 756 is biased to the latched position by a spring 760 in the channel 758. The striker plate 754 is mounted to a housing 761 of the refrigerator 740. In the latched position, the latch pin 756 extends into an opening 762 of the striker plate 754 to normally prevent the door 744 from opening.

The lock frame 752 is carried by the outer panel 748. As shown, the lock frame 752 includes a follower portion 764 configured and positioned to engage a ramped surface of the latch pin 756 when a user pulls on the handle 750 of the door 744 to intentionally open the door 744. The lock frame 752 includes planar portion 766 including the follower portion 764. The planar portion 766 is disposed inboard relative to the striker plate 754 and extends parallel to a lateral side of the refrigerator 740.

The outer panel 748 pivots about the axis 750 between a first position and a second position. In the first position, the follower portion 746 of the lock frame 752 is disposed rearward of the latch pin 756 as the latch pin 756 extends into the opening 762 of the striker plate 754. An upper end of the outer panel 748 is pulled in the direction of arrow 768 to rotate the outer panel 748 from the first position to the second position. The second position of the outer panel 748 is shown in dashed lines in FIG. 54E. In the embodiment illustrated, the outer panel 748 rotates about 5 degreed between the first and second positions. The door panel 748 is normally maintained in the first position by a spring 770. Movement of the door panel 748 from the first position to the second position may be further guided by a pin 772 that laterally extends from a side of the door frame 746 and is movable received within a slot 774 of the planar portion 766 of the lock frame 752.

The outer panel 748 may be rotated by the user from the first position to the second position relative to the frame 746. The range of rotation of outer panel 748 relative to the frame 746 may be limited by a slot in the lock frame 752, for example. In the embodiment illustrated, rotation of the outer panel 748 relative to the frame 746 may be limited to about 5 degrees, for example.

The rotation of the outer panel 748 from the first position to the second position moves the latch pin 756 from the latched position to the unlatched position and transitions the latching arrangement 742 from the latched condition to the unlatched condition. Explaining further, the follower portion 764 of the lock frame 752 engages the ramped surface of the latch pin 756. As the lock frame 752 and thereby the follower portion 764 move with the outer panel 748, engagement of the follower portion 764 with the ramped surface of the latch pin 756 inwardly moves the latch pin 756 from the latched position to the unlatched position against the bias of the spring 760. As such, the latch pin 756 is withdrawn from the opening 762 in the striker plate 754 and the door 744 can be opened. After the outer panel 748 has rotated relative to the frame 746 through the range of motion, continued pulling by the user operates to collectively rotate both the outer panel and the frame 746 (e.g., the door 744) out the axis 745 to the open position of the door. When the door 744 is rotated from the open position to the closed position, the follower portion 764 returns to a position rearward of the latch pin 756 and the spring 760 moves the latch pin back to the latched position.

While specific examples have been discussed in the specification and illustrated in the drawings, it will be understood by those skilled in the art that various changes may be made and equivalence may be substituted for elements thereof without departing from the scope of the present teachings. Additionally, while the present teachings may have particular application for motor vehicles, the scope is limited in this regard. For example, various aspects of the present teachings may be readily adapted for refrigerators used in stationary applications, including but not limited to commercial and residential refrigerators. Furthermore, the mixing and matching of features, elements and/or functions between various examples may be expressly contemplated herein so that one skilled in the art would appreciate from the present teachings that features, elements and/or functions of one example may be incorporated into another example as appropriate, unless discussed otherwise above. Moreover, many modifications may be made to adapt a particular situation or material to the present teachings without departing from the essential scope thereof. Therefore, it may be intended that the present teachings not be limited to the particular examples illustrated by the drawings and discussed in the specification as the best mode of presently contemplated for carrying out the present teachings but that the scope of the present disclosure will include any embodiments following within the foregoing description and any appended claims.

What is claimed is:

1. A refrigerator comprising:
a drawer movable to a first open position and a second open position, the first open position being directly opposed to the second open position;
a tub; and
a latching arrangement for connecting the tub to the drawer such that the drawer is selectively openable to one of the first and second open positions while preventing the drawer from opening to the other of the first and second open positions;
wherein the latching arrangement includes a first set of components associated with a first side of the drawer and a second set of the components associated with a second side of the drawer, the first and second sets of components including:
a handle pivotable about an axis;
a rotation bracket mounted on a panel of the drawer, the handle carried by the rotation bracket;
a connecting pin having a first end coupled to the handle such that rotation of the handle by an end user upwardly displaces the connecting pin;
a locking pin connected to a second end of the connecting pin, the connecting pin being upwardly displaceable in response to upward displacement of the connecting pin;
a tub locking mechanism carried on the tub;
a spring-loaded tub pivot plate activated by the tub locking mechanism;
a locking bracket is mounted on the front panel of the drawer and holding the spring-loaded tub pivot plate and the locking pin in place; and
a spring-loaded base pivot plate activated by a base locking mechanism on the base.

2. The refrigerator according to claim 1, wherein the latching arrangement is operative in a neutral position in which both sides of the latching arrangement each have a respective handle, and the sides of the latching arrangement are free to be activated by the respective handles while the drawer is locked on both sides by respective locking pins.

3. The refrigerator according to claim 2, wherein the latching arrangement functions such that when the handle of the first set of components is rotated, the locking pin of the first set of components is shifted to engage with the tub locking mechanism, and the locking pin of the second set of components is locked in place by the tub pivot plate of the second set of components to prevent the handle of the second set of components from moving and thereby securing the drawer from movement toward the second open position.

4. The refrigerator according to claim 1, wherein the handle of both sets of components is coupled to an upper end of the corresponding connecting pin.

5. The refrigerator according to claim 4, wherein a lower end of each connecting pin is connected to the tub locking mechanism.

6. The refrigerator according to claim 1, in combination with a vehicle.

7. The refrigerator according to claim 6, wherein in the first position contents within the drawer are accessible from an interior of the vehicle and in the second position contents of the drawer are accessible from outside the vehicle.

8. A refrigerator comprising:
a drawer movable to a first open position and a second open position, the first open position being directly opposed to the second open position;
a tub; and
a first latching arrangement disposed adjacent a first side of the tub and operatively associated with a first side of the tub, the first latching arrangement including a first user graspable handle;
a second latching arrangement disposed adjacent a second side of the tub, longitudinally opposite the first side of the tub, and operatively associated with the tub, the second latching arrangement having a second user graspable handle;
the first and second latching arrangements configured to enable a user to use the first handle to enable the first latching arrangement to couple to the first side of the drawer, to move the drawer into a first open position, while simultaneously causing the second side of the drawer to cause the second latching arrangement to inhibit movement of the drawer towards a second open position longitudinally opposite to the first open position; and the first and second latching arrangements further configured to enable the user to use the second handle to enable the second latching arrangement to couple to the second side of the drawer, to move the drawer into the second open position, while simultaneously causing the first latching arrangement to inhibit movement of the drawer back towards the first open position.

9. The refrigerator of claim 8, wherein:
the first handle is pivotable about a first axis;
the second handle is pivotable about a second axis parallel to the first axis;
wherein the first latching arrangement further includes:
   a first rotation bracket mounted on a first panel of the drawer, the first handle carried by the first rotation bracket;
   a first connecting pin having a first end coupled to the first handle such that rotation of the first handle by the user upwardly displaces the first connecting pin;
   a first locking pin connected to a second end of the first connecting pin, the locking pin being upwardly displaceable in response to upward displacement of the first connecting pin;
   a first tub locking mechanism carried on the tub;
   a first spring-loaded tub pivot plate activated by the first tub locking mechanism;
   a first locking bracket mounted on the first panel of the drawer and holding the first spring-loaded tub pivot plate and the first locking pin in place; and
   a first spring-loaded base pivot plate activated by a first base locking mechanism on a base.

10. The refrigerator of claim 9, wherein:
the second latching arrangement further includes:
a second rotation bracket mounted on a second panel of the drawer, the second handle carried by the second rotation bracket;
a second connecting pin having a first end coupled to the second handle such that rotation of the second handle by the user upwardly displaces the second connecting pin;
a second locking pin connected to a second end of the second connecting pin, the second locking pin being upwardly displaceable in response to upward displacement of the second connecting pin;
a second tub locking mechanism carried on the tub;
a second spring-loaded tub pivot plate activated by the second tub locking mechanism;
a second locking bracket mounted on the second panel of the drawer and holding the second spring-loaded tub pivot plate and the second locking pin in place; and
a second spring-loaded base pivot plate activated by a second base locking mechanism on the base.

11. The refrigerator according to claim 9, wherein the first handle is coupled to an upper end of the first connecting pin.

12. The refrigerator according to claim 9, wherein a lower end of the first connecting pin is connected to the first tub locking mechanism.

13. The refrigerator according to claim 9, wherein the second handle is coupled to an upper end of the second connecting pin.

14. The refrigerator accordingly to claim 9, wherein a lower end of the second connecting pin is connected to the second tub locking mechanism.

15. The refrigerator of claim 8, wherein the first latching arrangement functions such that when the first handle is rotated, the first locking pin is shifted to engage with the first tub locking mechanism, and the second locking pin is locked in place by the second tub pivot plate to prevent the second handle from moving and thereby securing the drawer from movement toward the second open position.

16. The refrigerator according to claim 8, in combination with a vehicle.

17. The refrigerator of claim 16, wherein:
the second latching arrangement further includes:
   a second rotation bracket mounted on a second panel of the drawer, the second handle carried by the second rotation bracket;
   a second connecting pin having a first end coupled to the second handle such that rotation of the second handle by the user upwardly displaces the second connecting pin;
   a second locking pin connected to a second end of the second connecting pin, the second locking pin being upwardly displaceable in response to upward displacement of the second connecting pin, to permit movement of the drawer towards the second open position.

18. A refrigerator comprising:
a drawer movable to a first open position and a second open position, the first open position being directly opposed to the second open position;
a tub, the drawer being mounted within the tub; and
a first latching arrangement disposed adjacent a first side of the tub and operatively associated with a first side of the tub and a first side of the drawer, the first latching arrangement including a first user graspable handle carried at the first side of the drawer;
a first tub locking mechanism carried on the first side of the tub and forming a portion of the first latching arrangement;
a second latching arrangement disposed adjacent a second side of the tub, longitudinally opposite the first side of the tub, and operatively associated with the tub, the second latching arrangement having a second user graspable handle;
a second tub locking mechanism carried on the tub at the second side of the tub and forming a portion of the second latching arrangement;
the first and second latching arrangements configured to enable a user to use the first handle to enable the first latching arrangement to couple to the first side of the drawer, to move the drawer into a first open position, while simultaneously causing the second tub locking mechanism to inhibit movement of the drawer towards a second open position longitudinally opposite to the first open position; and
the first and second latching arrangements further configured to enable the user to use the second handle to enable the second latching arrangement to couple to the second side of the drawer, to move the drawer into the second open position, while simultaneously causing the first tub locking mechanism to inhibit movement of the drawer back towards the first open position.

19. The refrigerator of claim 18, wherein:
the first handle is pivotable about a first axis;
the second handle is pivotable about a second axis parallel to the first axis;

wherein the first latching arrangement further includes:
- a first rotation bracket mounted on a first panel of the drawer, the first handle carried by the first rotation bracket;
- a first connecting pin having a first end coupled to the first handle such that rotation of the first handle by the user upwardly displaces the first connecting pin;
- a first locking pin connected to a second end of the first connecting pin, the locking pin being upwardly displaceable in response to upward displacement of the first connecting pin, to permit movement of the drawer towards the first open position.

20. The refrigerator of claim 18, wherein:
the first tub locking mechanism includes a first spring-loaded tub pivot plate activated by the first tub locking mechanism;
a first locking bracket mounted on the first panel of the drawer and holding the first spring-loaded tub pivot plate and the first locking pin in place; and
a first spring-loaded base pivot plate activated by a first base locking mechanism on a base.

21. The refrigerator of claim 20, wherein:
the second tub locking mechanism includes a second spring-loaded tub pivot plate activated by the second tub locking mechanism;
a second locking bracket mounted on the second panel of the drawer and holding the second spring-loaded tub pivot plate and the second locking pin in place; and
a second spring-loaded base pivot plate activated by a second base locking mechanism on a base.

\* \* \* \* \*